(12) United States Patent
Park et al.

(10) Patent No.: US 10,936,086 B2
(45) Date of Patent: Mar. 2, 2021

(54) SYSTEM FOR INPUTTING INFORMATION BY UTILIZING EXTENSION KEY AND METHOD THEREOF

(71) Applicant: TP-I CO., LTD., Seoul (KR)

(72) Inventors: Taeun Park, Seoul (KR); Sangjung Shim, Seoul (KR); Hee-Myong Ro, Seoul (KR); Eun-soo Park, Seoul (KR); Minsub Shim, Seoul (KR)

(73) Assignee: TP-I CO., LTD., Seoul (KR)

( * ) Notice: Subject to any disclaimer, the term of this patent is extended or adjusted under 35 U.S.C. 154(b) by 165 days.

(21) Appl. No.: 14/208,476

(22) Filed: Mar. 13, 2014

(65) Prior Publication Data

US 2014/0375569 A1    Dec. 25, 2014

Related U.S. Application Data

(63) Continuation of application No. 13/391,875, filed as application No. PCT/KR2010/005604 on Aug. 23, 2010, now abandoned.

(30) Foreign Application Priority Data

Aug. 23, 2009    (KR) .................. 10-2009-0077911
Sep. 9, 2009     (KR) .................. 10-2009-0084684

(Continued)

(51) Int. Cl.
*G06F 3/02*    (2006.01)
*G06F 3/023*   (2006.01)
(Continued)

(52) U.S. Cl.
CPC ............ *G06F 3/0219* (2013.01); *G06F 3/018* (2013.01); *G06F 3/0202* (2013.01);
(Continued)

(58) Field of Classification Search
CPC .... G06F 3/018; G06F 3/0236; G06F 3/04886; G06F 3/0237
(Continued)

(56) References Cited

U.S. PATENT DOCUMENTS

2007/0135104 A1* 6/2007 Suzuki .................. G06F 3/0236
                                                    455/414.1
2007/0139382 A1* 6/2007 Kotipalli ............... G06F 3/0236
                                                    345/168

(Continued)

FOREIGN PATENT DOCUMENTS

KR    10-2001-0102638    11/2001
KR    10-2005-0022560    3/2005

(Continued)

OTHER PUBLICATIONS

International Search Report for PCT/KR2010/005604, dated Apr. 28, 2011.

(Continued)

*Primary Examiner* — Dmitry Suhol
*Assistant Examiner* — Carl V Larsen
(74) *Attorney, Agent, or Firm* — Nixon & Vanderhye, P.C.

(57) ABSTRACT

A system for inputting information by utilizing an extension key. The system includes: an input unit having multiple division areas and detecting a division area selected by a user from among the multiple division areas; and an input analysis unit for allocating corresponding information to the multiple division areas and analyzing that if the input unit detects any of the multiple division areas being selected, information allocated to the selected division area is input, wherein multiple characters are allocated to each of the multiple division areas, when one or more of the division areas are selected, predicted words that are generated by (Continued)

(I)        (II)        (III)

combining characters allocated to the selected division area or areas according to an sequential order of the selected division area or areas are extracted and allocated to each of the division areas, and when a division area to which the predicted word is applied is selected by a predetermined method, the input analysis unit analyzes that the predicted word allocated to the division area which has been selected by the predetermined method is input.

11 Claims, 59 Drawing Sheets

(30) Foreign Application Priority Data

| | | |
|---|---|---|
| Sep. 12, 2009 | (KR) | 10-2009-0086195 |
| Sep. 28, 2009 | (KR) | 10-2009-0091458 |
| Oct. 17, 2009 | (KR) | 10-2009-0099025 |
| Oct. 30, 2009 | (KR) | 10-2009-0104579 |
| Nov. 20, 2009 | (KR) | 10-2009-0112902 |
| Nov. 25, 2009 | (KR) | 10-2009-0114858 |
| Jan. 8, 2010 | (KR) | 10-2010-0001485 |
| Jan. 28, 2010 | (KR) | 10-2010-0008166 |
| Feb. 19, 2010 | (KR) | 10-2010-0015419 |
| Feb. 25, 2010 | (KR) | 10-2010-0016886 |
| Mar. 22, 2010 | (KR) | 10-2010-0025482 |
| Mar. 23, 2010 | (KR) | 10-2010-0025663 |
| Jun. 21, 2010 | (KR) | 10-2010-0058331 |
| Jun. 22, 2010 | (KR) | 10-2010-0058968 |
| Jul. 1, 2010 | (KR) | 10-2010-0063329 |
| Jul. 4, 2010 | (KR) | 10-2010-0064159 |
| Aug. 23, 2010 | (KR) | 10-2010-0081209 |

(51) Int. Cl.
  *G06F 3/0488* (2013.01)
  *G06F 3/01* (2006.01)
  *H04M 1/23* (2006.01)

(52) U.S. Cl.
  CPC .......... *G06F 3/0236* (2013.01); *G06F 3/0237* (2013.01); *G06F 3/04883* (2013.01); *G06F 3/04886* (2013.01); *H04M 1/23* (2013.01); *H04M 2250/22* (2013.01); *H04M 2250/70* (2013.01)

(58) Field of Classification Search
  USPC .......................................... 463/35, 40, 42, 43
  See application file for complete search history.

(56) References Cited

U.S. PATENT DOCUMENTS

| | | | |
|---|---|---|---|
| 2007/0239434 A1* | 10/2007 | Rubanovich | G06F 17/276 704/9 |
| 2008/0122658 A1* | 5/2008 | Salman | G06F 3/0237 341/22 |
| 2008/0126073 A1* | 5/2008 | Longe | G06F 3/0236 704/1 |
| 2008/0297480 A1 | 12/2008 | Lee | |
| 2008/0300853 A1* | 12/2008 | Xiaoning | G06F 3/023 704/2 |
| 2008/0316183 A1* | 12/2008 | Westerman | G06F 3/0416 345/173 |
| 2009/0102685 A1* | 4/2009 | Lassesson | G06F 1/1616 341/23 |
| 2009/0192786 A1* | 7/2009 | Assadollahi | G06F 3/0234 704/9 |
| 2009/0213134 A1* | 8/2009 | Stephanick | G06F 3/0236 345/589 |
| 2010/0241993 A1* | 9/2010 | Chae | 715/830 |
| 2010/0277415 A1 | 11/2010 | Shanmugam et al. | |
| 2011/0007004 A1* | 1/2011 | Huang | G06F 3/0237 345/173 |
| 2011/0063225 A1 | 3/2011 | Michon | |

FOREIGN PATENT DOCUMENTS

| | | |
|---|---|---|
| KR | 10-0650124 | 11/2006 |
| KR | 10-2008-0014323 | 2/2008 |
| KR | 10-2008-0064258 | 7/2008 |
| KR | 10-2009-0026474 | 3/2009 |

OTHER PUBLICATIONS

Written Opinion for PCT/KR2010/005604, dated Apr. 28, 2011.
Office Action issued in parent U.S. Appl. No. 13/391,875 dated Sep. 13, 2013.

* cited by examiner (I)

(II)

(I)  (II)  (III)

(I)  (II)  (III)

(I)  (II)  (III)

(I)  (II)  (III)  (IV)

*VIEW WITH COMBINED GRAPH

□ NUMBER OF TYPING COUNTS
▨ FINGER MOVING DISTANCE

* MEAN FINGER MOVING DISTANCE (I)   (II)   (III)

(I)   (II)   (III)

(I)  (II)  (III)

(I)　　　　　　　　(II)

(III)　　　　　　　　(IV)

(I)

(II)

(III)

(IV)

(I)

(II)

(III)

| क | ख |  |
|---|---|---|
|   | ग |   |
| इ | ध |   |
|   |   |   |
|   |   |   |

(I)

| छ | च | छ |
|---|---|---|
| ज |   | ज |
| झ | ञ | झ |
|   |   |   |
|   |   |   |

(II)

| ठ | ट |
|---|---|
| ड |   |
| ढ | प |
|   |   |
|   |   |

(III)

| त | थ |
|---|---|
|   | द |
| न | ध |
|   |   |

(IV)

| इ | अ |   |
|---|---|---|
| उ |   | ऋ |
| ए | ओ |   |

(V)

| फ | प |
|---|---|
| ब |   |
| भ | म |

(VI)

| य | र |
|---|---|
|   | ल |
| ळ | व |

(VII)

|   | ○̇ | ○̈ |
|---|---|---|
|   | ○̆ |   |
| ○̣ | ○ |   |

(VIII)

| ष | श |
|---|---|
| स |   |
|   | ह |

(IX)

INPUT OF 'क'

(I)      (II)

FINGER LIFT POINT

INPUT OF 'क्'

(III)     (IV)     (V)     (VI)

ENABLE INDEPENDENT VOWEL
TYPING SYSTEM AFTER INPUTTING 'ब'

6201

WHEN FINGER RETURNS TO FIRST TOUCH
POINT AND IS LIFTED, VOWEL KEYS ARE CHANGED TO
INDEPENDENT VOWEL ENABLE STATE, AND A VOWEL
KEY IS TOUCHED TO DISPLAY INDEPENDENT VOWEL
TYPING SYSTEM OF FIG. 68( I ) ON SCREEN (I)  (II)  (III)

SYSTEM FOR INPUTTING INFORMATION BY UTILIZING EXTENSION KEY AND METHOD THEREOF

This application is a Continuation of application Ser. No. 13/391,875 filed 23 Aug. 2010, which is a U.S. national phase of International Application No. PCT/KR2010/005604 filed 23 Aug. 2010 which designated the U.S. and claims priority to Korean Patent Application Nos. 10-2009-0077911 filed 23 Aug. 2009, 10-2009-0084684 filed 9 Sep. 2009, 10-2009-0086195 filed 12 Sep. 2009, 10-2009-0091458 filed 28 Sep. 2009, 10-2009-0099025 filed 17 Oct. 2009, 10-2009-0104579 filed 30 Oct. 2009, 10-2009-0112902 filed 20 Nov. 2009, 10-2009-0114858 filed 25 Nov. 2009, 10-2010-0001485 filed 8 Jan. 2010, 10-2010-0008166 filed 28 Jan. 2010, 10-2010-0015419 filed 19 Feb. 2010, 10-2010-0016886 filed 25 Feb. 2010, 10-2010-0025482 filed 22 Mar. 2010, 10-2010-0025663 filed 23 Mar. 2010, 10-2010-0058331 filed 21 Jun. 2010, 10-2010-0058968 filed 22 Jun. 2010, 10-2010-0063329 filed 1 Jul. 2010, 10-2010-0064159 filed 4 Jul. 2010, 10-2010-0081209 filed 23 Aug. 2010, the entire contents of each of which are hereby incorporated by reference.

TECHNICAL FIELD

The present invention relates to a system for inputting information by utilizing an extension key and a method of inputting information using the same. In detail, the present invention has a feature that new items are allocated to an extension area when an extension key is included in an input system of a minimized digital device and this extension key is selected so that a user can input newly allocated information.

BACKGROUND ART

Recently, many minimized digital devices, such as mobile phones and game systems, are available in the market for use.

Such minimized digital devices win preference because of their advantage of portability and anytime, anywhere use, and due to this, even in the future various products will be minimized and manufactured.

A problem in such minimized digital devices is insufficient space to input various kinds of information, such as characters.

For example, in a mobile phone, all characters and numerals are designed to be input by using only a total of 12 keys, and inputting information using only this small number of keys is inconvenient and very slow in terms of an input speed, in comparison with using a QWERTY keyboard layout that is widely used as a keyboard layout of a Personal Computer (PC).

For Hangul (the Korean alphabet), compared to other alphabets, various input methods are used along with the popularization of mobile phones because of the variety of methods of separating consonants and vowels and the variety of methods of representing each of the consonants and vowels.

That is, the use of these various methods provides a user a method of conveniently inputting characters by reducing the number of key presses as much as possible and reducing a finger moving distance for pressing keys.

However, in spite of this, inputting information into a mobile phone is still inconvenient as the QWERTY keyboard layout, and product developers have been conducting lots of research to develop a method of reducing the number of key presses as much as possible and reducing a finger moving distance for pressing keys with a minimum number of keys.

Although research into an efficient input method, like that of Hangul, has been actively conducted for not only Hangul but also other languages such as English, Chinese, and Hindi, an epoch-making method has not been developed yet, and thus, smartphones that are recently available in the market employ a complete QWERTY keyboard layout.

DETAILED DESCRIPTION OF THE INVENTION

Technical Problem

The present invention provides an efficient information input system capable of reducing the number of key presses and reducing a finger moving distance for pressing keys in an input system used in a minimized digital device in which a size of the input system is limited and an information input method that uses the input system.

The present invention also provides a computer-readable recording medium that stores a computer-readable program for executing the method.

Technical Solution

According to an aspect of the present invention, there is provided a system for inputting information by utilizing an extension key, the system including: an input unit having multiple division areas and detecting a division area selected by a user from among the multiple division areas; and an input analysis unit for allocating corresponding information to the multiple division areas and analyzing that if the input unit detects any of the multiple division areas being selected, information allocated to the selected division area is input, wherein multiple characters may be allocated to each of the multiple division areas, when one or more of the division areas are selected, predicted words that are generated by combining characters allocated to the selected division area or areas according to an sequential order of the selected division area or areas may be extracted and allocated to each of the division areas, and when a division area to which the predicted word is applied is selected by a predetermined method, the input analysis unit may analyze that the predicted word allocated to the division area which has been selected by the predetermined method is input.

An extension key may be allocated to at least one of the multiple division areas, when the extension key is selected after one or more of the division areas are selected, the predicted words that are extracted may be allocated to an extension area including the division areas adjacent to the division area to which the extension key is allocated, and when a division area is selected after the allocation of the predicted words to the division areas in the extension area, the input analysis unit may analyze that the predicted word allocated to the division area is input.

The input unit may include a touch sensor to determine the user's touch, and the input analysis unit may analyze that the predicted word allocated to the division area is input if the user touches the division area to which the predicted word is allocated, and may perform a dragging operation a predetermined distance or greater.

An extension key may be allocated to at least one of the multiple division areas, and if one or more of the division areas are selected, then the extension key may be selected, which allocates predicted words to the division areas, and one of the division areas is selected, the input analysis unit may analyse that the predicted word allocated to the division area is input along with a space input after the predicted word.

The input unit may include a touch sensor which can determine the user's touch, and selection of the extension key and selection of the division area which are performed after selecting one or more of the division areas from among the multiple division areas in order to extract the predicted words may be made as one dragging operation.

In a state where no division area is selected from among the division areas and no predicted word has been allocated to the division area, a dragging operation which corresponds to the selection of the extension key and the selection of the division area may act as if a shift key is pressed so that the character set corresponding to the selected division area may be input in capital form instead of inputting the predicted word.

If after one or more of the division areas are selected, the extension key, a division area included in the extension area, and the extension key may be selected sequentially, the predicted word that has been allocated to the selected division area may be input with a space input after the predicted word.

The input unit may include a touch sensor to determine the user's touch, and after one or more of the division areas are selected and the predicted words are allocated to the extension area, a series of selection processes including the selection of the extension key, the selection of the division area, and the selection of the extension key may be to be performed by one dragging operation.

After one or more of the division areas are selected, the predicted words may be allocated to the extension area, and a series of selection processes including the selection of the extension key, the selection of a division area included in the extension area, and the selection of the extension key may be performed, the predicted word which is allocated to the selected division area may be input and then symbols may be newly allocated to the extension area to be selected.

The input unit may include a touch sensor so as to determined the user's touch, and a series of selecting processes including the selection of the extension key, the selection of a division area, and the selection of the extension key may be performed by one dragging operation.

The input unit may include a touch sensor so as to determine the user's touch, and the input analysis unit may allocate the extension key to at least one division area from among the multiple division areas so that the following cases may perform different functions:

(1) a dragging operation of selecting the division area and selecting the extension key;

(2) a dragging operation of selecting the division area, selecting the extension key, and selecting the division area included in the extension area;

(3) a dragging operation of selecting the extension key and selecting the division area; and (4) a dragging operation of selecting the extension key, selecting the division area, and selecting the extension key.

A method of selecting the characters allocated to the division area and a method of selecting the predicted word allocated to the division area may be distinguished from each other, and when selecting the characters allocated to the division area, characters may be allocated to the extension key, too.

Advantageous Effects

Since Hangul character input systems that are well known till present arrange vowels regardless of shapes of the vowels to reduce finger movement as much as possible, it is difficult to support a user's intuition. However, the present invention designates consonants in the Korean alphabet as primary characters of keys to input a corresponding consonant when each key is pressed for the first time and designates at least one key, except for the keys to which the consonants are designated, as a vowel enable key to input vowels, thereby minimizing the number of keys for the Korean alphabet. That is, both a consonant and a vowel can be input with a single key by enabling an input of the vowel even through the key to which the consonant has been allocated when the vowel enable key is pressed. As a result, the number of independent keys for only vowels is reduced, and accordingly, the total number of keys is reduced, resulting in minimizing a finger moving distance for inputting the Korean alphabet, which increases user convenience. This principle may also be applied to Hindi and Chinese, and in a case of 'disambiguity text input method', by setting a 'predicted word selection function key (extension key)' corresponding to a 'vowel input enabling key' of Hangul, a predicted word selection function and other various additional functions are performed to minimize the number of keys required to input characters, and furthermore, it is easy to select a predicted word, thereby increasing user convenience and efficiency.

BRIEF DESCRIPTION OF THE DRAWINGS

FIGS. 62 to 71 are diagrams for describing a case where the present invention is applied to input Hindi.

BEST MODE FOR CARRYING OUT THE INVENTION

Exemplary embodiments of the present invention will now be described in detail with reference to the accompanying drawings.

Figure 1:
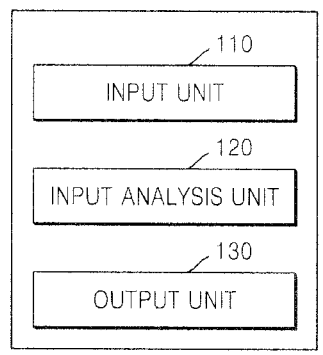
FIG. 1 is a block diagram of an information input system according to an embodiment of the present invention.

FIG. 1 is a block diagram of an information input system according to an embodiment of the present invention.

Referring to FIG. 1, the information input system includes an input unit 110, an input analysis unit 120, and an output unit 130.

The input unit 110 includes a plurality of division areas and detects whether a user selects each of the plurality of division areas.

The plurality of division areas may be formed with a gap between them or formed connected to each other in the entire area of the input unit 110.

Whether each division area is selected may be detected by a method of detecting a press, a finger touch, or a touch and release on the division area.

Instead of detecting whether each division area is selected by any one of the methods, in a conventional keypad that is popularly used in mobile phones, for example, each key forming the keypad is separated from other keys.

When an input system, such as a touch pad or a touch screen, detecting a touch of a user, the same effect as the keypad may be obtained by using a method of dividing the touch pad into a plurality of division areas and detecting which division area a user touched.

Even though the input unit 110 is formed using a means, such as a touch pad or a touch screen, to detect a touch, whether the user has selected a division area may be determined based on whether the user has pressed the division area.

For example, whether the user has touched or pressed the division area may be determined by using a touch area of a finger of the user.

In a case of a device for determining a touch by using a change of electric charge amount, since the electric charge amount is proportional to a touch area, a press may be determined when a generated electric charge amount changes greater than or equal to a predetermined threshold, and a touch may be determined as usual when the generated electric charge amount changes less than the predetermined threshold, and accordingly, whether the user has touched or pressed the input unit 110 may be determined with only a means for detecting a touch.

As another method, a pressure sensor for detecting a touch may be included below a means, such as a touch pad. In this case, when the user presses the touch pad, the pressure sensor located below the touch pad may detect this pressure from the press of the touch pad.

Figure 2:
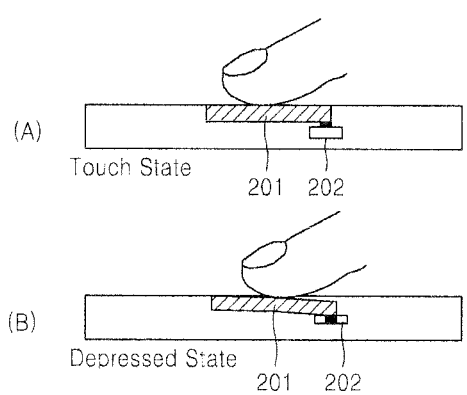
FIG. 2 is a conceptual schematic diagram of an input unit according to an embodiment of the present invention.

FIG. 2 is a conceptual schematic diagram of the input unit 110 according to an embodiment of the present invention.

As shown in FIG. 2, the input unit 110 includes a pressure sensor 202 below a touch detection sensor 201. The touch detection sensor 201, such as a touch pad, can move upwards and downwards when the user presses the touch detection sensor 201. If the user presses the touch detection sensor 201 with a force greater than or equal to a predetermined pressure, the pressure sensor 202 in a switch form, which is below the touch detection sensor 201, is pressed, and accordingly, whether the user presses the touch detection sensor 201 can be detected.

As a moving method of the touch detection sensor 201, the whole touch detection sensor 201 may be pressed without a slope, or the touch detection sensor 201 may be pressed with a slope, as shown in FIG. 2. That is, any direction or method in which the touch detection sensor 201 is pressed is not limited.

As another method, a touch pad may be arranged in the same format as a keypad. That is, by forming a surface of each of the keys forming the keypad with a means for detecting a touch, whether the user has touched a key may be detected, and when the key is pressed, whether the user has touched the key and whether the user has pressed the key may be simultaneously determined by a method of determining whether the key is pressed, which is included in the same method of detecting a press in the conventional keypad.

The input unit 110 provides information regarding a division area selected by the user to the input analysis unit 120 according to whether the user has touched the input unit 110, pressed the input unit 110, or performed a touch and release on the input unit 110.

Whether the user has selected a specific division area may be determined based on only one criterion, such as whether the user has touched the specific division area, pressed the specific division area, or touched the specific division area and then released a finger or the like from the specific division area. However, a determination criterion may vary according to an input form.

This will be described in more detail with reference to embodiments below.

The input analysis unit 120 analyzes and determines information that the user is supposed to input by using information regarding a touch, a press, or a release with respect to each division area of the input unit 110.

That is, the input analysis unit 120 allocates a specific item to each division area of the input unit 110 and, when a specific division area is selected, analyzes that information allocated to the selected division area has been input.

In this case, an extension key for selecting one of a plurality of pieces of information is allocated to at least one of the plurality of division areas included in the input unit 110, and when the extension key is allocated, items allocated to the extension key are newly allocated to an extension area including predetermined division areas.

In this case, it is preferable considering a finger's movement that a division area to which the extension key is allocated is excluded from the extension area and only division areas adjacent to the division area to which the extension key is allocated are included in the extension area.

In this state, when the user selects a division area to which a newly allocated item is allocated, the input analysis unit 120 analyzes that information corresponding to the newly allocated item has been input.

If the number of pieces of information allocated to the extension key is greater than the number of division areas included in the extension area defined by the extension key, the input analysis unit 120 analyzes that a portion of the information allocated to the extension key is allocated to the defined division areas when the extension key is selected for the first time and the remaining information is newly allocated to the defined division areas when the extension key is selected again, thereby analyzing that information allocated to a division area selected by the user has been input.

If it is determined that the extension key is set, new information is allocated to the division areas defined by the extension key, and a single piece of information has been input according to the user's selection of a division area to which new information is allocated, the input analysis unit 120 allocates the originally allocated information to the division areas to which the new information is allocated. That is, initialization is performed.

Besides, when all information allocated to the extension key can be allocated to the division areas included in the extension area even though the extension key is selected only once since the number of division areas included in the extension area defined by the extension key is the same as the number of pieces of information to be newly allocated to the division areas, if the extension key is selected again, the division areas may return to an original state.

The information allocated to the division areas defined by the extension key may be always fixed or variably defined according to the extension key. This will be described in detail through exemplary embodiments.

An extension key may be allocated to any one or some of the plurality of division areas.

In addition, every time an extension key is selected, an extension area including division areas to which new information is allocated may be differently set according to each extension key.

The output unit 130 may be available when the input unit 110 is particularly embodied in a touch screen form.

When the input unit 110 is embodied in a touch screen form, the output unit 130 outputs division areas on a screen to correspond to locations and sizes of division areas of the input unit 110 and displays information allocated to each of the division areas.

When the input unit 110 is embodied in a touch pad or keypad form, since information allocated to each key or each division area of the touch pad can be displayed on the keyboard layout or touch pad, the output unit 130 is not necessarily required.

In this case, even when information allocated to each division area is output to the screen, all division areas may be displayed, only information on which kind of information is currently allocated to a division area selected by the user, or a mark indicating that a specific extension key has been selected may be output only if the specific extension key is selected.

Figure 3:
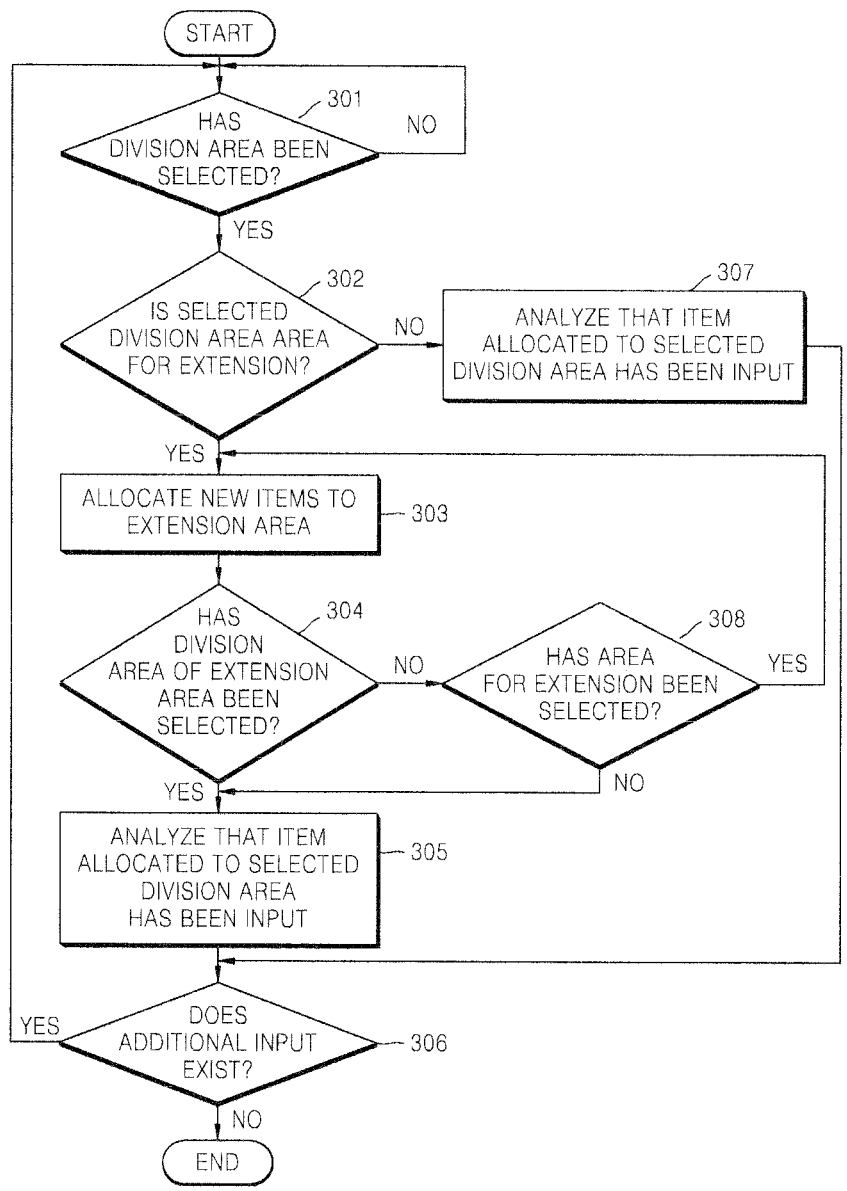
FIG. 3 is a flowchart illustrating an information input method according to an embodiment of the present invention.

FIG. 3 is a flowchart illustrating an information input method according to an embodiment of the present invention.

Referring to FIG. 3, if a user selects a specific division area through the input unit 110 including a plurality of division areas (operation 301), the input analysis unit 120 determines whether the selected division area is a division area to which an extension key is allocated (operation 302).

If the selected division area is not a division area to which an extension key is allocated, the input analysis unit 120 analyzes that an item allocated to the selected division area has been input (operation 307).

Otherwise, if the selected division area is a division area to which an extension key is allocated, the input analysis unit 120 allocates new items to an extension area defined by the extension key (operation 303), and if it is determined that a division area belonging to the extension area has been selected (operation 304), the input analysis unit 120 analyzes that an item newly allocated to the division area belonging to the extension area has been input (operation 305).

Otherwise, if the division area to which an extension key is allocated is selected again (operation 308), the input analysis unit 120 newly sets new items to the extension area (operation 303) to allow the user to newly select a new option.

After the division area to which an extension key is allocated is selected, if the division area to which an extension key is allocated is selected again, or if no division areas belonging to the extension area are selected, i.e., if a division area except for the extension area is selected, it is considered that the user has selected the division area to which an extension key is allocated by mistake, and the input analysis unit 120 invalidates a reallocation process defined by the extension key and analyzes that information allocated to the last division area selected by the user has been input (operation 305).

When this one input process is completed, it is determined whether an additional input is performed (operation 306), and if so, the above-described operations are repeated.

The input system and input method according to the present invention may be used in various fields.

Representative application fields are input systems in game systems and character input systems in mobile devices such as mobile phones and Personal Digital Assistants (PDAs).

Hereinafter, exemplary embodiments of the present invention will be described with reference to the accompanying drawings.

First Embodiment

Figure 4:
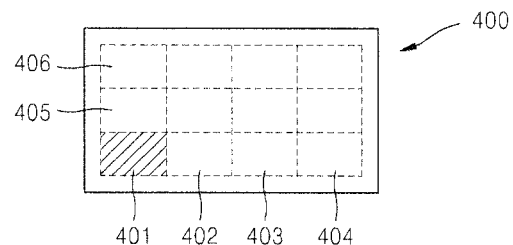
FIG. 4 is a diagram for describing a case where the present invention is applied to a game system.
Figure 4:
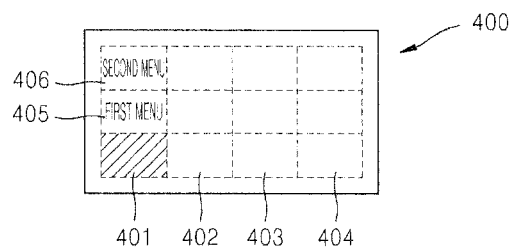

FIG. 4 is a diagram for describing a case where the present invention is applied to a game system.

FIGS. 4(I) and 4(II) illustrate a case where an input system used in the game system is embodied in a form of a touch pad 400, wherein each quadrangle identified by a dashed line indicates a division area.

In addition, it is assumed that division areas 401, 402, 403, and 404 are division areas to which an extension key is allocated.

When a user desires to select or execute a specific menu while playing a game in a drag method on a touch pad, the user selects any one of the division areas 401, 402, 403, and 404 based on the menu to be selected or executed.

The selection of a division area may be achieved by a simple touch, by releasing a finger from a location of any one of the division areas 401, 402, 403, and 404 in a touch state, or by pressing any one of the division areas 401, 402, 403, and 404.

To recognize that the selection is achieved when the finger presses any one of the division areas 401, 402, 403, and 404, a threshold may be previously set to discriminate a touch from a press according to a touch area, as described above, or a pressure sensor may be placed below the touch pad, as shown in FIG. 2.

If the user selects the division area 401, division areas 405 and 406 to which no information is allocated before then belong to an extension area, and a first menu and a second menu are allocated to the division areas 405 and 406, respectively.

In this state, if the user selects the division area 405 or 406, a corresponding menu is selected and executed.

A method of selecting the first menu or the second menu may also be performed by any one of a touch, a press, and a release.

When the second menu is selected, the most convenient method may be recognizing that the second menu has been selected when the user presses the division area 401 to which the extension key is allocated, moves (drags) a finger to the division area 406 to which the second menu is allocated in a touch state, and then releases the finger from the division area 406.

Hereinafter, embodiments applicable to Hangul input systems are mainly described.

Second Embodiment

Figure 5:
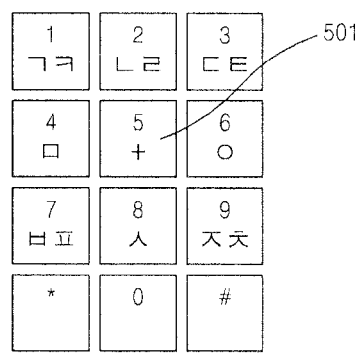
FIGS. 5 to 38 and 72 are diagrams for describing a case where the present invention is applied to input Hangul.
Figure 6:
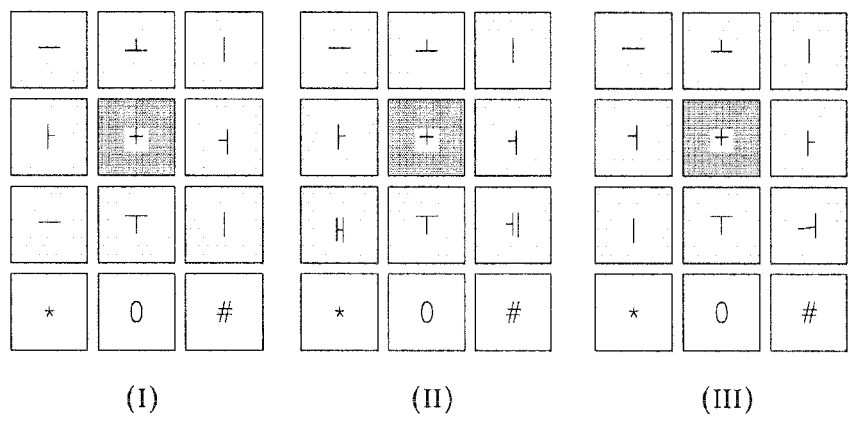

FIG. 5 shows an example in which the present invention is applied to an input system of a typical mobile phone, wherein an extension key is allocated to only a '5' key 501, and FIG. 6 shows examples in which characters are newly allocated to an extension area when the extension key 501 is selected.

As shown in FIG. 5, characters allocated to division areas (keys) for the first time do not include any vowels, and vowels are allocated only when the extension key is selected.

That is, the extension key is used as a vowel input enabling key. When the extension key is selected in a character input mode, division areas to which '1', '2', '3', '4', '5', '6', '7', '8', and '9' keys are allocated are used as an extension area defined by the extension key to allocate a vowel to each of the division areas.

As described above, when the vowel input enabling key, i.e., the extension key, is selected, it is preferable that the extension area to which characters are reallocated may include division areas, which are adjacent to the vowel input enabling key and surround the vowel input enabling key in a regular quadrilateral. In this case, there is an advantage that a vowel can be input while minimizing a finger's movement after pressing the vowel input enabling key.

In the case of FIG. 5, consonants are arranged by designating frequently used 'ㅂ','ㅇ', and 'ㅅ' letters to corresponding keys to be easily input, wherein all related consonants can be input by pressing each key up to three times. That is, 'ㄲ' is input by pressing the '1' key three times, and 'ㅃ' and 'ㅍ' are input by pressing the '4' key two times and three times, respectively.

Vowels are not designated to the keyboard layout shown in FIG. 5, and to input a vowel, the '5' key, which is the vowel input enabling key 501 defined as an extension key, is first pressed, and then another key is pressed, thereby inputting a corresponding vowel. This input method is illustrated in FIG. 6. FIG. 6(I) illustrates a vowel arrangement of a case where the '5' key is the vowel input enabling key, wherein 'ㅗ','ㅏ','ㅓ', and 'ㅜ' are designated to its surrounding '2'. '4', '6', and '8' keys instead of originally designated consonants, and 'ㅡ','ㅣ','ㅡ', and 'ㅣ' are alternately designated to '1', '3', '7', and '9' keys corresponding to corners. The surrounding key designation arrangement of the vowels 'ㅏ', 'ㅓ', 'ㅗ','ㅜ','ㅡ', and 'ㅣ' enabled when the vowel input enabling key is pressed is not limited to FIG. 6(I), and a user or a device manufacturer may change this arrangement discretionally. However, the reason for designating as shown in FIG. 6(I) is only to intend to arrange 'ㅏ' on the left, 'ㅓ' on the right, 'ㅗ' on the top, and 'ㅜ' on the bottom in the order of left to right and top to bottom according to the order of vowels, and this does not limit the configuration of the present invention. Thus, the vowels may also be arranged as shown in FIGS. 6(II) and 6(III). Furthermore, these simple vowels may also be arranged in a certain form other than the cross form around the vowel input enabling key. In addition, 'ㅢ', which is not a simple vowel, is also included into the vowel arrangement, which is an example to show that a compound vowel can be included to remove the inconvenience that 'ㅡ' and 'ㅣ' are consecutively input.

A method of inputting simple vowels using the vowel input enabling key has been described. In the case of Hangul, compound vowels 'ㅑ','ㅕ','ㅛ', and 'ㅠ', in addition to the simple vowels shown in FIG. 6, must be able to be input. However, the input of the compound vowels 'ㅑ', 'ㅕ', 'ㅛ', and 'ㅠ' cannot be performed with the vowel arrangement shown in FIG. 6, so these compound vowels can be input using the vowel input enabling key, as described as follows.

Figure 7:
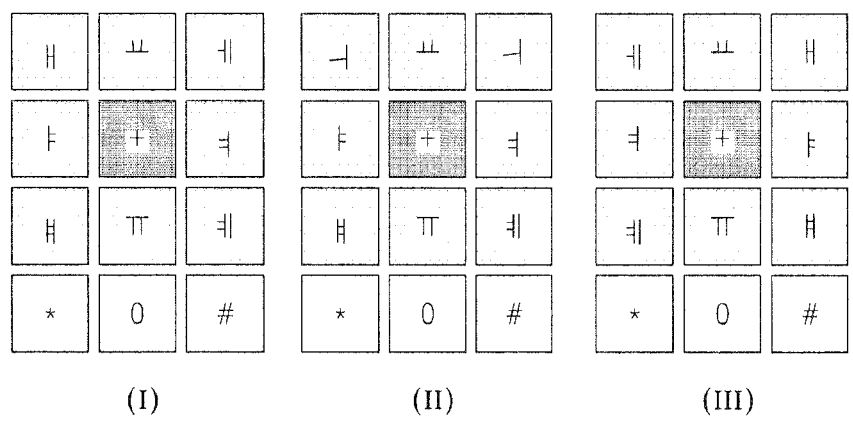

A first method for inputting compound vowels is a method of inputting compound vowels by changing keys to which simple vowels are designated to input the compound vowels when the vowel input enabling key is first pressed twice, as shown in FIG. 7(I). FIG. 7(I) shows an arrangement for a user to easily recognize by arranging 'ㅐ' and 'ㅔ' in the same direction as 'ㅏ' and 'ㅓ', respectively, and arranging 'ㅒ' and 'ㅖ' below 'ㅏ' and 'ㅓ', respectively, together with 'ㅑ','ㅕ','ㅛ' and ' ' even though 'ㅐ','ㅔ', 'ㅒ', and 'ㅖ' are not compound vowels. i.e., they have 3 or more strokes. FIGS. 7(II) and 6(III) illustrate arrangements available with inputtable vowels. Further, a vowel group additionally inputtable when the vowel input enabling key is pressed three times may be designated and arranged.

However, since making the user memorize a number of cases may cause inconvenience, it is preferable that vowels are easily input by reducing the number of presses as much as possible, arranging only associated vowels, and inputting compound vowels by combinations of simple vowels.

For example, as shown in FIG. 7(I), even though 'ㅖ' can be input by pressing the vowel input enabling key twice and pressing the '9' key, when character input automata are configured so that 'ㅖ' may also be input by sequentially inputting 'ㅕ' (pressing the '6' key after pressing the vowel input enabling key twice with reference to FIG. 6(I) and FIG. 7(I)) and 'ㅣ' (pressing the '3' or '9' key after pressing the vowel input enabling key once with reference to FIG. 6(I)), a user may select one of the two methods, and a convenient method depending on a user can be selected.

That is, methods for minimizing the number of key presses and a finger movement distance are simultaneously provided to novices who select the easily perceived method of sequentially inputting 'ㅕ' and 'ㅣ' and experts who select the method of directly inputting 'ㅖ'.

For example, a key pressing order to input 'ㅑ' in a keyboard layout shown in FIG. 6(I) and FIG. 7(I) is 6-5-5-4. Comparing this key pressing order with a key pressing order of 6-5-4 to input 'ㅑ', the first pressing of the '5' key enables a simple vowel input extension function, and the second pressing of the '5' key enables a function of changing a simple vowel enabling state to a compound vowel enabling state.

That is, as described above, when the compound vowel enabling state is enabled by pressing the vowel input enabling key twice, keys to which simple vowels are designated are changed to keys to which corresponding compound vowels instead of the simple vowels are designated, and a compound vowel is input instead of a corresponding simple vowel by pressing any of the keys. That is, in the case of the pressing order of 6-5-5-4, 'ㅑ' is input.

[5-X] indicates a simple vowel 'ㅏ','ㅓ','ㅗ','ㅜ', or 'ㅣ', and [5-5-X] indicates a compound vowel 'ㅑ','ㅕ','ㅛ', or 'ㅠ'.

[5-X] ('X' is an arbitrary key, and when 'X' is not the '5' key, [5-X] indicates a single vowel, and when 'X' is the '5' key, a subsequent key is checked, and a vowel designated to the subsequent key is input) is analyzed as a simple vowel, and [5-5-X] is analyzed as a compound vowel. Thus, in the automata configuration, the '5' key and a subsequent key are analyzed as a single key to achieve an input of a vowel.

If the '5' key is pressed three or more times, every first two times of key pressing is ignored to analyze the key pressing as once or twice, thereby allowing a function of the vowel input enabling key to be able to perform cyclic designation in an order of simple vowel→compound vowel→simple vowel according to the number of key presses.

Alternatively, if the '5' key is pressed three or more times, the third pressing may be used to change a vowel input enabling state to a vowel input disabling state. This is a method of correcting a case where a user presses the vowel input enabling key by mistake although the user desires to input a consonant, i.e., a method of inputting a consonant by pressing the vowel input enabling key twice. That is, the vowel input enabling key is used as a cancel button.

Figure 8:
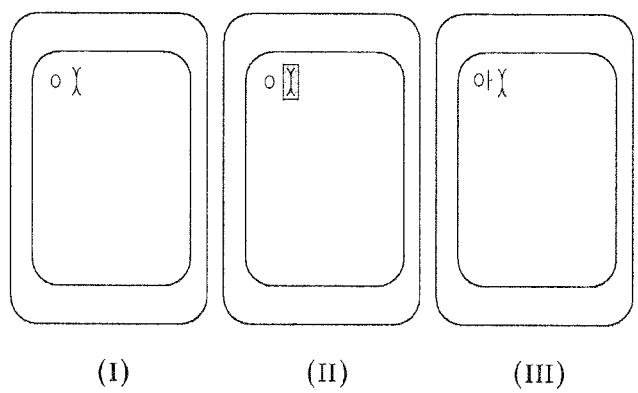

When a vowel input is achieved by using the vowel input enabling key according to an embodiment of the present invention, it is preferable that the output unit 130 displays the vowel input enabling state on a screen as shown in FIG. 8 when the vowel input enabling key is actually pressed. As described above, when the input unit 110 is embodied using a keypad or the like, since characters allocated keys forming the keypad and characters allocated when an extension key is selected can be marked by printing or other methods, a user can input Hangul without much inconvenience by informing the user of whether the extension key is selected at present, i.e., whether the keyboard layout is in a vowel input state.

That is, when the user presses the vowel input enabling key, if the vowel input enabling state can be identified on a screen such that the vowel input enabling state is identified by marking a background color of a pointer (cursor) from transparent to yellow as shown in FIG. 8, it can be determined whether a subsequent key is to input a consonant or a vowel. That is, if there is no such a mark of the vowel input enabling state, the user may be confused.

Figure 9:
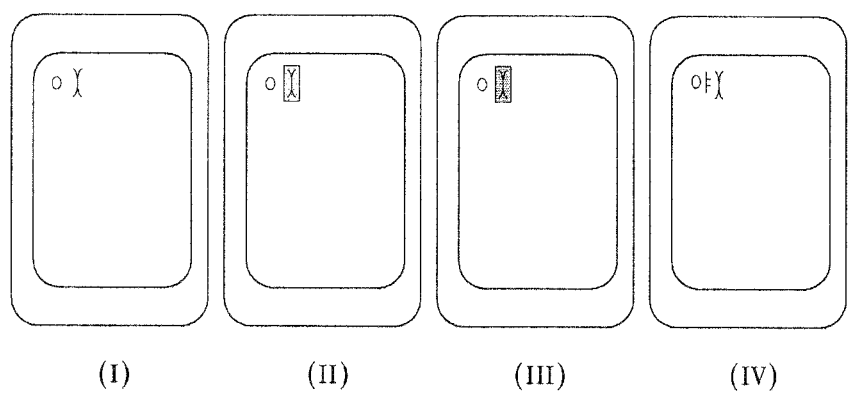

In particular, as shown in FIG. 9, if a method of discriminating a simple vowel input enabling state shown in FIG. 8 (set the background color of the pointer to a yellow color) from a compound vowel input enabling state shown in FIG. 9 (set the background color of the pointer to a red color) is provided, the user may perform a more correct vowel input.

Although input states are discriminated from each other by changing background colors in FIGS. 8 and 9, the discrimination of input states may also be performed by a method of changing a shape of the pointer from a parentheses bundle form to a quadrangle form and informing of the simple vowel input enabling state when the number of quadrangles is 1 and of the compound vowel input enabling state when the number of quadrangles is 2.

Third Embodiment 3-1

Figure 10:
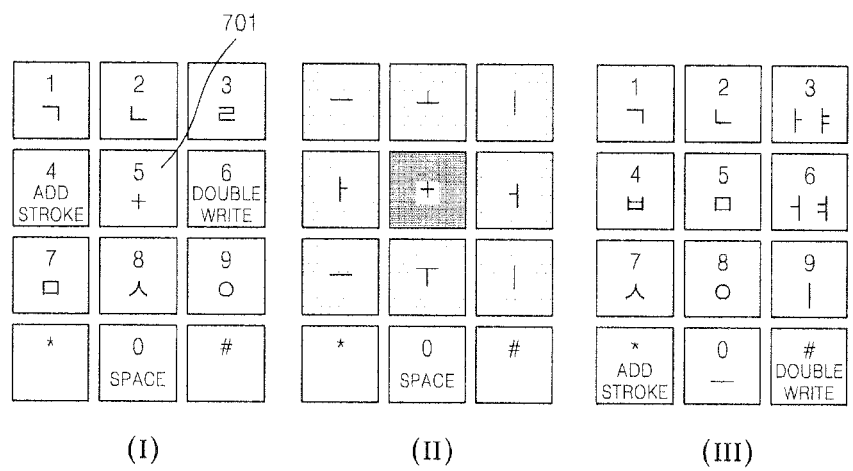

FIG. 10 is a diagram for comparing a conventional input system with the input system according to an embodiment of the present invention.

FIG. 10(III) shows a keyboard layout of a Naratgul input system patented with Korean patent No. 10-0291838, and FIGS. 10(I) and (II) show a keyboard layout in a case where a vowel input enabling key 701 is applied to the Naratgul input system after only vowels are removed except for consonants from the original arrangement in which characters are allocated by introducing the concept of an extension key (vowel input enabling key) according to an embodiment of the present invention.

It can be determined at one glance that four keys (ㅏ ㅓ), (ㅗ ㅜ), (ㅣ), and (ㅡ) required to input vowels in the Naratgul input system are reduced to three keys, and as a result, it is shown in principle that a finger's movement can be significantly reduced by arranging an 'add stroke' key and a 'double write (fortis)' key to the '4' key and the '6' key, respectively, in the keyboard layout according to an embodiment of the present invention using a total of 9 keys, in comparison with the Naratgul input system using a total of 12 keys. A key pressing order for inputting a word '떵' will now be described as an example for a Naratgul input system to which the present invention is applied.

According to the Naratgul character input system shown in FIG. 10(III), a numeric key pressing order is:

2∝*→#→7→6.

In this case, '떵' is input by selecting 'ㄴ' by pressing the '2' key, changing 'ㄴ' to 'ㄷ' by pressing a '*' key to add a stroke, changing 'ㄷ' to a double consonant 'ㄸ' by pressing a '#' key, inputting 'ㅓ' by pressing the '7' key, and finally inputting 'ㅇ' by pressing the '6' key. The total number of key presses is 5, and if it is assumed that a distance between keys is 1, a finger moving distance calculated in the method shown in FIG. 10 is 9.63.

According to a modified Naratgul character input system to which the vowel input system according to an embodiment of the present invention is applied, as shown in FIG. 10(I), a numeric key pressing order is:

2→4→6→5→4→9 (a case of FIG. 10(I)).

In this case, '떵' is input by selecting 'ㄴ' by pressing the '2' key, changing 'ㄴ' to 'ㄷ' by pressing the '4' key, changing 'ㄷ' to a double consonant 'ㄸ' by pressing the '6' key, inputting 'ㅓ' by sequentially pressing the '5' and '4' keys to select a vowel 'ㅓ', and finally inputting 'ㅇ' by pressing the '9' key. The total number of key presses is 6, and if it is assumed that a distance between keys is 1, a finger moving distance calculated in the method shown in FIG. 7 is 7.8.

That is, while the key presses increases by 1, a finger moving distance decreases by about 20%. This provides a method of inputting the entire Korean alphabet with a total number of 9 keys in the keyboard layout shown in FIG. 7.

Moreover, since additional functions can be added to the remaining 3 keys in a keyboard layout having 12 keys because the Korean alphabet can be input with the 9 keys, efficiency can increase overall. For example, instead of pressing a menu key or a 'move' key to input a space ( ) a period (.), or a question mark (?), the '#' key or the '*' key that has been used as the 'add stroke' function or the 'double write (fortis)' function in the existing Naratgul input system can be used instead, thereby increasing convenience of the keyboard layout. This is a comparing point essential for an actual text input in addition to the number of key presses and a finger moving distance required to input the Korean alphabet.

Further, an advantage of the present invention is that since Korean words can be input with a total number of 9 keys, characters can be easily input without looking at a keyboard layout after a user is familiar with the keyboard layout, resulting in convenience of one-hand manipulation.

As described above, the input system according to an embodiment of the present invention has advantages that a limited number of division areas can be used with ease and a finger moving distance can also be shortened by setting characters initially allocated to division areas as characters except for vowels and setting characters allocated to division areas included in an extension area when an extension key is selected, as characters including vowels or as only vowels.

3-2

Figure 11:
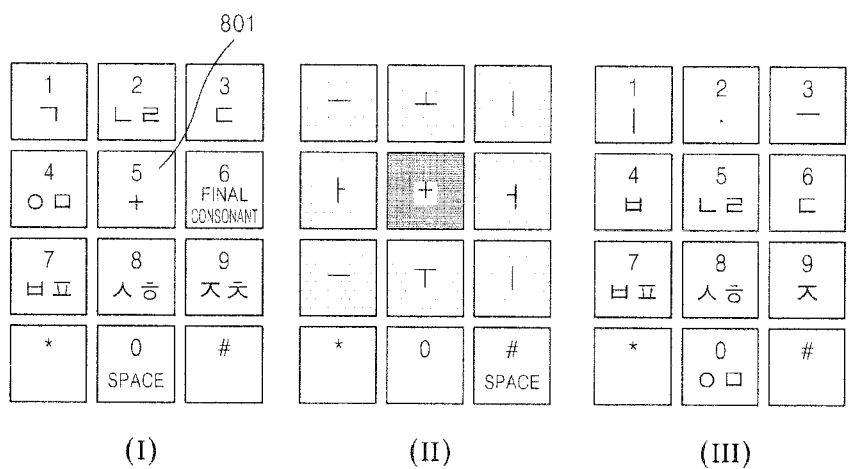

FIG. 11 is a diagram for comparing a conventional input system with the input system according to an embodiment of the present invention.

FIG. 11(III) shows a keyboard layout of a Cheonjiin character input system, and FIGS. 11(I) and (II) show a keyboard layout in a case where a vowel input enabling key 801 is applied to the Cheonjiin character input system after only vowels are removed except for consonants from the original arrangement in which characters are allocated by introducing the concept of an extension key (vowel input enabling key) according to an embodiment of the present invention.

By applying the concept of an extension key (vowel input enabling key) according to an embodiment of the present invention to a Cheonjiin keyboard layout shown in FIG. 11(III), all keys corresponding to Cheon (meaning sky: •), Ji (meaning earth: ㅡ ), and In (meaning person: ㅣ) required to input vowels can be used for other functions, as shown in FIGS. 11(I) and (II). Accordingly, a consonant collision problem and a 'space' key problem of the Cheonjiin character input system can be solved by applying corresponding functions to keys of the keypad.

Since FIG. 11 shows a format in which a 'move' key (final consonant key: '6' key) or a menu key ('0' key) is arranged in the center of the keypad, user convenience increases.

The consonant collision problem, an inconvenience of Cheonjiin, can be solved by pressing the 'final consonant' key after inputting a consonant corresponding to a final consonant so that the same key can be input next by an input cursor moving to a next column. For example, the 'final consonant' key corresponds to a 'move' key of the Cheonjiin keypad input system, and since pressing the 'final consonant' key twice may act as the 'space' key, the same result as substantially moving the 'move' key to the center of the keyboard layout is obtained.

For example, to input a word '마음에' according to the present invention, a key pressing order is:

4-4-5-4-4-5-7-4-4-6-4-5-6-5-3.

For the Cheonjiin Korean character input system, a key pressing order is:

0-0-1-2-0-3-0-0-('move' key)-0-2-1-1.

According to this example, while the number of key presses except for the 'move' key is greater in the present invention than in the Cheonjiin character input system, a finger moving distance significantly increases in the Cheonjiin character input system in that a user waits long or presses the 'move' key located outside an area to which a character input keypad is allocated to input '○' after inputting a syllable '음'.

That is, a big reason for increasing the finger moving distance in the Cheonjiin input method is that the 'move' key has to be pressed due to a consonant collision, and since no vowels are initially arranged in the keyboard layout according to the present invention, an item corresponding to the 'move' key can move to an area for inputting a character.

In addition, while a finger moving distance significantly increases in the Cheonjiin character input system in which consonants '○' and 'ㅁ' are designated to the '0' key farthest from vowels, according to the present invention, the 'move' key for solving the consonant collision problem is designated to the '6' key located at the center of the keypad, and keys for vowels are unnecessary, resulting in designating '○' and 'ㅁ' that have been designated to the '0' key to the '4' key. As a result, all keys are adjacent to the center of the keyboard layout, and thus, any movement to a next key can be perceived by a keyboard layout touch sense of a finger even without visually sensing the keyboard layout, so an input speed increases and a character input can be achieved not by a motion of the entire hand but by thumb motion, thereby providing further convenience. This is a remarkable advantage of a 9-key input method of the present invention.

In the embodiments (3-1) and (3-2) described above, comparing with the Cheonjiin character input method and the Naratgul character input method that are two well-known representative character input methods, the present invention is configured to designate a consonant and a vowel to the same key and enable vowels by an extension key instead of keys to which vowels are designated and other keys to which consonants are designated.

Conventionally, since keys to which consonants forming an initial consonant are allocated and keys to which vowels forming a middle vowel are allocated are separately located at the left and right or top and bottom in most cases according to the characteristic of Hangul which is formed by an initial consonant, a middle vowel, and a final consonant, a finger must frequently move to the top and the bottom or to the left and the right. However, according to the present invention, since consonants and vowels are not separately arranged, a finger moving distance for inputting an initial consonant and a middle vowel or inputting a middle vowel and a final consonant relatively decreases, thereby reducing much more a finger's motions than other Hangul input methods.

Figure 12:
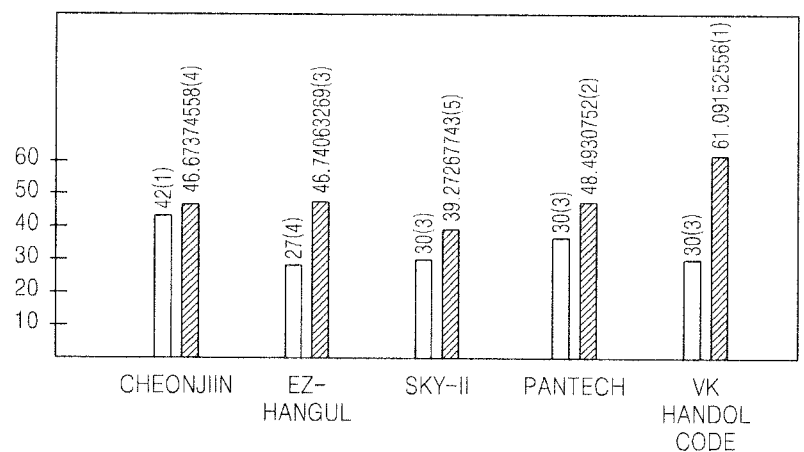
Figure 12:
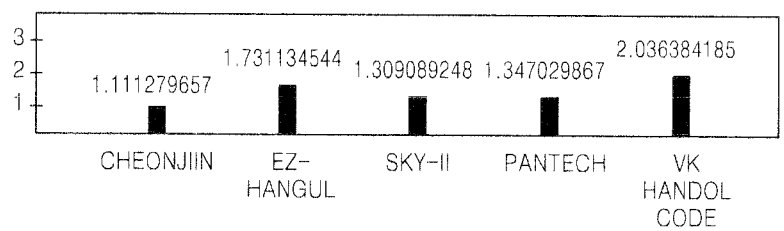

FIG. 12 shows graphs of presses count data and finger moving distance data with respect to Hangul input methods representatively applied to mobile phones available in the market, which are disclosed on the Internet (http://rock1209.tistory.com/296). As can be determined at one glance, a finger moving distance in the keyboard layout shown in FIG. 11 is shorter than any other method.

This can be easily understood in principle because any input can be performed with 9 keys, which is the purpose of the present invention, as clearly shown in FIG. 12.

In a case of Cheonjiin, which is considered as most convenient by users at present, even though the arrangement of vowels moves to the center to reduce a finger moving distance while the number of key presses is not changed as in the present invention, the finger moving distance is reduced to 37.2 (+α; α denotes a finger moving distance for pressing the 'move' key due to consonant collision) while the number of key presses is not changed as 37 (there is an error in the data of FIG. 12), but still, the number of key presses and the finger moving distance are 10% and 20% more than those in the keyboard layout of FIG. 11, respectively, which clearly shows that convenience of the modified keyboard layout of Cheonjiin is lower than that of the keyboard layout according to the present invention.

It can be understood by the data of FIG. 12 that convenience in use increases more than that of any other current keyboard layout when the understanding on vowels is achieved. In particular, mean finger moving distances (finger moving distance according to one press action) shown in FIG. 12 show the reason why users feel that the Cheonjiin character input method of Samsung is convenient. That is, while the Cheonjiin character input method of Samsung provides convenience that users can easily look for and move to a next key because a finger moving distance after pressing a key once corresponds to a size of a single key, users cannot easily look for and move to a next key and feel Naratgul difficult to use because a mean finger moving distance is almost double a distance between two keys unless the users are familiar with the Naratgul character input method. However, according to the present invention users can more easily look for and move to a next key than the Cheonjiin character input method because a mean finger moving distance is 0.86, which is less than 1. That is, the reason to enable a character input with 9 keys is shown, and since the 9 keys can be dealt with only thumb motion in terms of ergonomics, users can perform an input without looking at the keyboard layout.

Examples in which functions added by excluding vowels from initially arranged characters can be introduced to an input system having a limited number of division areas will now be described.

Fourth Embodiment 4-1

Figure 14:
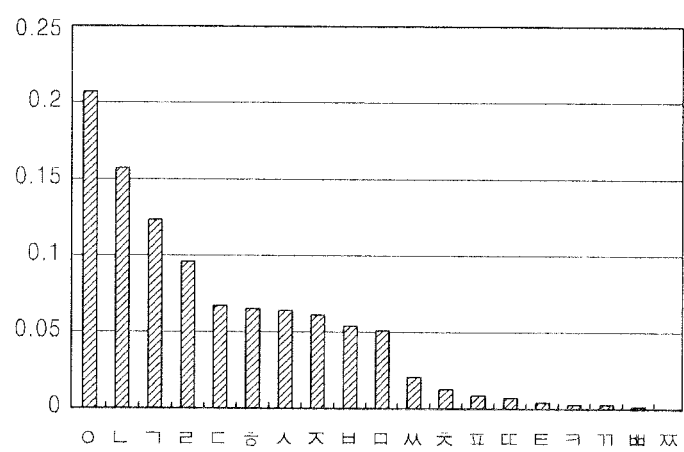

The current embodiment relates to consonant arrangement to which the vowel input method according to the present invention is applied, wherein consonants are arranged by designating one or two consonants to each key considering the number of actually used frequencies but designating a consonant having a higher use frequency (FIG. 14) as a main character so that the main character is input when each corresponding key is pressed once, and an arrangement order of the consonants is a Hangul consonant order so that users can easily become familiar with the arrangement order.

Figure 13:
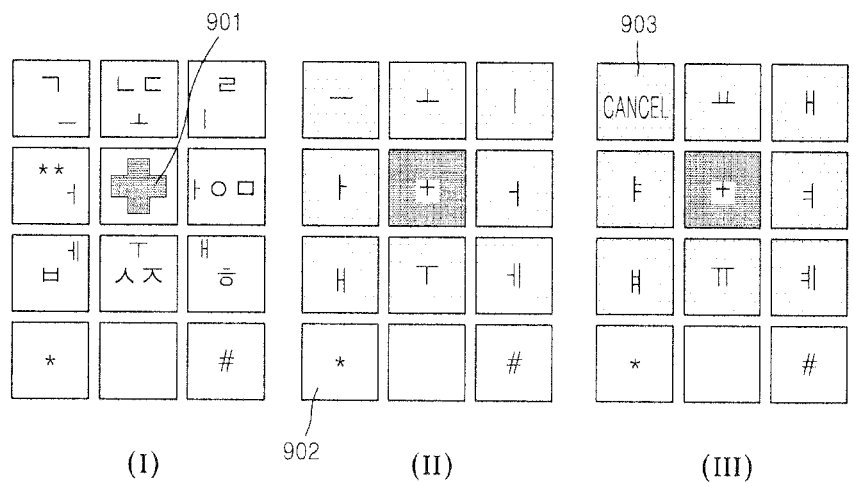

Thus, as shown in FIG. 13, consonant arrangement is performed to input all consonants by designating 'ㄱ', 'ㄴㄷ', 'ㄹ', 'ㅇㅁ', 'ㅂ', 'ㅅㅈ', and 'ㅎ' to the '1', '2', '3', '6', '7', '8', and '9' keys, respectively, and designating a function required to input 'fortis' besides these consonants to the '4' key. Since a finger press action of the '9' key to which 'ㅎ' is designated is unnatural compared to other keys, it is preferable that both 'ㅅ' and 'ㅈ' are designated to the '8' key located in the center area of the keyboard layout. Accordingly, since there is no substantial difference in an input of 'ㅊ' except for an increase in the number of key presses by 1 to an input of 'ㅈ' it is preferable that 'ㅈ' is arranged in the center row of the keyboard layout.

Likewise, by designating only one character to the '7' key to which 'ㅂ' is designated for the same reason as the '9' key, convenience in inputting is provided.

Aspirates 'ㅋ', 'ㅌ', 'ㅍ', and 'ㅊ' are designated as last characters to the keys to which 'ㄱ', 'ㄷ', 'ㅂ', and 'ㅈ' are designated, respectively. That is, 'ㅋ' and 'ㅍ' are input by pressing twice the '1' and '7' keys to which 'ㄱ' and 'ㅂ' are designated, respectively, 'ㅌ' and 'ㅊ' are input by pressing three times the '2' and '8' keys to which 'ㄷ' and 'ㅅㅈ' are designated. By doing as so, conditions for inputting all consonants are satisfied with the 9 keys, resulting in easily inputting a Hangul character with one finger.

4-2

Figure 15:
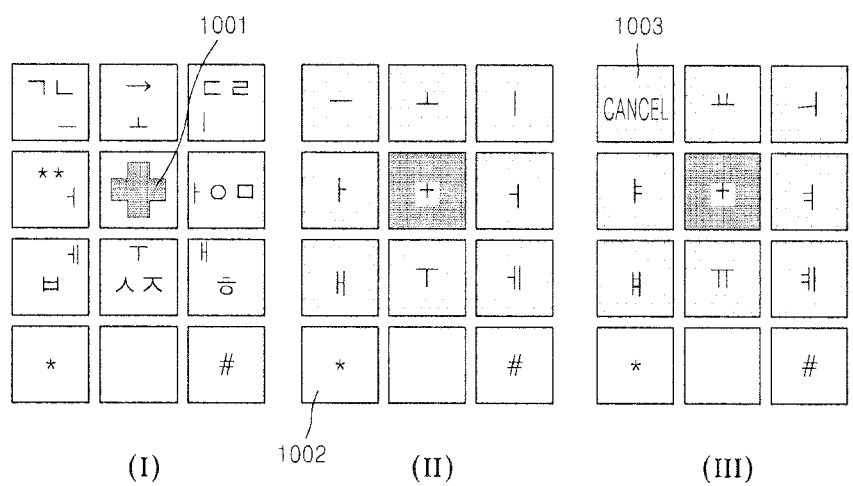

In addition to the embodiment (4-1), in order to prevent a case where such a collision between consonants that 'ㄱ' in '각기' must be input as a final consonant of a first syllable and an initial consonant of a second syllable, FIG. 15 illustrates a consonant arrangement method of newly designating 'ㄴ' and 'ㄷ' designated to the '2' key to the '1' key to which 'ㄱ' is designated and the '3' key to which 'ㄹ' is designated, respectively, and allocating a function of the 'move' key to the '2' key to which 'ㄴ' and 'ㄷ' have been designated in order to reduce the entire finger movement by preventing a finger from moving to the 'move' key by allocating the function of the 'move' key to a separate key.

Vowel arrangements applied to the cases of the consonant arrangements shown in FIGS. 13 and 15, correspond to FIGS. 6(II) and 7(II), respectively. If 'ㄴ' and 'ㄷ' are separated from each other and combined with 'ㄱ' and 'ㄹ', respectively, an increase in the number of key presses is predicted. Thus, as a method of possibly separating 'ㄴ' and 'ㄷ' from 'ㄱ' and 'ㄹ', respectively, a method of allocating the 'move' key function to the '4' key (marked as '**' in FIG. 13(I) by which a fortis function is performed is provided.

Since a case where a consonant collision actually occurs is less frequent than a case where each key is used, by enabling the 'move' key function when the fortis function key is pressed twice, 'ㄴ' of which a use frequency is the second highest can be designated as a first character of the '2' key.

The designation of a '' key for performing the fortis function to the '4' key is for reducing a finger moving distance since all the consonants 'ㄱ', 'ㄷ', 'ㅂ', 'ㅅ', and 'ㅈ' requiring the fortis function are arranged on the left. Likewise, the reason why 'ㅈ' and 'ㅅ' are designated to the same key is that it is advantageous to designate only 'ㅎ' to the '9' key as described above, and another reason for designating only 'ㅎ' to the '9' key is to allow 'ㅈ' to be as near as possible to the '' key.

The '' key for performing the fortis function performs not only a fortis change function for changing 'ㄱ' to 'ㄲ' but also a function for preventing a consonant collision occurring by designating a final consonant and a subsequent initial consonant to the same key. For example, when a word '간다' is input, to input 'ㄴ' of '간' and 'ㄷ' of '다', the 'move' key must be pressed after 'ㄴ' input in the keyboard layout of FIG. 13, and this function of the 'move' key is performed by the '' key. That is, a key pressing order to input '간다' is:

1-5-4-2-4-2-5-4

('ㄱ'+'ㅏ'+'ㅇㅁ'+'ㄴㄷ'+'**'+'ㄴㄷ'+'ㅏ'+'ㅇㅁ').

Although double displaying of '*' indicates repetition of the same consonant in the fortis change function, the '' key performs the function as the 'move' key to prevent a consonant collision, it can be understood to mean allowing another consonant to be input. When the same consonant is input next to a fortis, pressing the '' key results in the same effect.

Although '간다' can be input by pressing the '' key once since 'ㄴ' does not have a fortis, in a case of 'ㄱ' used as a final consonant and an initial consonant in '각기', since 'ㄲ' corresponding to a fortis is input by pressing the '' key, pressing the '' key once causes an error. Thus, to allow the '' key to perform the consonant collision prevention function and the fortis change function, by allowing the '' key to perform the function of preventing a consonant collision between a final consonant and an initial consonant when the key is pressed once and perform the fortis change function when the '' key is pressed twice, a case in which both functions are possible as in the case of '각기' can be prevented.

Thus, a configuration of the present invention is that the '' key performs the function of preventing a consonant collision between a final consonant and an initial consonant and the fortis change function by pressing the '' key once and twice, respectively.

4-3

Unlike the embodiment described above, convenience in inputting further increases using the specialty of 'ㅇ' in the Hangul consonants by allowing 'ㅇ' to perform the function of the '**' key of FIGS. 13 and 15, which corresponds to the double consonant function described above.

When Hangul was invented, 'ㅇ' used as an initial consonant was used as an element for supporting a form of a vowel without a substantial sound value by discriminating 'ㅇ' used as an initial consonant from 'ㅇ' used as a final consonant. That is, 'ㅇ' cannot be used between consonants. A core of a configuration of the current embodiment is to use this characteristic.

Figure 16:
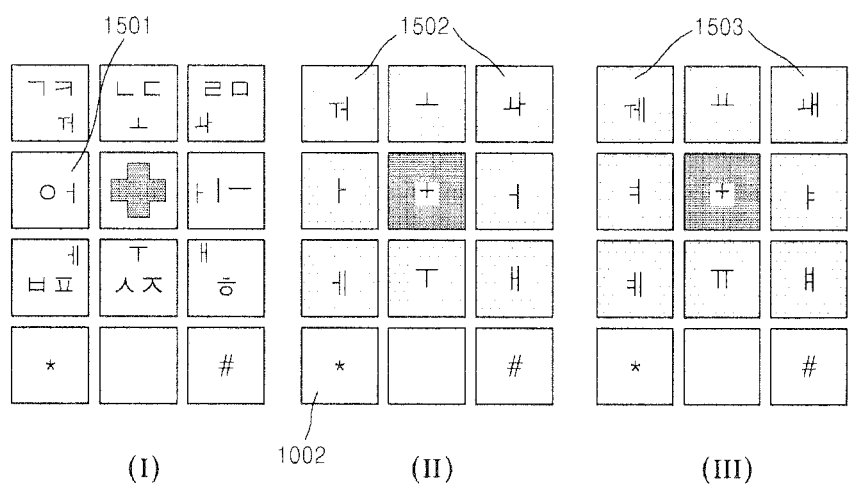

That is, when '각기' is input in a keyboard layout shown in FIG. 16, a problem that a final consonant 'ㄱ' of a first syllable '각' and 'ㄱ' of a second syllable '기' must be input by pressing the same '1' key can be solved by inputting 'ㄱ' twice in a method of first pressing the '1' key to input 'ㄱ' pressing the '4' key, and pressing the '1' key again.

If the '1' key is consecutively pressed twice without pressing the '4' key corresponding to 'ㅇ', 'ㅣ', is input without inputting twice. Therefore, the 'ㄱ' key corresponding to 'ㅇ' acts as the 'move' key to prevent only a consonant collision without a substantial input of 'ㅇ' between consonants. Further, pressing twice the '4' key corresponding to 'ㅇ' between consonants changes a first consonant to a fortis to perform a function of inputting a double consonant.

Since 'ㅇ' cannot be consecutively input twice between consonants, the double consonant input function can be performed by pressing the '4' key twice besides the 'move' key function. For example, in the keyboard layout of FIG. 15, a key pressing order for inputting '빨리' is 7-4-4-5-6-3-4-3-6, wherein the '4' key is pressed twice to input 'ㅃ' of a first syllable '빨', and in order to prevent a situation that the '3' key is supposed to be consecutively pressed twice, the '4' key is pressed between the '3' keys to be consecutively pressed because an initial consonant of a second syllable is the same as a final consonant of the first syllable '빨'. Since this method does not actually affect an input of 'ㅇ', by allowing 'ㅇ' to perform both the 'move' key function and the double consonant input function, the vowels 'ㅣ' and 'ㅡ', which can be input by pressing the vowel input enabling key in the keyboard layout of FIG. 13, can be used together with the consonants. Thus, since 'ㅣ', which has the highest use frequency among the vowels, can be input by one press action, a total number of key presses can be reduced, resulting in an increase in inputting efficiency. Further, by designating 'ㅔ' and 'ㅚ' 1502 to keys to which 'ㅣ' and 'ㅡ' have been designated in the keyboard layout of FIG. 9, four press actions for each two vowels 'ㅟ' and 'ㅗ' can be reduced to two press actions to input each of 'ㅔ' and 'ㅚ' 1502, and furthermore, as shown in FIG. 16(III), each of 'ㅖ' and 'ㅐ' 1503 can be input by three press actions, resulting in much increase in inputting efficiency.

4-4

Another embodiment of the present invention is a consonant arrangement method to prevent a consonant collision (a case where a final consonant of a certain syllable and an initial consonant of a subsequent syllable are designated to the same key) occurring in a multi-tap method in which several consonants are designated to a single key and sequentially input according to a pressing order.

For this consonant arrangement method, the present invention defines a separate selection function key. A function of the selection function key allows selection of a non-primary character except for a primary character designated to each key.

According to a keyboard layout of FIG. 17(I), since only primary characters are displayed on their corresponding keys, a primary character is input when its corresponding key is pressed, and a non-primary character is input when the '*' key, the selection function key, is pressed after its corresponding key is pressed.

For example, is input by pressing the 'ㅋ' key after pressing a key corresponding to 'ㄱ'. Likewise, 'ㄲ' is input by pressing the '*' key twice after pressing the key corresponding to 'ㄱ'. Thus, in the keyboard layout of FIG. 17(I), primary characters and non-primary characters designated to their corresponding keys are as below. Characters in parentheses are the non-primary characters arranged in order.

'1' key - ㄱ (ㅋ, ㄲ),
'2' key - ㄴ,
'3' key - ㄷ (ㅌ, ㄸ),
'4' key - ㄹ,
'6' key - ㅁ,
'7' key - ㅂ (ㅍ, ㅃ),
'8' key - ㅅ (ㅆ),
'9' key - ㅈ (ㅊ, ㅉ),
'0' key - ㅇ (ㅎ).

In a case of keypad mobile phones having 12 keys, the '*' or '#' key may act as the selection function key, and this may be determined according to user convenience. In a keyboard layout having this consonant arrangement, an input of Hangul is the same as described in the second embodiment for keypad mobile phones, and an input of consonants is the same as described above.

Fifth Embodiment 5-1

When the input unit 110 according to an embodiment of the present invention includes a device for detecting a touch of a user, such as a touch pad or a touch screen, the present invention allows an initial consonant and a middle vowel to be input by a touch and drag. That is, both the consonant and the vowel can be simultaneously input as a syllable.

As an example with reference to FIG. 13, '가' is input in an existing keypad mobile phone by pressing the '1' key corresponding to 'ㄱ', pressing the '5' key having the vowel input enabling function to input 'ㅏ', and then pressing the '4' key.

By comparing an input device formed by a virtual keyboard using a touch sensor with such a keypad mobile phone, '가' is input by one motion by touching an area corresponding to the '1' key to input 'ㄱ', moving a finger to an area corresponding to the '5' key in a state where the finger is touching the touch sensor (a screen of a touch screen mobile phone) to enable the vowel input enabling function, moving the finger to an area corresponding to the '4' key in the finger touching state, and releasing the finger from the touch sensor.

In this case, three touches are replaced by one touch, resulting in a remarkable increase in an input speed. If '다' is desired to be input in this syllable input method, '다' is input by touching an area corresponding to the '2' key for the first time, touching the area corresponding to the '2' key once again, moving a finger to the area corresponding to the '5' key in a state where the finger is touching the touch sensor (a screen of a touch screen mobile phone) to enable the vowel input enabling function, moving the finger to the area corresponding to the '4' key in the finger touching state, and releasing the finger from the touch sensor.

That is, a stroke method in which a desired vowel is selected without releasing a finger from the touch sensor in a state where a selection of an initial consonant has been achieved can be used.

In a case of a simple vowel, a syllable having a form of 'consonant+simple vowel' can be input by selecting a consonant, enabling the vowel input enabling function in a finger touching state, moving the finger to a key area corresponding to the simple vowel, and releasing the finger.

However, unlike simple vowels, a compound vowel cannot be input by one stroke. Thus, a compound vowel can be input by selecting a consonant, moving a finger to the area corresponding to the '5' key in a finger touching state to enable the vowel input enabling function, enabling a compound vowel input enabling state by releasing the finger from the touch sensor, touching an area corresponding to the compound vowel in this state, and releasing the finger from the touch sensor.

For example, '야' is input by touching an area corresponding to the '6' key corresponding to 'ㅇ ㅁ', moving a finger to the area corresponding to the '5' key in a finger touching state, releasing the finger from the touch sensor, touching the area corresponding to the '6' key (correspond to 'ㅑ' in this case), and releasing the finger from the touch sensor. That is, since the case of '야' has the same stroke trajectory as a case of a simple vowel '아' except for a finger release on the area corresponding to the '5' key in the middle (what is verb here?), an input of a compound vowel can be easily input. This example is only to show that a vowel configuration of the present invention can allow a simultaneous input of 'consonant+vowel' to be performed in the stroke method. Thus, the current configuration is to complete a consonant input even without releasing a finger from the touch sensor for the consonant input in the character input method that uses a virtual keyboard.

5-2

Figure 18:
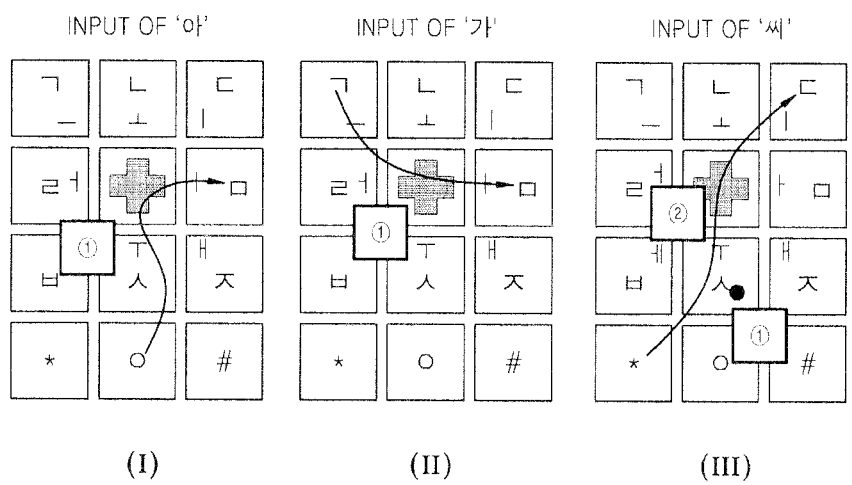

An input method obtained by combining the embodiment (5-1) and the embodiment (4-4) is illustrated in FIG. 18.

As shown in FIG. 18, when '아가씨' is input, a first syllable '아' is input by starting from a state of touching 'ㅇ' key with a finger, moving the finger to an area corresponding to a vowel input enabling key (+), moving the finger to an area corresponding to a 'ㅁ' key to which 'ㅏ' is designated, and releasing the finger from the touch sensor.

A second syllable '가' is input by starting from a state of touching a 'ㄱ' key with a finger, moving the finger to the area corresponding to the vowel input enabling key (+), moving the finger to the area corresponding to the 'ㅁ' key to which 'ㅏ' is designated, and releasing the finger from the touch sensor.

The last syllable '씨' is input by touching a 'ㅅ' key, releasing a finger from the touch sensor, touching a '*' key to change the input character 'ㅅ' to 'ㅆ', moving the finger to the area corresponding to the vowel input enabling key (+) in a finger touching state, moving the finger to an area corresponding to the 'ㄷ' key to which 'ㅣ' is designated, and releasing the finger from the touch sensor.

In FIG. 18, a dark circle indicates a touch-release (hereinafter, a dark circle indicates a 'touch-release' action with respect to a touch screen and a 'press' action with respect to a keypad) and a curve indicates a moving path in a state of touching a touch sensor with a finger, wherein a starting point of the curve indicates a touch start point, and an arrow head indicates a touch end point.

5-3

Figure 19:
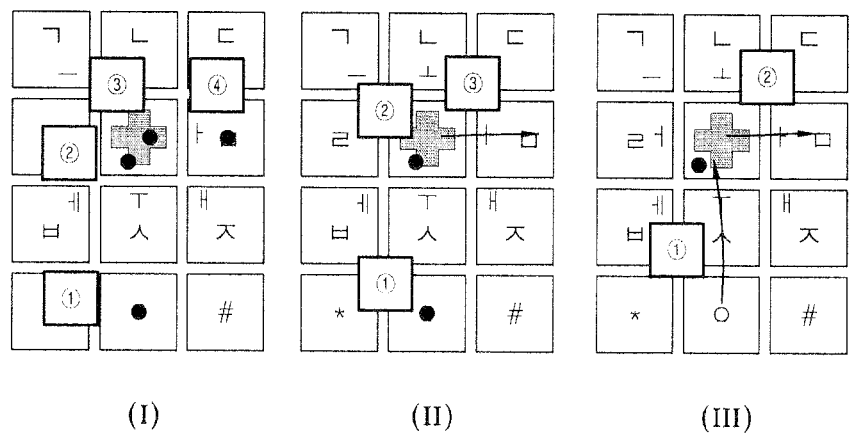

FIG. 19 is a diagram for comparing another method of inputting '야' on a keypad.

In a first method, as shown in FIG. 19(I), '야' is input by touching and releasing a 'ㅇ' key (①), touching and releasing a vowel input enabling key twice (②, ③), and touching and releasing a 'ㅁ' key (④). Here, since the touch-release action is the same as a press-release action on a keypad mobile phone, a process of inputting '야' on the keypad mobile phone is the same as FIG. 19(I).

However, since curves having an arrow head in FIGS. 19(II) to 19(IV) indicate movement in a state of touching a touch sensor with a finger, this method cannot be applied to keypads and is only applicable to virtual keyboard systems using a touch sensor. In FIG. 19(II), a process ① is to input 'ㅇ', a process ② is a simple vowel enabling process, and a process ③ is a compound vowel enabling process and a 'ㅑ' input process. If a touch-release of the 'ㅁ' key immediately after the process ② is done, '야' is input. However, since a first touch point in the process ③ is an area corresponding to the vowel input enabling key, the process ③ has the same effect as processes ③ and ④ in FIG. 18(I), which are performed at the same time. Thus, this makes an effect of omitting a touch-release action once, resulting in an increase in inputting efficiency.

Likewise, a process ① in FIG. 19(III) has the same effect as processes ① and ② in FIG. 18(I), and a process ② in FIG. 19(III) has the same effect as processes ③ and ④ in FIG. 19(I), resulting in an effect of omitting a touch-release action twice.

Sixth Embodiment 6-1

Like the consonants, in the case of vowels also, a simple vowel can be changed to a compound vowel by using the selection function key.

Figure 20:
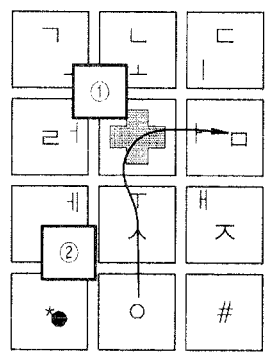

FIG. 20 illustrates this embodiment, wherein an input of '야' and an input of '야' involve the same trajectory and the same touch-release action but finally performing a touch-release of the selection function key to input '야'.

This is considering that the user inputs a vowel in the same manner as a selection of a consonant, simply having an advantage by inputting '야' and '야' in the same trajectory and the same touch-release action but finally performing a touch-release of the selection function key to input '야', and providing a method of correcting an error input of '야' with only the touch-release of the selection function key without correcting the error input of '야' in the first place even though '야' is input by mistake in the processes of FIGS. 19(I) to 19(III).

Figure 17:
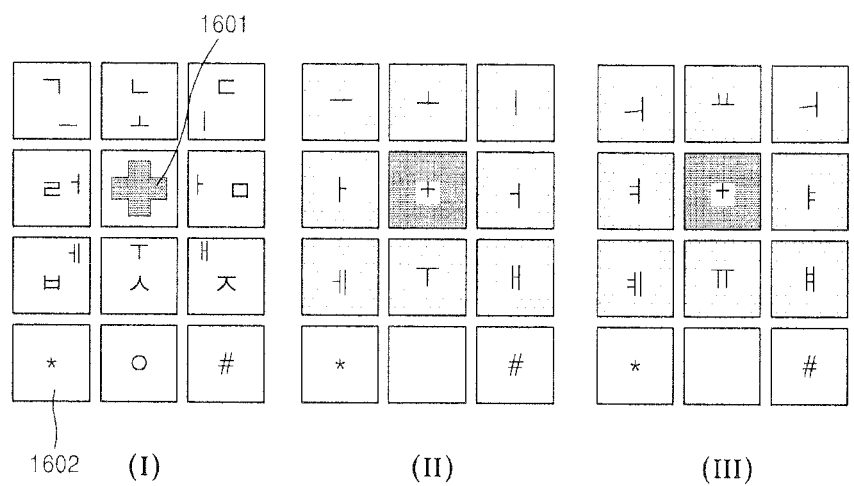

In addition, as shown in FIG. 17, a method of performing a touch-release on an area corresponding to the selection function key after inputting a simple vowel shown in FIG. 17 to input its corresponding compound vowel is provided. This method is a method of performing a touch-release on an area corresponding to the '*' key after inputting 'ㅣ' or 'ㅡ' to input 'ㅢ' and performing a touch-release on the area corresponding to the '*' key after inputting 'ㅏ', 'ㅓ', 'ㅗ', or 'ㅜ' to input 'ㅑ', 'ㅕ', 'ㅛ', or 'ㅠ', respectively. In the syllable input method, although a finger's movement in a finger touching state, which is indicated by a curve of FIG. 19, cannot be applied to keypad mobile phones, a function of changing a vowel that can be input when the vowel input enabling key is touched once (a vowel group shown in FIG. 17(I)) to a vowel that can be input when the vowel input enabling key is touched twice (a vowel group shown in FIG. 17(II)) may be embodied using the '*' key.

Seventh Embodiment 7-1

The embodiment (7-1) of the present invention provides a method of selectively inputting 21 vowels of Hangul at one time by touching the area corresponding to the vowel input enabling key up to three times instead of a combination of 'simple vowel+simple vowel' or 'compound vowel+simple vowel' or considering that the area corresponding to the vowel input enabling key has been touched three times.

Figure 21:
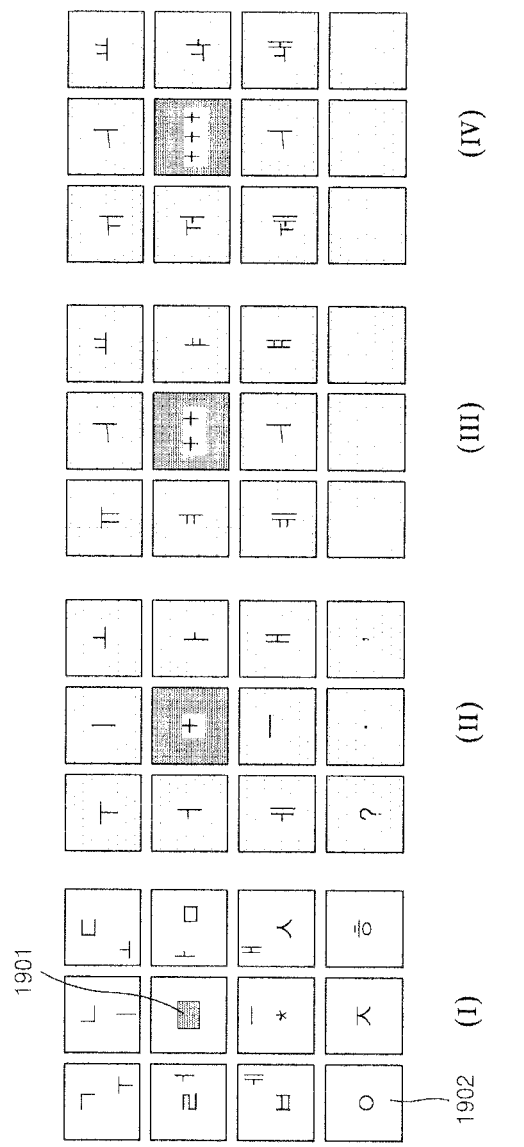

As shown in FIGS. 21(I), 21(II), and 21(III), this is a method of selectively inputting a simple vowel group (8 characters ㅏ, ㅓ, ㅗ, ㅜ, ㅡ, ㅣ, ㅔ, ㅐ—FIG. 21(I) by touching the vowel input enabling key once, selectively inputting a compound vowel group (7 characters ㅑ, ㅕ, ㅛ, ㅠ, ㅖ, ㅒ, and ㅖ—FIG. 21(II) by touching the vowel input enabling key twice, and selectively inputting a complex vowel group (6 characters ㅢ, ㅘ, ㅙ, ㅟ, ㅝ, and ㅞ—FIG. 21(III) by touching the vowel input enabling key three times. As shown in FIG. 21(I), 10 consonants are arranged around the vowel input enabling key, and unlike a selection function key 1602 of FIG. 17, when a consonant is input in the multi-tap method and a '*' key is used for the function of the 'move' key for preventing a consonant collision in the consonant arrangement of FIG. 21, the '*' key and the vowel input enabling key can be combined to reduce the number of vowel input enabling key touches.

That is, without touching the vowel input enabling key three times to input a vowel in the complex vowel group, a vowel in the complex vowel group can be selected with two touches by touching the '*' key and then touching a vowel input enabling key 1901. As a result, the key 1902 corresponds to two touches of the vowel input enabling key 1901, thereby decreasing the number of key touches.

This can also be applied to keypad mobile phones, providing a method of replacing the inconvenience that the vowel input enabling key must be pressed three times with two touches ('*' key once+vowel input enabling key once).

In FIG. 21, since a function of the key is the function of the 'move' key for preventing a consonant collision, even though the '*' key between consonants performs movement of an input space, when a vowel is input immediately after the '*' key, the '*' key performs a function pressing the vowel input enabling key twice instead of the movement of an input space.

However, even though a touch-release of the '*' key is performed in the virtual keyboard input method that uses a touch sensor, the complex vowel group must not be displayed on a screen unless the vowel input enabling key is touched because a consonant key may be input after the '*' key. If the '*' key of FIG. 21 performs a function of the selection function key 1602 as in FIG. 17, the '*' key cannot have an effect of touching the vowel input enabling key twice.

This is because an input of a simple vowel and an input of a complex vowel undergo the same process since a case where the vowel input enabling key must be touched after a touch-release of the key to input a simple vowel may occur when the '*' key performs the function of the selection function key, resulting in a contradiction that two functions are performed by the same process.

Figure 22:
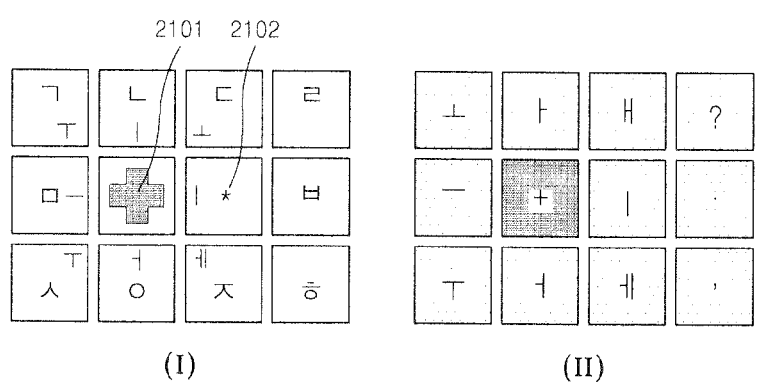
Figure 22:
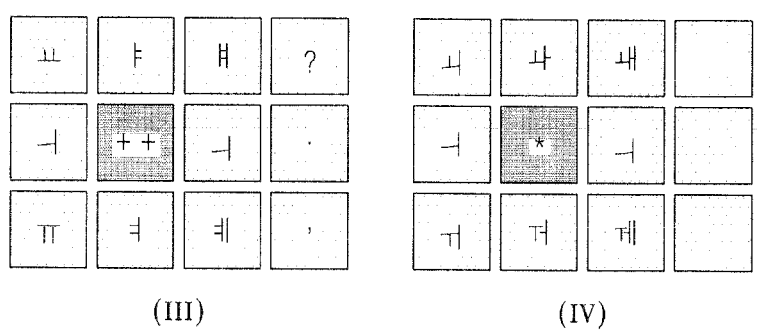

FIG. 22 shows a vowel arrangement when the keyboard layout of FIG. 21 is changed to a horizontal mode. An advantage of vowel input enabling keys 1901 and 2101 in the keyboard layout of FIGS. 21 and 22 is to provide a method of selectively inputting a symbol, such as a period, a comma, or a question mark, at one time like a simple vowel in a touch state or a touch-release state of the vowel input enabling key as shown in FIG. 21(ㄱ) or FIG. 22(ㄱ) even without using a symbol input keyboard layout by forming a separate menu key existing on a typical virtual keyboard using a touch sensor and touching the menu key with a finger.

In the case of keypad mobile phones, '?', '.', or ',' is input by pressing the vowel input enabling key and then pressing 'ㅇ', 'ㅈ', or 'ㅎ' in the case of FIG. 21, and in the case of FIG. 22, by pressing 'ㄷ', 'ㅂ', or 'ㅎ', a symbol is input instead of a corresponding consonant.

7-2

The embodiment (7-2) of the present invention provides a method of using the vowel input enabling key instead of the key used in the method of reducing the number of vowel input enabling key presses (the number of touches on a virtual keyboard using a touch screen) in the complex vowel input method provided in the configuration of the embodiment (7-1).

Figure 23:
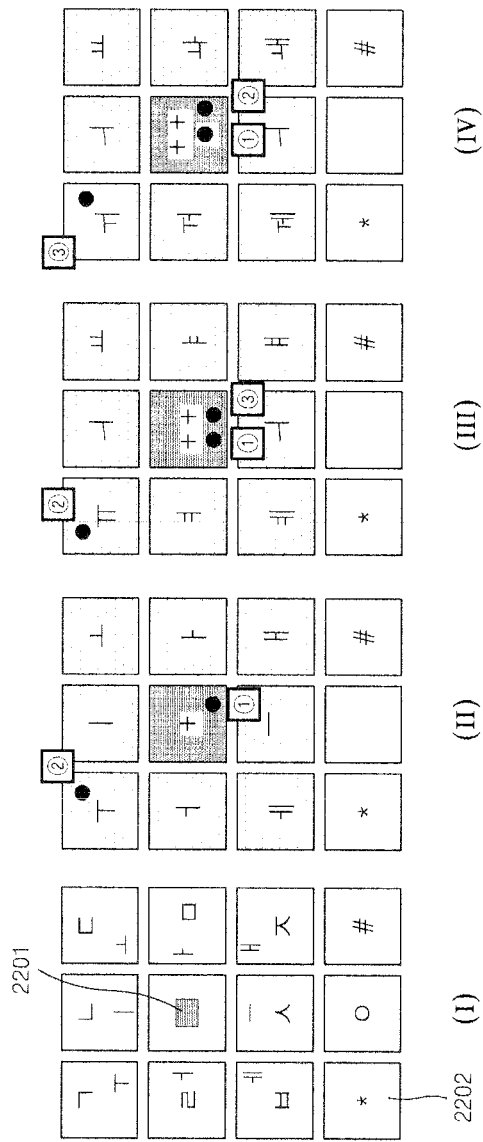

As shown in FIG. 23(III), instead of an action of consecutively pressing the vowel input enabling key twice to input a compound vowel (two touch-release actions in the touch screen method), a compound vowel can be input by inputting a simple vowel (①, ②) and then pressing the vowel input enabling key once more (③).

However, when a compound vowel ('ㅑ', 'ㅕ', 'ㅛ', 'ㅠ', 'ㅖ', 'ㅒ', or 'ㅖ') is input by the method of FIG. 23(III), a method of consecutively inputting each simple vowel forming a compound vowel cannot be performed in terms of an automata configuration. For example, when 'ㅗ' and 'ㅏ' are desired to be consecutively input to input 'ㅘ', in terms of the automata configuration of FIG. 23, 'ㅗ' and 'ㅁ' are input as a result instead of 'ㅘ'.

That is, in the keyboard layout shown in FIG. 23(I), the 'ㄷ' key must be pressed after pressing the vowel input enabling key to input 'ㅗ' and then the 'ㅁ' key must be pressed after pressing the vowel input enabling key to input 'ㅏ'. However, since the vowel input enabling key press action to input 'ㅏ' causes a process of changing the input vowel 'ㅗ' to its corresponding compound vowel 'ㅛ' instead of causing the vowel input enabling function, the last pressed 'ㅁ' key causes the consonant 'ㅁ' to be input as it is.

Thus, as shown in FIG. 23(IV), it is preferable in a case of complex vowels to use, as described above, a method of consecutively pressing a vowel input enabling key twice and then selecting a division area to which a corresponding complex vowel is allocated.

7-3

In a case of inputting a complex vowel, to increase intuition of a user in complex vowel arrangement, a method of pressing all simple vowels forming the complex vowel even though the number of key presses increases may be used.

Figure 24:
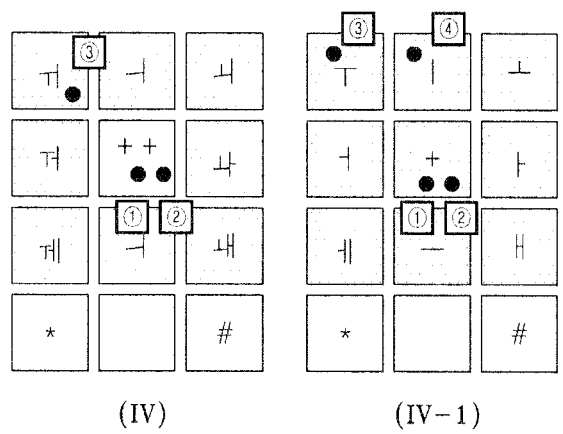

For example, for a method of inputting 'ㅜ' and 'ㅣ' to input 'ㅟ', the automata configuration shown in FIG. 23(IV) may be changed to that shown in FIG. 24(IV-1).

That is, when the vowel input enabling key is pressed twice, two keys pressed thereafter are used to input a character corresponding to a vowel.

Eighth Embodiment 8-1

In the fifth embodiment, an example in which an initial consonant and a middle vowel can be easily input by a touch and drag action has been described.

Although only a case where the middle vowel is a simple vowel has been described in the fifth embodiment, a complex vowel, such as 'ㅘ, ㅝ, ㅟ, ㅙ, ㅢ, ㅞ, or ㅚ', can be input in a similar action.

This will be described in association with the fifth and seventh embodiments.

Figure 25:
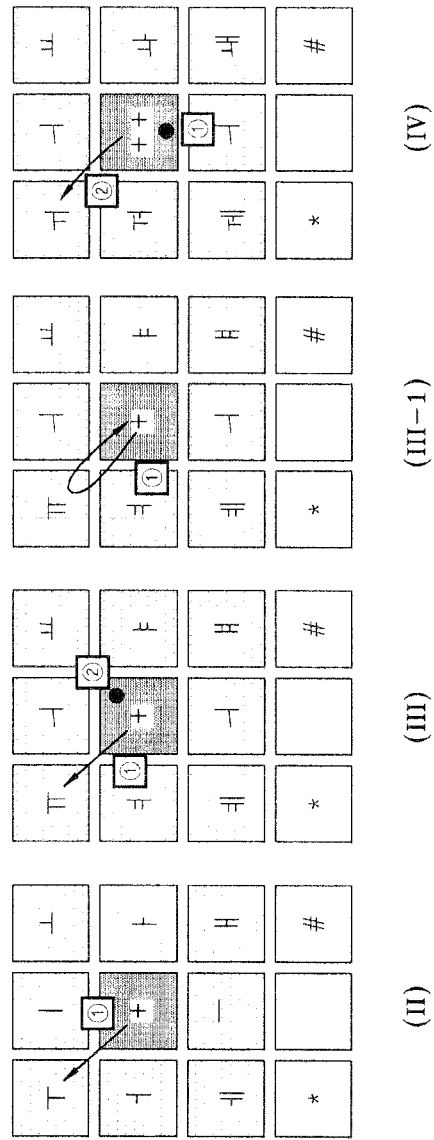

The key pressing method applied to the keypad keyboard layout of FIG. 23 can be applied to a touch screen as it is, and a case where a drag action is further used to reduce the number of key touches is shown in FIG. 25.

FIG. 25(II) shows that two touches can be replaced by one drag action as a method of inputting 'ㅏ', as well as FIG. 23(II), and FIG. 25(III) shows that 'ㅠ' can be input by one drag action and a subsequent touch-release action.

Further, FIG. 25(III-1) shows that each of all compound vowels can be input by one drag action. However, an error in the input described with reference to FIG. 25(III-1) has a higher probability of occurring than that of FIG. 25(III).

The reason is because an end point of a drag action is clear in FIG. 25(III) That is, in FIG. 25(III), a simple vowel is correctly determined, and accordingly, a compound vowel is also correctly determined. However, although FIG. 25(III-1) has an advantage that an action is not disconnected, a finger may pass through 'ㅓ' and 'ㅡ' together with 'ㅜ' during an actual finger drag action. Thus, FIG. 25(III-1) is suitable for a case where a moving trajectory is correctly achieved like a stylus pen, and is not preferable for a case where a moving trajectory is incorrectly achieved like a finger.

Finally, FIG. 25(IV) shows that a complex vowel is input by one touch-release action and a subsequent drag action. A characteristic of FIG. 25(IV) is that an input complex vowel is determined by a combination of simple vowels corresponding to start and end points of the drag action.

8-2

Figure 26:
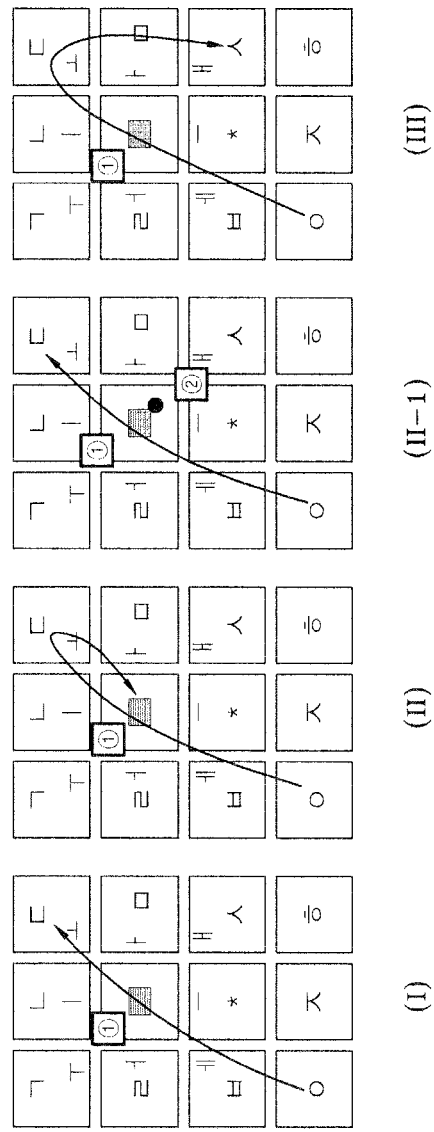

FIG. 26 shows an example of inputting 'ㅛ' (I), 'ㅛ' (II and II-1), and 'ㅖ' (III) in a drag method when a vowel arrangement by the extension key is the same as FIG. 25, and in detail, FIG. 26(I) shows a process of inputting 'ㅛ' FIG. 26(II) shows a process of inputting 'ㅛ', FIG. 26(III) shows a process of inputting 'ㅖ', and FIG. 26(II-1) shows a process of inputting 'ㅛ' by inputting 'ㅛ' and performing a touch-release of the vowel input enabling key once more to input the compound vowel 'ㅛ'.

Comparing FIG. 26(II) with FIG. 26(II-1), since a finger moving trajectory shown in FIG. 26(II) naturally passes through an area corresponding to 'ㅏ' or 'ㅣ' other than direct movement from an area corresponding to the vowel input enabling key to an area corresponding to 'ㅗ', a confusion with a process of inputting 'ㅑ' or 'ㅢ' may be caused. However, even though a finger moving trajectory shown in FIG. 26(II-1) passes through the area corresponding to 'ㅏ' or 'ㅣ' in the middle, only if a finger is released at 'ㅗ' position, the vowel input enabling key is touched again after 'ㅛ' is correctly input, so a more correct input is possible.

Unlike compound vowels, an advantage of complex vowels is that an end point of a drag action is clear, so passing points in the middle are not dealt with a big problem. For example, as shown in FIG. 26(IV), when 'ㅖ' is input, a finger passes through not only 'ㅗ' but also 'ㅣ' and 'ㅏ' during a drag action, and in this case, since an end point corresponds to 'ㅐ', only 'ㅗ' is a vowel that can be combined with 'ㅐ', and therefore, an input error that may occur in FIG. 23(III-1) is not a problem.

Figure 27:
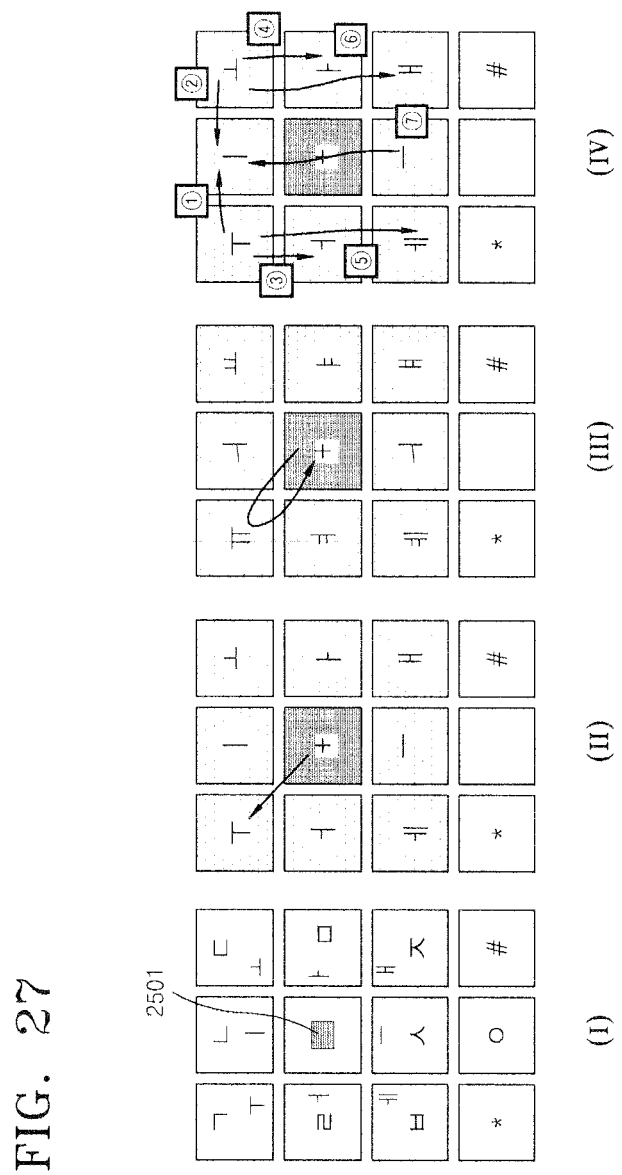
Figure 28:
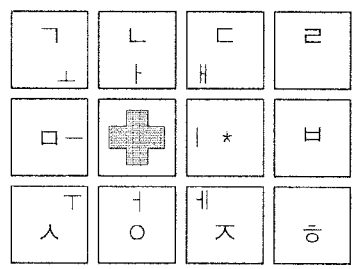
Figure 28:
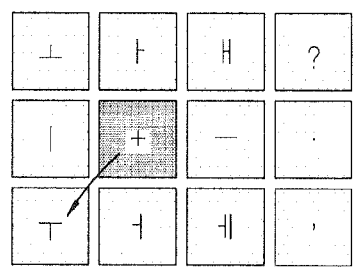
Figure 28:
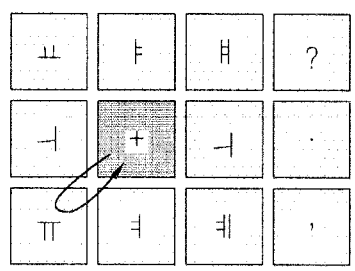
Figure 28:
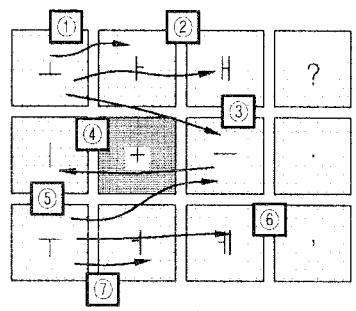

An advantage of the drag action as shown in FIG. 26 allows a touch-release action to be omitted, thereby inputting each of all vowels by one drag action, and this input method is illustrated in FIGS. 27 and 28.

A difference between FIGS. 27 and 28 is only that the arrangement of consonants and vowels is a vertical mode and a horizontal mode, respectively, and methods of inputting simple vowels, compound vowels, and complex vowels are the same except for a direction difference of 90°.

As described above, the method of inputting 'consonant'+'vowel' according to the current embodiment provides a method of easily inputting Hangul with one drag action only if users are familiar with positions of the 8 simple vowels and, guarantees a correct vowel input since areas of vowel keys defining a trajectory are exemplarily defined.

When a user performs a drag action on the input unit 110, the input analysis unit 120 according to an embodiment of the present invention may understand 1) that characters allocated to all division areas that have been touched during the drag action have been selected or 2) that only characters allocated to division areas determined as a touch greater than a predetermined area have been selected.

In addition, when the characters allocated to all division areas that have been touched during the drag action are sequentially input, the input analysis unit 120 may understand 3) that only characters that can make a syllable have been selected or 4) that a character allocated to a first selected division area and a character allocated to a division area selected in a finger release action have been selected and that only characters that can make a syllable by being interposed between the first selected character and the last selected character have been selected from among characters allocated to division areas that have been touched in the middle.

In this case, the first selected character may indicate a character selected for the first time to input an initial consonant or a middle vowel. In a case of the middle vowel, the vowel input enabling key, which is the extension key or a first touched character after the vowel input enabling key is touched, may be considered as the first selected character.

When the input analysis unit 120 makes a determination in the method of 3), to input a complex vowel at one time in the drag method, arrangement of vowels capable of preventing a misunderstanding at most is important.

For example, when 'ㅖ' is input in the past example, there is a disadvantage that it may be unclear whether 'ㅔ' or 'ㅖ' has been input when 'ㅣ' exists at a position of 'ㅏ'.

To minimize this misunderstanding, when the 8 vowels 'ㅏ, ㅓ, ㅗ, ㅜ, ㅡ, ㅣ, ㅐ, and ㅔ' corresponding to simple vowels are arranged about the vowel input enabling key, 'ㅗ' and 'ㅜ' must be arranged in corner areas of a regular quadrilateral, as shown in FIGS. 27 and 28, to input any of all simple vowels, compound vowels, and complex vowels with one drag action.

Figure 30:
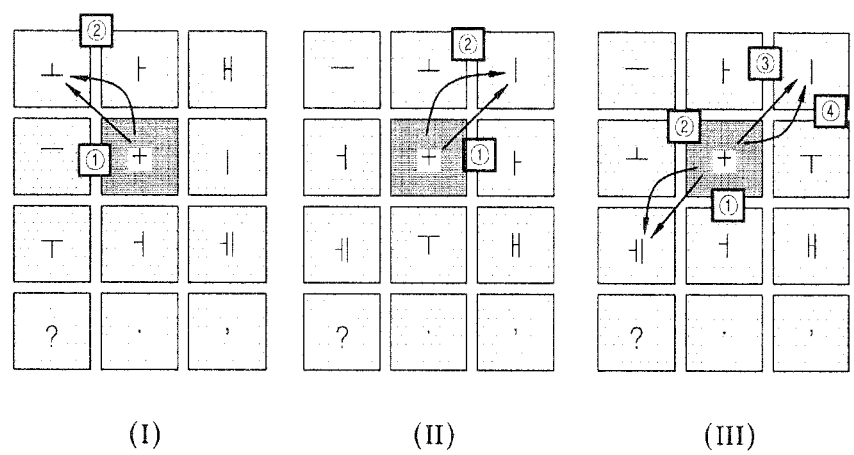

If 'ㅗ' and 'ㅜ' are arranged in corner areas, any complex vowel cannot be input by a combination of simple vowels displayed on the screen. This will be described with reference to FIG. 30. FIG. 30(I) shows that 'ㅗ' and 'ㅜ' are arranged in corner areas, wherein even though 'ㅗ' or 'ㅜ' is selected by passing through an adjacent area to input 'ㅘ' or 'ㅝ', a vowel that can be made by such a trajectory is only 'ㅘ' or 'ㅝ'.

However, when 'ㅗ' and 'ㅜ' are not arranged in corner areas, as shown in FIGS. 30(II) and 30(III), a contradiction in the character input automata configuration by which two vowels are input by a trajectory for inputting a vowel in a corner area is caused.

For example, FIG. 30(II) shows a finger's movement for inputting 'ㅣ', wherein a trajectory ① allows an area of 'ㅐ' to be actually selected without passing through an area of 'ㅏ' or 'ㅘ', thereby correctly completing an input of 'ㅐ'. However, since a probability of making the trajectory ① is almost '0' (zero), a finger's movement actually follows a trajectory ② instead of the trajectory ①. In this case, since 'ㅢ' that is not intended is input, there is substantially not a method of inputting 'ㅣ', and if the trajectory ② is designated to input 'ㅣ', a trajectory for inputting 'ㅐ' cannot be a trajectory connecting 'ㅗ' to 'ㅣ', and another trajectory must be made. However, since this violates the intuition that a complex vowel input method must be a trajectory connecting simple vowels forming a complex vowel, this causes a difficult problem, and drawing such a trajectory violating intuition on the screen is actually impossible, and a user must memorize each of such trajectories, or if the user cannot memorize any of such trajectories, this causes inconvenience that the user must study how to use the input system.

This also appears in FIG. 30(III). That is, even though the vowel 'ㅗ' is not arranged in a corner area, there is no problem as shown by trajectories ① and ② of FIG. 30(III). However, the vowel 'ㅜ' causes a problem because a trajectory for inputting 'ㅣ' overlaps with a trajectory for inputting a complex vowel 'ㅖ' as shown by a trajectory ④ of FIG. 30(III).

Thus, in a case of a simple vowel arrangement as shown in FIG. 30(II) or 30(III), and in particular, when 'ㅗ' and 'ㅜ' are not arranged in corner areas, at least one of 'ㅗ' and 'ㅜ' cannot be allowed for a trajectory for inputting a complex vowel including 'ㅗ' or 'ㅜ' to connect 'ㅗ' or 'ㅜ' to each simple vowel to form a corresponding complex vowel.

Optionally, 'ㅢ' may be considered as a complex vowel so that 'ㅢ' is input by a trajectory connecting 'ㅡ' and 'ㅣ'. To do this, since 'ㅡ' also corresponds to a first simple vowel forming the complex vowel 'ㅢ','ㅡ' must be arranged in a corner area as well as 'ㅗ' and 'ㅜ'. However, as shown in FIG. 30(I), only if 'ㅡ' is arranged to face 'ㅣ', there is no problem even though 'ㅡ' is not arranged in a corner area. Since a simple vowel for forming a complex vowel with 'ㅡ' is only 'ㅣ', even when simple vowels except for 'ㅣ' are arranged around 'ㅡ', there is no problem.

However, unlike 'ㅡ', since 'ㅗ' and 'ㅜ' must be away from a vowel 'ㅣ' in addition to 'ㅑ' and 'ㅒ' for 'ㅜ' and 'ㅕ' and 'ㅖ' for 'ㅗ', that is, since each of 'ㅗ' and 'ㅜ' must be away from 3 vowels, there is no method of arranging the simple vowels in such a way that 'ㅗ' is away from 'ㅑ','ㅒ', and 'ㅣ' and 'ㅜ' is also away from 'ㅕ','ㅖ', and 'ㅣ'. That is, a principle of the current configuration is that 'ㅗ' and 'ㅜ' must be arranged in corner areas unlike 'ㅡ'. Only if both 'ㅗ' and 'ㅜ' are arranged in corner areas, even though the remaining simple vowels are arranged anywhere, when a complex vowel is input by a drag action, the drag action does not collide with any trajectory for inputting a simple vowel.

When only one of 'ㅗ' and 'ㅜ' is inevitably arranged in a corner area, only if vowels that cannot form a complex vowel with the one not arranged in a corner area are arranged in adjacent left and right areas or adjacent upper and lower areas, there is no problem, either.

However, when only one of 'ㅗ' and 'ㅜ' is arranged in a corner area, even though drag actions for inputting a complex vowel cannot be formed, unlike shown in FIGS. 27(IV) and 28(IV) in which trajectories for inputting similar complex vowels are formed on a direct line, this not a fundamental problem. Thus, the current configuration provides a method of inputting any of all consonants and vowels by one touch by moving a finger along necessary consonants and vowels on a virtual keyboard in a touch type input device.

Figure 29:
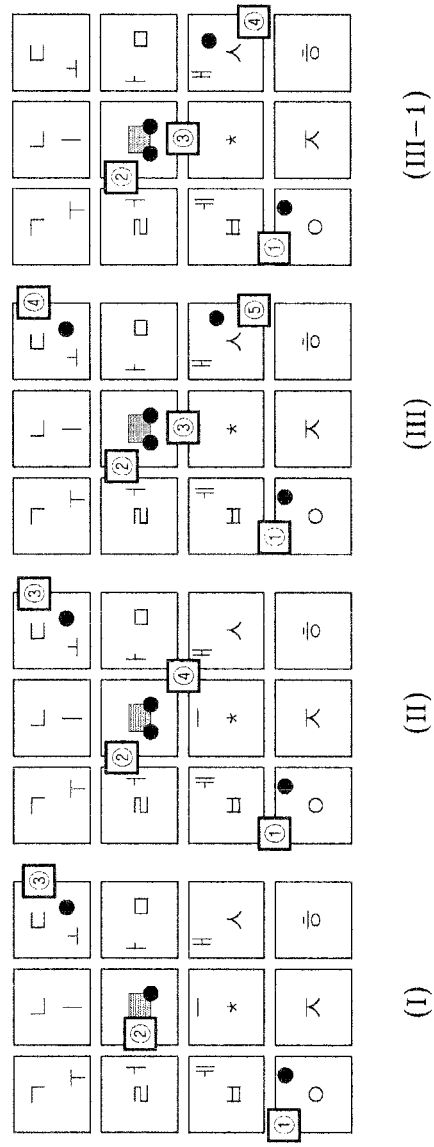

FIG. 29 shows that the drag input methods described above can one-to-one correspond to the keypad press actions shown in the second embodiment, wherein numerals denote a pressing order.

That is, keypad press actions corresponding to the simple vowel 'ㅘ', the compound vowel 'ㅙ', and the complex vowel 'ㅖ' of FIGS. 26(I), 26(II), and 26(III) are shown in FIGS. 29(I), 29(II), and 29(III), respectively. However, while the same keypad press action is performed for FIGS. 26(II) and 26(II-1), two keypad press actions may be performed for FIG. 26(□), as shown in FIGS. 29(□) and 29(□)-1). FIG. 29(□-1) shows a method according to the configuration of FIG. 23, and FIG. 29(□) shows a method according to the configuration of FIG. 24(□-1).

Ninth Embodiment

The ninth embodiment provides a method of allocating the vowel input enabling key to two keys, thereby making an input of vowels more convenient.

Figure 31:
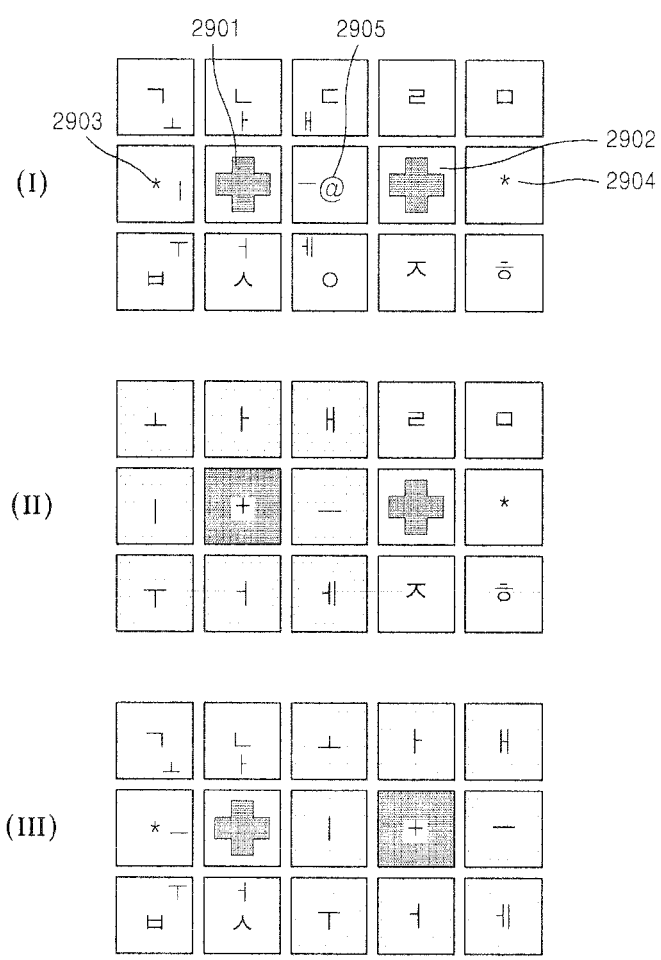

As shown in FIG. 31, when key arrangement is achieved long in a horizontal direction, a finger's movement for inputting vowels is inconvenient with one vowel input enabling key. To overcome this, by arranging vowel input enabling keys 2901 and 2902 on the left and the right, respectively, a vowel input can be easily performed, and when the key arrangement as shown in FIG. 31 is provided, both hands (both thumbs) are naturally used in general, thereby minimizing fingers' (thumbs') movement to make an input easy.

Furthermore, since consonant selection keys 2903 and 2904 are arranged on the left and the right, respectively, a non-primary character designated to each key can be easily selected, and various functions can be performed with a '@' key 2905 located in the center. For example, the '@' key 2905 can be designated as a 'space' or 'cancel' key, and can be used as a menu key for inputting various symbols by adding an extension function thereto.

Tenth Embodiment

The tenth embodiment relates to an example in which an extension key is not allocated to a specific division area, wherein it is determined according to a user's gesture whether the extension key is selected.

For example, when a consonant is input, if a finger is released after the finger moves by a predetermined direct distance from a point at which the finger has first touched a touch sensor, the function of the vowel input enabling key is enabled (this direct distance corresponds to a radius of a circle of which the center point is the first touch point, and an area outside the circle having the radius is a vowel input enabling area).

A consonant is selected as a character designated to a key of a virtual keyboard, the key corresponding to a position at which a finger first touches the touch sensor, and if the finger is released from the key in this state, another consonant is supposed to be input, and if the finger is released after moving by a predetermined distance from the first touch position, a vowel input window is enabled, thereby ready to input a vowel (if this distance is too short, the vowel input window may be enabled by accidental movement of the finger, and if the distance is too long, it is inconvenient to enable the vowel input window, so the distance may be set by a user according to convenience of the user).

This will be described with reference to the keyboard layout of FIG. 21. As shown in a consonant input window of FIG. 21(□), when '해' is input by using only one finger, without the current configuration, a user must undergo such inconvenience that a finger touches the touch sensor area to which 'ㅎ' is designated, moves to the vowel input enabling key to touch the vowel input enabling key and enable a vowel input window (FIG. 21(II), and returns to an area to which the vowel 'ㅐ' is designated.

However, with the current configuration, the user can simply input '해' by moving the finger to a key area to which 'ㅐ' is designated in a state of touching 'ㅎ', releasing the finger from the touch sensor, and touching the key area to which 'ㅐ' is designated again (however, in this case, a finger moving distance for vowel input enabling must be set shorter than a distance from a key area to which 'ㅎ' is designated to the key area to which 'ㅐ' is designated).

Furthermore, the current configuration provides an advantage that both hands can be used to input a vowel designated to a right area of the touch sensor after inputting a consonant designated to a left area of the touch sensor, thereby providing a method of increasing both convenience and efficiency in inputting.

Without the current configuration, inconvenience that a finger must move from the left to the right or from the right to the left in a state where the finger is touching the touch sensor is caused.

For example, '개' is input by touching an upper left area to which 'ㄱ' is designated with a left thumb, moving the left thumb by a distance longer than the direct distance for enabling the vowel input window, releasing the left thumb, and touching a touch sensor area to which 'ㅐ' is designated with a right thumb. Likewise, '데' is input by touching 'ㄷ' with the right thumb, moving the right thumb by a distance longer than the vowel input enabling radius, releasing the right thumb to enable the vowel input window, and touching an area to which 'ㅔ' is designated with the left thumb without moving a finger by a long distance to input 'ㄷ', move to the vowel input enabling key, and the area to which 'ㅔ' is designated, thereby removing the inconvenience caused by moving one finger by a long distance.

Thus, when a character input is performed according to the current configuration, a finger moving distance is reduced, and the finger moving distance is further reduced with both hands.

Eleventh Embodiment

In the above described embodiments, only examples in which no character is allocated to a vowel input enabling key that is an extension key and new characters are allocated to an extension area have been described.

However, a specific character can also be allocated to the extension key, as illustrated in the eleventh embodiment.

According to the eleventh embodiment, the extension key is allocated to a division area corresponding to the consonant 'ㅁ', wherein 'ㅁ' is input in a consonant input stage, and a function of the extension key is performed in a vowel input stage.

Figure 32:
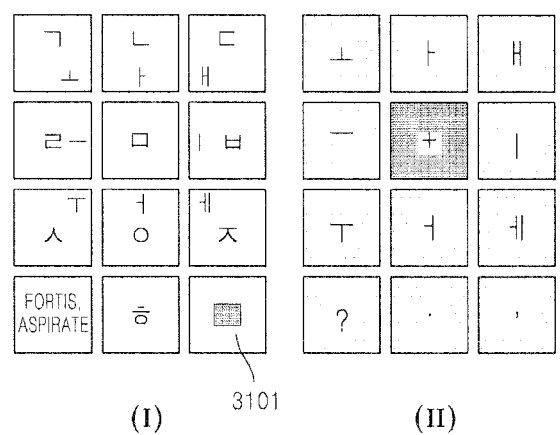

In detail, as shown in FIG. 32, a vowel input is achieved along a trajectory made by a finger about a key area to which 'ㅁ' is designated, wherein a vowel input method follows the principle shown in FIGS. 27 and 28. A consonant is input by a touch-release action on each corresponding key area.

However, any of fortis and aspirates, e.g., 'ㅋ' and 'ㄲ' can be input by inputting 'ㄱ' and then touching an 'aspirate, fortis' key to sequentially change to 'ㄱ-ㅋ-ㄲ-ㄱ'.

In more detail with reference to FIG. 32, '가' is input by touching a 'ㄱ' key area, moving a finger to a 'ㅁ' key area to enable a vowel keyboard layout, moving the finger to a 'ㅏ' key area, and releasing the finger to simultaneously input 'ㄱ' and 'ㅏ'. That is, when a finger starts to touch a consonant, passes through the 'ㅁ' key area, and is released from a desired vowel key area, the consonant corresponding to the first touch key area and the last selected vowel (a complex or compound vowel is determined according to movement of the finger in a state where the vowel keyboard layout has been enabled) are input.

However, in the case of 'ㅁ', when a finger touches the 'ㅁ' key area and is released from the same position, only 'ㅁ' is input, and if it is desired that a vowel is input together with 'ㅁ', this is achieved by moving a finger to the desired vowel key area on the vowel keyboard layout enabled when the 'ㅁ' key area is touched and releasing the finger from the desired vowel key area in the same method as the other consonants. Thus, the concept of the current configuration is that while 'ㅁ' is input when a first position at which the touch sensor is touched is the 'ㅁ' key area, the vowel keyboard layout is enabled without inputting 'ㅁ' when a finger moves to the 'ㅁ' key area in a state of touching another consonant key area. In addition, since the 'ㅁ' key cannot be used when only a vowel is input, a method of allocating a separate vowel key 3101 may be provided, wherein even when the vowel key is touched, the vowel key is enabled to input only a vowel.

Twelfth Embodiment

In the twelfth embodiment, a case where each key performs the extension key function will be described.

That is, although only the vowel input enabling key is used as the extension key in the above embodiments, an example in which each division area to which a corresponding consonant is allocated also performs the function of the extension key will be described in the twelfth embodiment.

A plurality of character sets are allocated to division areas, and when a user selects a specific division area, a plurality of characters allocated to an extension key of the division area are allocated to division areas belonging to an extension area defined by the extension key.

In this case, no character may be allocated to a division area to which an extension key is allocated (i.e., the division area is excluded from an extension area), or a character may be allocated to a division area to which an extension key is allocated as well as other division areas belonging to an extension area (i.e., the division area is included in the extension area).

Figure 33:
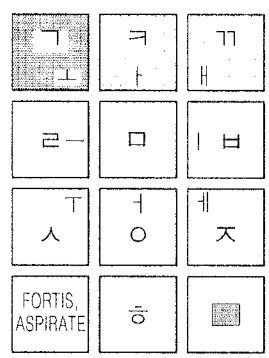
Figure 33:
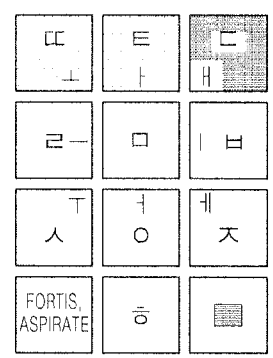
Figure 33:
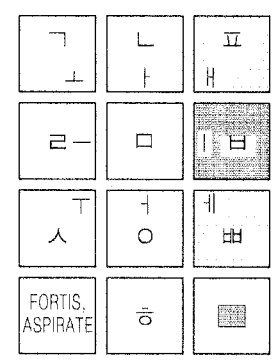
Figure 33:
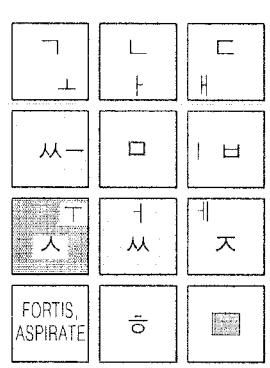
Figure 33:
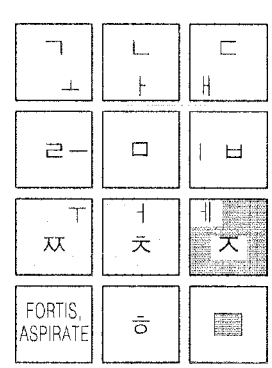
Figure 33:
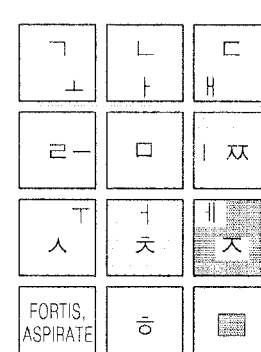

FIG. 33 shows an example in which a character is also allocated to a division area to which an extension key is allocated.

FIG. 33 shows an example in which a fortis and an aspirate corresponding to each extension key are allocated to each corresponding extension area, and performs the function of the vowel input enabling key too, as described in the eleventh embodiment.

A direction of an extension area of each division area may be freely determined by a system designer except for discriminating a consonant input according to the current configuration from a vowel input. That is, when a vowel corresponding to a fortis or an aspirate is extended from its corresponding simple consonant and selected, if a finger passes through the 'ㅁ' key area, it may cause a confusion with a vowel input, so it is preferable that a keyboard layout is arranged as shown in FIG. 33 to avoid the confusion.

As shown in FIG. 33(VI), when 'ㅊ' that is an aspirate of 'ㅈ' and 'ㅉ' that is a fortis of 'ㅈ' are orthogonally arranged, a finger's movement for selecting 'ㅉ' is reduced in comparison with FIG. 33(V).

Thirteenth Embodiment

The thirteenth embodiment has a feature in that a consonant and the extension key function are allocated to each division area, and when each extension key is selected, vowels in addition to a fortis and an aspirate of a consonant allocated to its corresponding division area are allocated to an extension area defined by the extension key so that a user can select a fortis or aspirate and a vowel at one time.

As shown in FIG. 34(I), when a virtual keyboard in the touch input method can secure enough space to provide a spare space of one column on the left and the right of 12 key areas to which consonants are allocated, the current configuration is applicable to the virtual keyboard.

This will be described with reference to FIG. 34. A keyboard layout of the virtual keyboard before a finger touches thereon has an arrangement in which consonants are allocated to 10 keys, as shown in FIG. 34(I). If a 'ㄱ' key area is touched in this state, the vowel arrangement according to the ninth configuration of the present invention is displayed around the 'ㄱ' key area (refer to FIG. 34(II)), and in this state, an input of a desired vowel is achieved by a drag action, as shown in FIGS. 27 and 28, thereby simultaneously inputting a consonant and a vowel by one touch.

Figure 34:
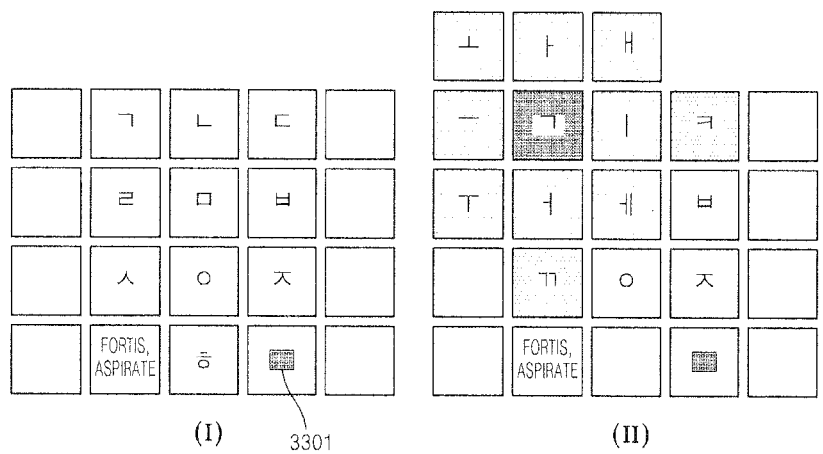
Figure 34:
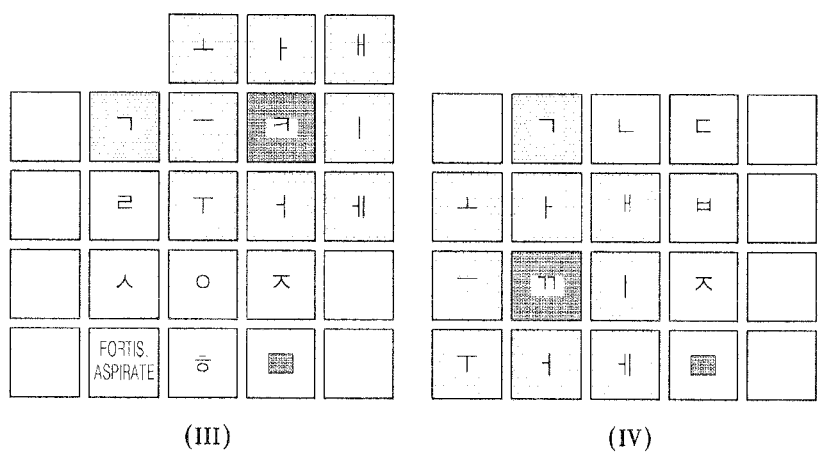

If '카' or '까' is desired to be input, a syllable to which 'ㅋ' or 'ㄲ' is combined instead of 'ㄱ' is input by moving a finger to a 'ㅋ' key area (refer to FIG. 34(III)) or 'ㄲ' key area (refer to FIG. 34(IV)) to perform a drag action for a vowel input in a state of touching the 'ㄱ' key area.

Figure 35:
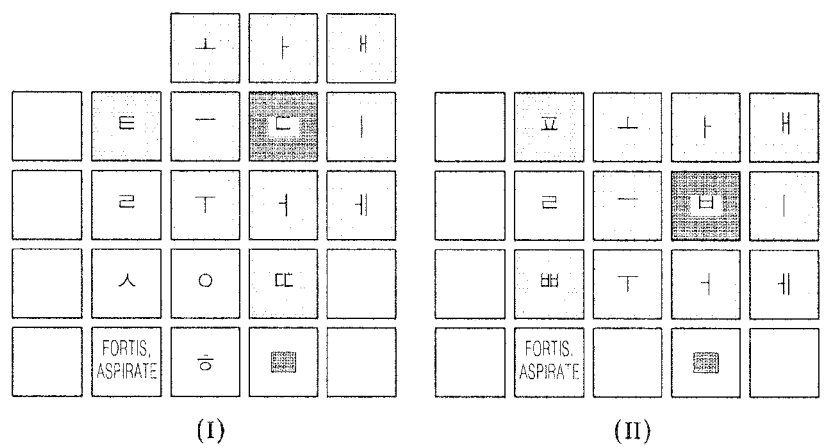
Figure 36:
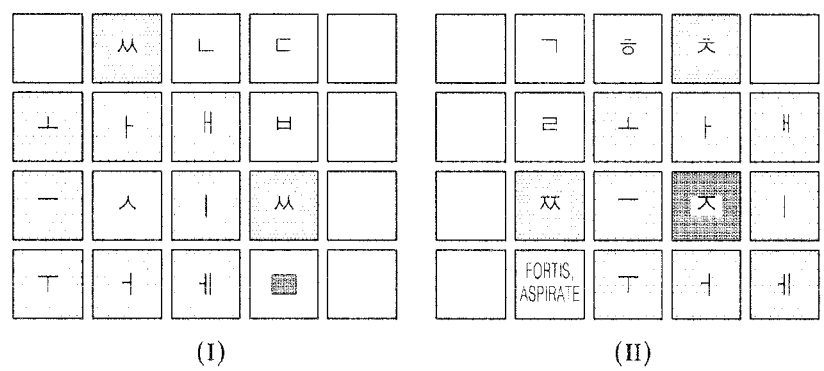
Figure 37:
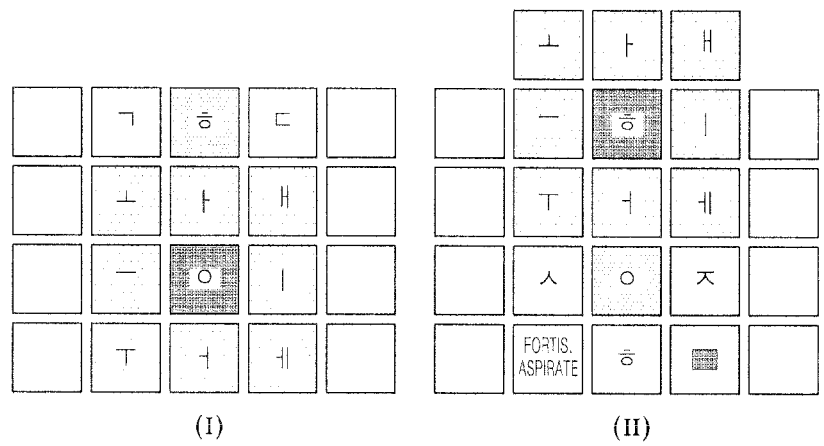
Figure 38:
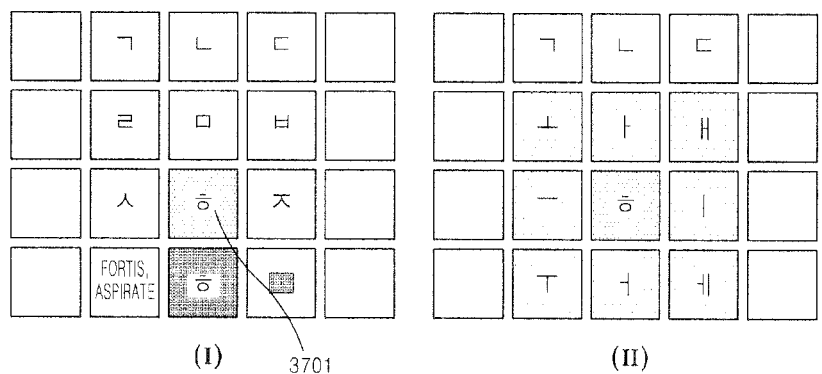
Figure 38:
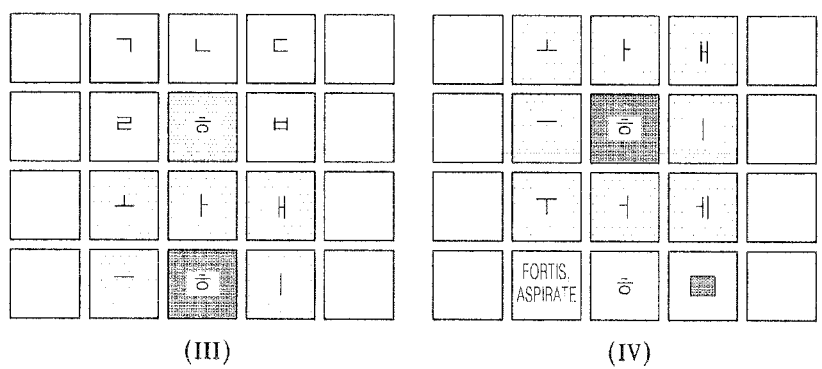

FIG. 35 shows arrangements of vowels and consonants corresponding to 'ㄷ' and 'ㅂ' and FIG. 36 shows arrangements of vowels and consonants corresponding to 'ㅅ' and 'ㅈ'. FIGS. 37 and 38 show extended arrangements of vowels and consonants corresponding to 'ㅇ' and 'ㅎ'.

Here, 'ㅇ' does not have a fortis or aspirate to be extended, unlike 'ㄱ, ㄷ, ㅂ, ㅅ, and ㅈ'. However, in the consonant arrangement shown in FIG. 33, a space for extending and arranging vowels is insufficient for 'ㅎ'. To complement this, a method of designating 'ㅎ' as an extended consonant of 'ㅇ' and arranging a keyboard layout as shown in FIG. 37 to input a vowel together or allocating an extended 'ㅎ' key 3701 to the 'ㅎ' key to display a vowel arrangement when a finger moves to an area of the extended 'ㅎ' key 3701 in a finger touch state on the 'ㅎ' key to input a vowel together may be provided.

Thus, a simultaneous input of 'consonant+vowel' according to a vowel arrangement around each consonant key area, as shown in FIGS. 34 to 38, more effectively increases the advantages of the present invention, thereby enabling an input of every consonant and vowel by one touch.

Fourteenth Embodiment

The fourteenth embodiment relates to fortis and aspirate keys. In the above described embodiments, the fortis and aspirate keys are input by inputting a consonant and then changing the input consonant to a fortis or aspirate. This causes a decrease on continuity when a simultaneous input of 'consonant+vowel' is desired according to an embodiment of the present invention.

Thus, according to the fourteenth embodiment, when a fortis and aspirate key is touched after a simultaneous input of 'consonant+vowel' is performed, the already input consonant is changed to a fortis or aspirate.

For example, after '가' is input by simultaneously inputting 'ㄱ' and 'ㅏ' by a drag action, if the fortis and aspirate key is touched, the already input syllable '가' is changed to '카', and if the fortis and aspirate key is touched once more, '카' is changed to '까'.

Thus, changes of 'ㄷ→ㅌ→ㄸ→ㄷ', 'ㅂ→ㅍ→ㅃ→ㅂ', 'ㅅ→ㅆ→ㅅ', and 'ㅈ→ㅊ→ㅉ→ㅈ' are achieved even after a vowel is input.

Further, a change of 'ㅇ' to 'ㅎ' may be achieved in the same method. For example, if the fortis and aspirate key is touched after '아' is input, '아' is changed to '하'. Furthermore, if the fortis and aspirate key is touched after '하' is input, '하' is changed to '아' again.

This configuration has an advantage in that an action for selecting a fortis or aspirate of a consonant, which is shown in FIGS. 33 to 38, is omitted, and a consistent action is maintained by touching the fortis and aspirate key. That is, a user does not have to worry about positions of 'ㅋ' and 'ㄲ' any more only if the user memorizes a position of 'ㄱ', and furthermore, the user does not have to worry about positions of 'ㅌ', 'ㄸ', 'ㅍ', 'ㅃ', 'ㅆ', 'ㅊ', 'ㅉ', and 'ㅎ' causing an advantage that a character input is much simpler.

The input system according to an embodiment of the present invention is applicable to not only Hangul but also systems for inputting foreign languages, such as English and Hindi.

First, in the case of English, since a consonant frequently comes immediately after a consonant, a separate vowel input enabling key, as in the case of Hangul, may not be a big advantage.

Instead, when a word prediction input system is introduced, the concept of an extension key of the present invention may be a very convenient tool in a character input.

According to the word prediction input system, when a plurality of characters are allocated to a single division area, words that can be made by combining characters allocated to a division area selected by a user are predicted and displayed to the user and if the user selects one of the words, the selected word is input.

That is, there is a difference in that an input is achieved on a word basis instead of character basis.

In this case, the kinds of words that can be made by combining characters allocated to a division area selected by the user are allocated to an extension area defined when the user selects an extension key, the user may select a division area to which a word to be input among the words is allocated to input the word desired by the user.

Detailed examples will be described with reference to the accompanying drawings.

Fifteenth Embodiment

According to a typical English keyboard layout for keypad mobile phones, as shown in FIG. 39(I), a text symbol is designated to the '1' key (or 'QZ@' may be designated to the '1' key, and text symbols may be divided and designated to corresponding keys through a mode change), and 26 letters are designated to the '2' to '9' keys. In a configuration of the current embodiment, symbols or characters are not designated to one of the numeric keys in order to allow the key to perform an extension key function for selecting a predicted word.

An example in which the '5' key is designated as an extension key to satisfy this purpose for user convenience as well as Hangul will be described below. The letters are designated to the '1' key to the '9' key except for the '5' key 3801 to which no character is designated, like the vowel input enabling key of Hangul, (numeral '5' can be designated thereto) so that the '5' key 3801 acts as a function key for simply selecting a predicted word instead of being used to input a character. While the vowel input enabling key is used to input a vowel in Hangul, the extension key 3801 corresponding to the vowel input enabling key may be used for the selection of a predicted word and a text symbol input in a predictive text input method.

Figure 40:
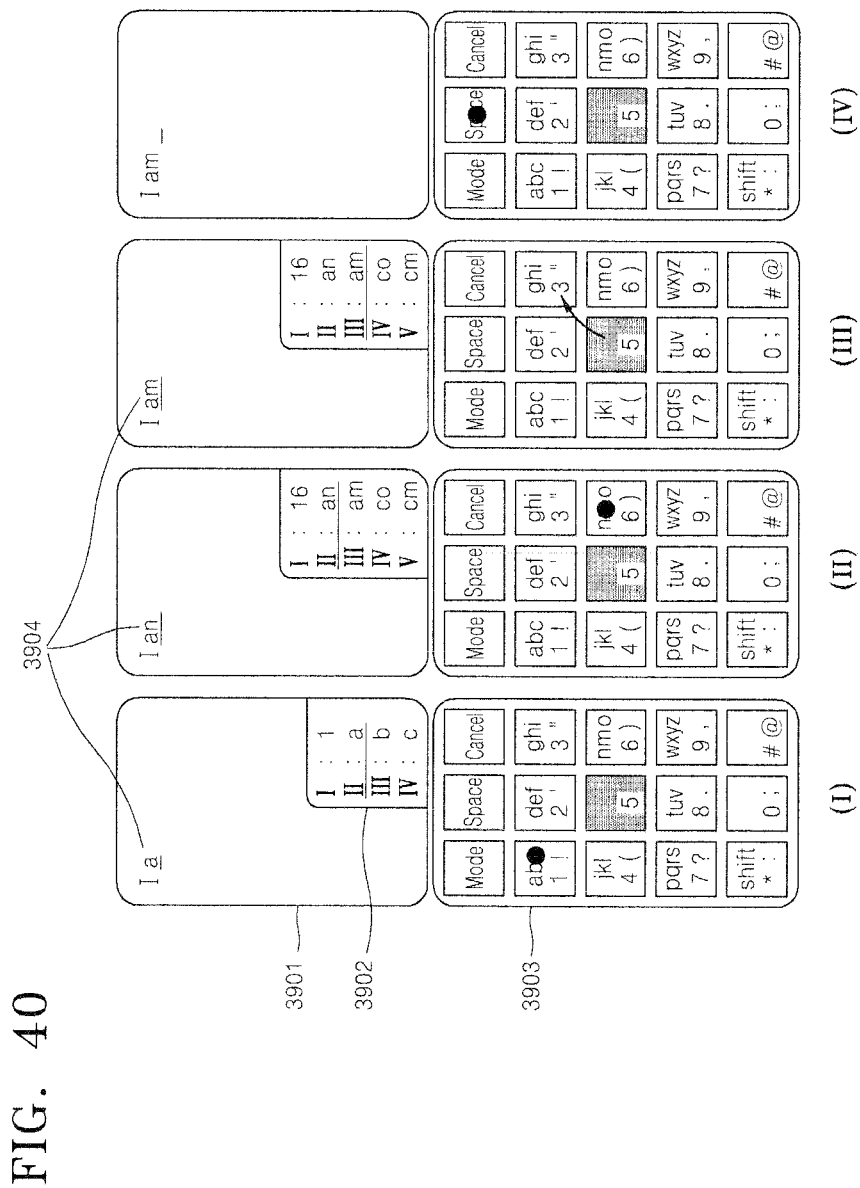

An example in which an extension key is applied to a touch type virtual keyboard system is shown in FIG. 40. FIG. 40 shows a stage of inputting 'am' in a process of inputting a sentence 'I am a boy.' in a touch screen type input device. When 'T9' of Nuance, which is a well-known predictive text input system, is referred to (www.t9.com), if a touch-release action of a finger on the '1' key ('1', 'a', 'b', and 'c' are designated thereto) and the '6' key ('6', 'm', 'n', and 'o' are designated thereto) in a virtual keyboard 3903 to input 'am' (hereinafter, when the virtual keyboard input system using a touch screen or a touch pad is shown in FIGS. 40 to 61, a dark circle denotes a touch-release action, and a line with an arrow denotes a drag action in which its tail part indicates a first touch point and its arrow head indicates a release point. This is the same marking method as shown in FIG. 25, the number of predicted numerals and words is 5, such as '16', 'an', 'am', 'co', and 'cm', that are listed in predicted word list window 3902, and 'an' having the highest usage frequency is temporarily input to input window 3901 (refer to FIG. 40(□)). As shown in FIG. 40, a word input into the input window is displayed with an underline, which indicates that the word input into the input window is a temporarily input word and a word prediction state is still maintained.

Thereafter, when a finger touches the extension key, moves to the '3' key by a drag action in a non-releasing state, and releases the finger from the '3' key, 'am' is finally input (refer to FIG. 40(□)), and a space key is touched to input 'space' in this state (refer to FIG. 40(□)).

Figure 41:
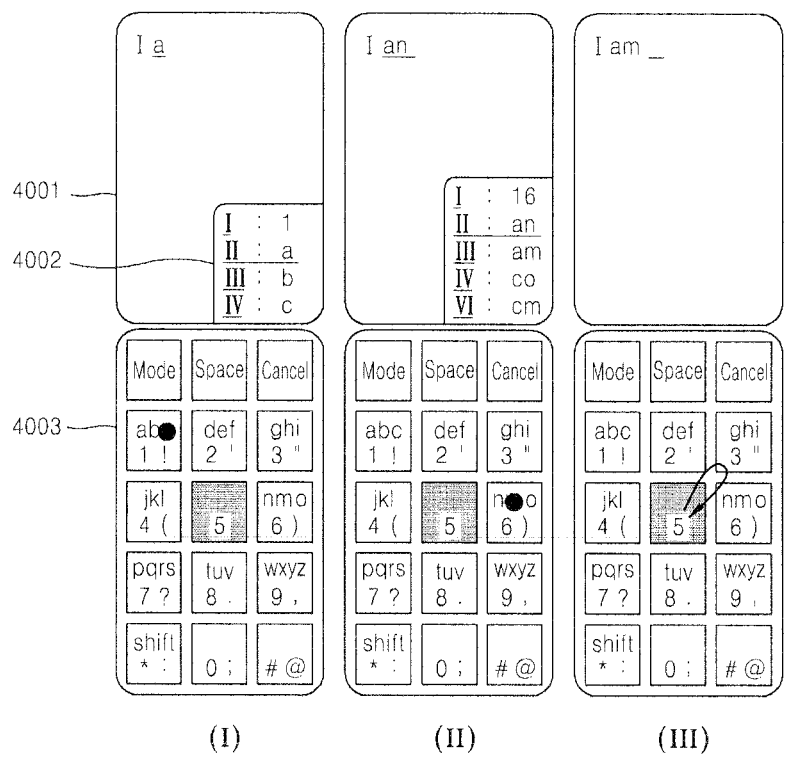

A method of inputting 'space' through the space key that is shown in FIG. 40(□) can be more simply achieved by one drag action as shown in FIG. 41(□). That is, although two touch actions are required to select a predicted word (refer to FIG. 40(□)) and input 'space' (refer to FIG. 40(□)) in FIG. 40, a work corresponding to the two touches is completed by one touch-drag action in FIG. 41.

Figure 42:
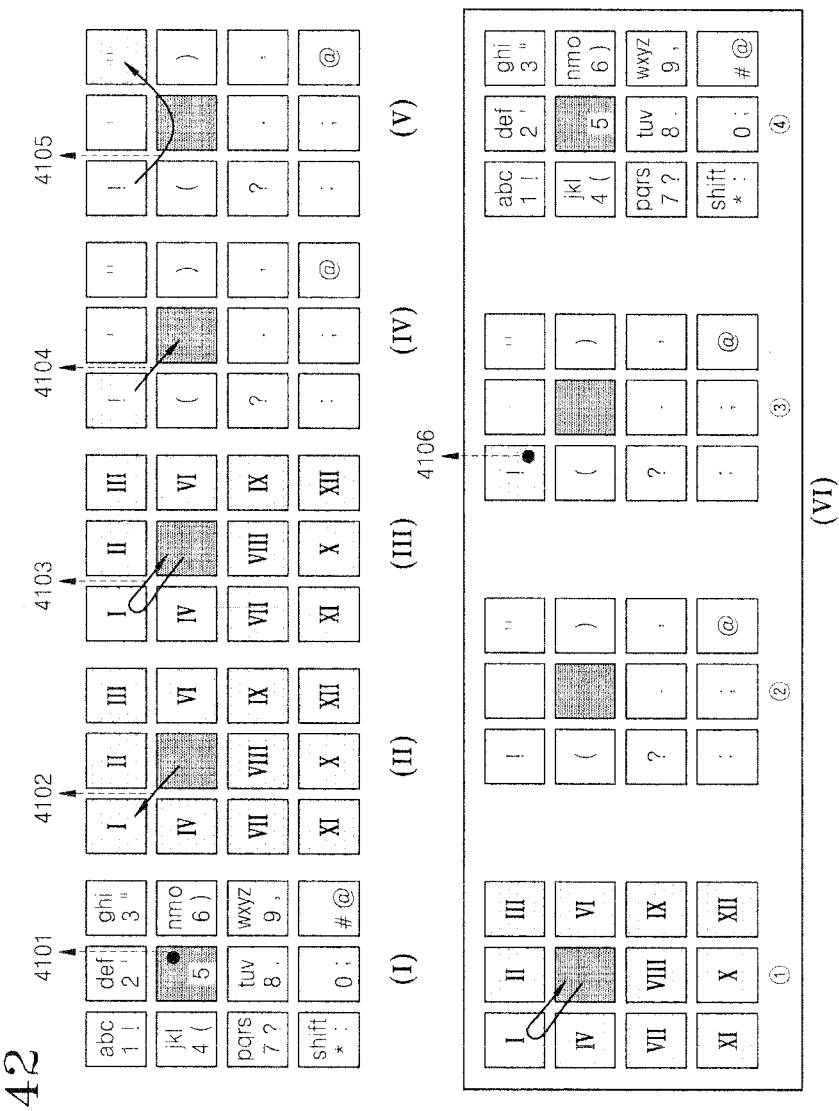

This operating principle of the extension key is described with reference to FIG. 42 in which a simple extension key touch 4101 allows the numeral '5' to be input (refer to FIG. 42(□)), and drag actions 4102 and 4103 starting from the extension key that are shown in FIGS. 42(□) and 42(□), respectively, allow selection of a predicted word instead of an input of a character or a numeral ('5'). However, the drag action 4102 starting from the extension key and ending at another key that is shown in FIG. 42(□) completes a selection and input of a predicted word, and the drag action 4103 returning to the extension key again as shown in FIG. 42(□) simultaneously achieves a selection and input of a predicted word and an input of 'space'.

According to a drag action 4104 shown in FIG. 42(□), a symbol designated to a key from which the drag has started is input when the dragging starts from a key other than the extension key and ends at the extension key releasing the finger from the extension key.

Thus, when the extension key is used according to the current configuration, a selection/input of a predicted word, an input of 'space', and an input of a symbol can be easily achieved by the '1' to '9' keys (if necessary, the '0' key, the '#' key, and the '*' key may be additionally utilized), thereby providing an input system by which one-thumb operation can be easily performed. That is, a more easy input method than QWERTY keyboards requiring both hands can be provided.

That is, the use of the extension key does not require a finger to move to the predicted word list window 3902 for a selection/input of a predicted word and allows a desired word to be easily selected. Since the use of the extension key does not require a user to directly select a desired word from the predicted word list window 3902, the use of the extension key does not care even if a size of the predicted word list window 3902 is small and can also solve inconvenience that the input window 3901 is blocked by the predicted word list window 3902.

In the case of English, 'space', which is most frequently used in a text input process, may be designated to the extension key to further reduce a finger's movement. To do this, there may be no problem to input a numeral '5' by employing a separate virtual keyboard mode for inputting the numeral '5' or designating the numeral '5' to a key other than the extension key.

Figure 59:
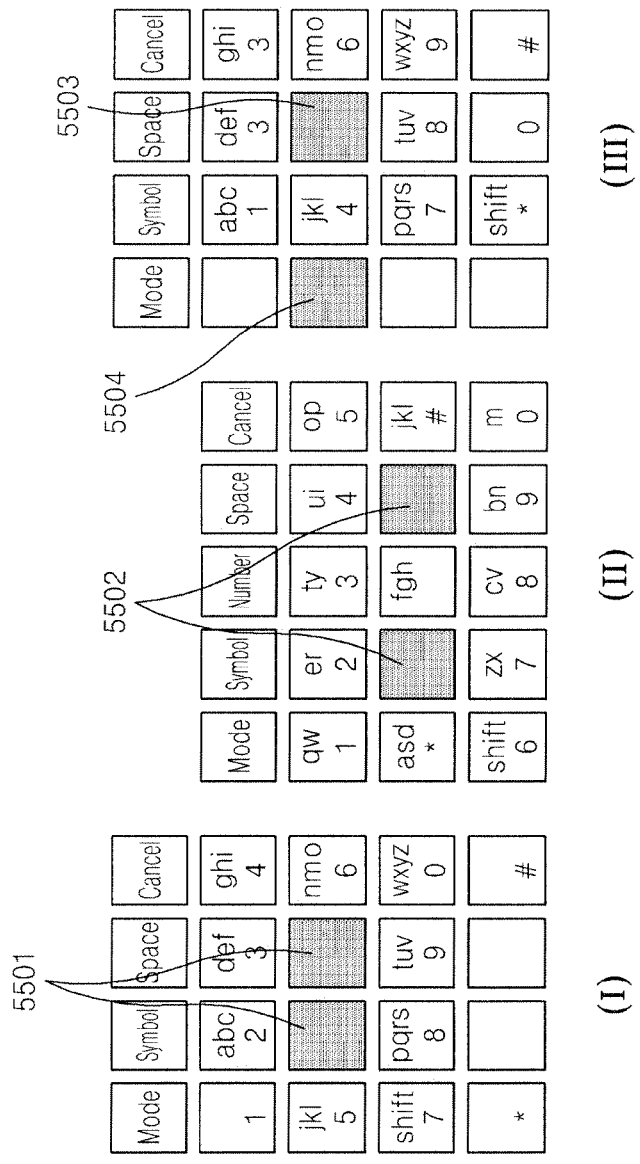

For example, a key arrangement shown in FIG. 59(□) or 59(□) shows a structure in which the numeral '5' does not have to be designated to the extension key, and in this case, the extension key can perform a 'space' input function without affecting a numeral input function.

When the extension key performs the 'space' input function, if a predicted word in temporary input state 3904 (marked as a temporary input state by underlining the word or changing a background color of the word) displayed in the input window is to be input, a touch-release of the extension key may change the temporary input state to the confirmed state (the underline of the temporarily input word disappears) and simultaneously allow 'space' to be input, thereby performing the predicted word selection and the 'space' input by one touch-release action.

When the word prediction state ends, the extension key simply performs only the 'space' input function. If the extension key is set in the word prediction state not to perform any function by a simple touch-release action not accompanying a drag action, the extension key may work as a finger resting area. In addition, when the word prediction state is ended or not started, if an action of moving a finger from the extension key to another key and releasing the finger there is defined as a key input function of the key corresponding to a position at which the finger is released instead of the predicted word selection function described above, even though a first finger touch key is the extension key, a key selection for a character input may be easily performed. Furthermore, if a shift function is added to this action, a separate action for inputting the shift key to capitalize a first letter of a word may be omitted. For example, if a finger touches the extension key, moves to a 'ghi' key by a drag action in this state, and is released from the 'ghi' key, capital letters 'G', 'H', and 'I' of 'g', 'h', and 'i' are displayed in the predicted word list window instead of 'g', 'h', and 'i' so that a word of which a first letter is capitalized is ready to be input.

As described above, a core point of the current configuration is to provide a more convenient input method than a QWERTY keyboard only with 10 numeric keys by performing various functions with one extension key.

That is, as shown in FIG. 42, in the case of a touch screen or touch pad input system, convenience and efficiency in a character input may increase by allocating different functions to various actions, such as a simple touch-release action and a drag action, using the extension key.

In a touch screen or touch pad input method shown in FIG. 42, actions using the extension key are: first, the simple touch-release action 4101 with the extension key; second, the action 4102 of touching the extension key and selecting another key by a drag action; third, the action 4103 of touching the extension key, selecting another key by a drag action, and returning to the extension key; fourth, the action 4104 of touching a key other than the extension key and selecting the extension key by a drag action; and fifth, an action 4105 of touching a key other than the extension key, passing through the extension key by a drag action, and selecting another key by the drag action.

As described above, the first action 4101 has a function of inputting the numeral '5' or a function of inputting 'space', and simultaneously inputting a temporarily input word and 'space' when the word prediction state is active.

The second action 4102 performs a function of inputting a predicted word, and the third action 4103 performs a function of simultaneously inputting a predicted word and inputting 'space'. The fourth action 4104 may perform a function of inputting a symbol designated to each key, and the fifth action 4105 may perform a function of amending a symbol input.

FIG. 42 shows a key color change and a change of characters designated to each key occurring as a result of a finger's movement using the extension key on a virtual keyboard.

FIG. 42(☐) shows the virtual keyboard with no change, informing of a state where no key input is performed before the extension key is touched.

That is, since the word prediction state is not active yet, the predicted word list window does not appear in the input window, and even if a finger moves to a key around the extension key, a predicted word selection is not performed.

However, if the word prediction state is activated by performing a key input before the extension key is touched (a state where the predicted word list window appears in the input window), it may be set as shown in FIGS. 42(☐) and 42(☐) that each key area is changed to a yellow color as soon as a finger touches the extension key. This indicates that the word prediction state has already been activated, informing a user that, if the user drags a finger to a key around the extension key and releases the finger in this state, a predicted word corresponding to a number designated to the key at a finger release position is input. Numbers displayed on corresponding keys correspond to list numbers of the predicted word list window.

FIGS. 42(☐) and 42(☐) show that there is no color change on each key but a character displayed on each key is a symbol, unlike FIG. 42(☐), informing the user that a symbol input state has already been activated before the extension key is touched. In particular, FIG. 42(☐) shows that only the '1' key to which '!' (symbol indicating an exclamation mark) is designated is displayed yellow, indicating that a first touch position before a finger moves to the extension key corresponds to the '1' key, and FIG. 42(☐) shows that the '3' key to which (symbol indicating a double quotation mark) is designated is displayed yellow, indicating that a double quotation mark is input when a finger is released.

What is illustrated in the above is an example of variations on a virtual keyboard associated with a finger to a finger's operating the extension key and can be changed to be suitable for functions set to a fingerer's operating r operating the extension kelike in FIG. 42(I)~(V)

Figure 43:
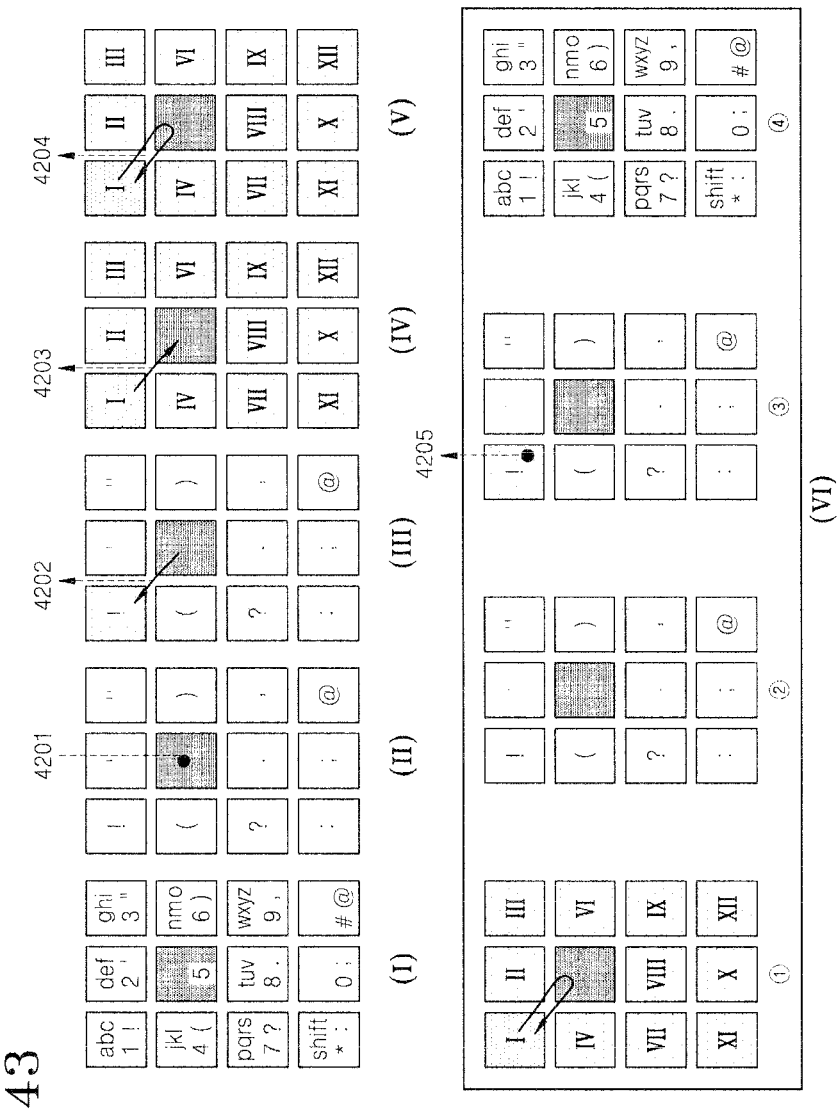

FIG. 43 shows another example of the extension key operating method shown in FIG. 42, and a difference is that actions for a symbol input and a predicted word input are interchanged. That is, in FIG. 43, a symbol is input by first touching the extension key, selecting a desired key by a drag action, and releasing a finger (4202), and when the word prediction state is active, a predicted word is input by first touching a key corresponding to a number of the predicted word to select the predicted word, moving a finger to the extension key by a drag action, and releasing the finger from the extension key (4203).

That is, since an action for inputting a predicted word ends at the extension key instead of starting from the extension key, no change occurs on the virtual keyboard unless a finger moves to the extension key, and only if a finger moves to the extension key, a color of a first touch key is changed to blue to indicate a position of the first touch key while colors of the other keys are changed to yellow, as shown in FIG. 43(☐).

Furthermore, there is no problem even though the drag action in FIG. 43(☐) performs the same function when the finger moves by more than a predetermined distance from a position of the first touch key so that there is no need to drag and release the finger particularly at the extension key.

FIG. 43(☐) shows an action 4204 for selecting and inputting a temporarily input word and simultaneously inputting 'space' by returning a finger to a first touch key and releasing the finger. Since 'space' is actually more frequently used in English than any other language, the drag actions in FIGS. 42(☐) and 43(☐) are set to simultaneously input a temporarily input word and 'space', and the drag actions in FIGS. 42(☐) and 43(☐) are set to input only a temporarily input word, thereby reducing a finger moving distance since the case of inputting of 'space' after a word is more frequent than the case of inputting no 'space' after a word.

Moreover, when a drag action starting from the extension key and returning to the extension key do inputting a predicted word without 'space', a symbol input is achieved by a simpler action than the two drag actions shown in FIGS. 42(□) and 42(□) since the drag action starting from the extension key and returning to the extension key (refer to FIG. 42(□)-□) displays a symbol keyboard layout on the screen (refer to FIG. 42(□)-□) and input of a symbol is done by a touch-release of a key to which a symbol to be input is designated (refer to FIG. 42(□)-□).

In particular, the case where the symbol keyboard layout is displayed during the drag action (refer to FIG. 42(□)-□) is better than the case of FIG. 42(□) in that a symbol to be input can be easily selected since the touch-release action (refer to FIG. 42(□)-□) for a symbol input is achieved while viewing the symbol keyboard layout displayed on the screen. If a numeral or another character is supposed to be input by escaping from a symbol input ready state of FIG. 42(□)-□, the user may escape from the symbol input process by a touch-release of the extension key on the symbol keyboard layout. To do this, the extension key on the symbol keyboard layout may perform the 'space' input function or perform a function of escaping from the symbol input process without any other function, and this may be determined according to a configuration of a word prediction method.

In addition, a simple symbol input process (refer to FIG. 43(□)) may be achieved by applying the process shown in FIG. 42(□) to the drag action in FIG. 43(□).

Figure 44:
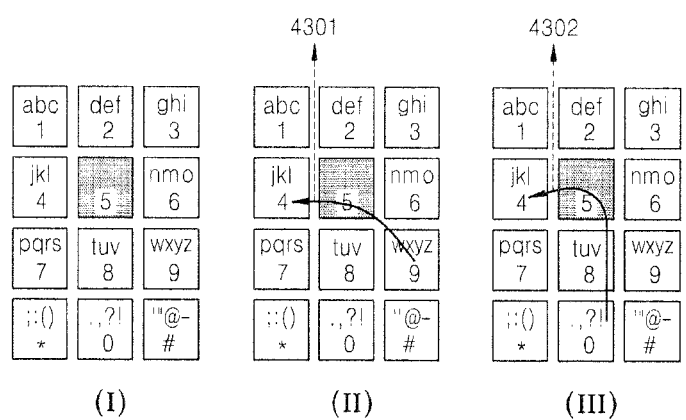

FIG. 44 shows an example of a virtual keyboard in which only characters and symbols are designated to corresponding keys except for numerals, showing an example in which a drag action 4301 or 4302 passing through the extension key performs a function of inputting one of the characters designated to each key when such a virtual keyboard is used. That is, in a state where a finger touches the '9' key to which 'xwyz' is designated, a fourth character 'z' of 'x, w, y, and z' is input when the finger is released after moving to the '4' key to which 'jkl' is designated, a first character 'x' is input when the finger is released after moving to the '1' key, 'w' is input when the finger is released after moving to the '2' key, and 'y' is input when the finger is released after moving to the '3' key.

That is, when a key corresponding to a last finger release position is the '1' key, the '2' key, or the '3' key, a first, second, or third character is input, respectively. So a specific character or symbol can be input from among a plurality of characters and symbols designated to each key while the prediction state is active even though more than 4 characters are designated to each key, since a key corresponding to a last finger release position may vary.

Moreover, if the extension key does not perform the 'space' input function, the numeral '5' can be input by the '5' key, so an input of each numeral can be performed by a drag action as shown in FIG. 43.

For example, since characters designated to the '1' key are 4 kinds, i.e., 'a, b, and c' in addition to the numeral '1', a desired one of the characters including a numeral designated to each key can be input by setting a drag action starting from the '1' key through the extension key and ending at the '4' key to input the numeral. In general for the case of the '1' key, all the words starting with 'a', 'b', 'c' or '1' which are designated to '1' key will be searched in the predictive text input method (disambiguation methodology). If a key input is achieved by an action as shown in FIG. 44, only words related to only one of 'a', 'b', 'c', and '1' are searched for without searching for words related to all of 'a', 'b', 'c', and When the predictive text input (disambiguation methodology) cannot be applied, e.g., inputting a proper noun, the predictive text input method must be changed to a mode (like the multi-tap method for mobile phones) which is capable of inputting each character constituting the word. However, if a configuration of an input device is set to input each character in the drag method shown in FIG. 44, there is no need to change the virtual keyboard mode (e.g., a change to the multi-tap method) and the same virtual keyboard (keyboard layout) can be used even for a word that is difficult to input with the predictive text input method.

Figure 45:

FIG. 45 shows an example in which the function shown in FIG. 42 is performed by a touch-drag action using the extension key. This is a process of inputting 'boy', which is the last word of a sentence 'I am a boy.'. In a case of 'boy', the '1', '6', and '9' keys are consecutively touched (refer to FIGS. 45(I), 454(II) and 45(III)), and then to select 'boy' from among 9 predicted words, a word corresponding to a list number 'III' is selected and input by a drag action starting from the extension key (refer to FIG. 45(IV)). Thereafter, to input a period (.) in the method shown in FIG. 42(IV), a drag action starting from the '8' key and ending at the extension key is performed (refer to FIG. 45(□)).

As shown in FIG. 45(□), in the case of 'boy', the number of predicted words is 9. To list the 9 predicted words on a screen and directly select one of them, a predicted word list window must be large, and to select a desired word from this large predicted word list window 4401, a finger has to move by a long distance on a virtual keyboard, and worse, if the number of predicted words is larger than the case of 'boy', an area for selecting a word increases, thereby causing inconvenience that the entire input window is hidden.

However, according to FIG. 45, a key corresponding to a list number of a desired predicted word in the predicted word list window is selected by a drag action using the extension key. According to this predicted word listing and selecting method, a key input for word prediction and a selection of a predicted word are achieved within a joint motion range of one finger (thumb), thereby easily selecting and inputting a desired word from among predicted words. Moreover, since a finger does not have to touch an area of the predicted word list window, even if a size of the predicted word list window is reduced enough to a size that can be recognized, there is no problem.

Accordingly, the problem that the predicted word list window hides the input window is also naturally solved. This is an advantage caused by a predicted word selection method shown in FIG. 45(□).

Figure 46:
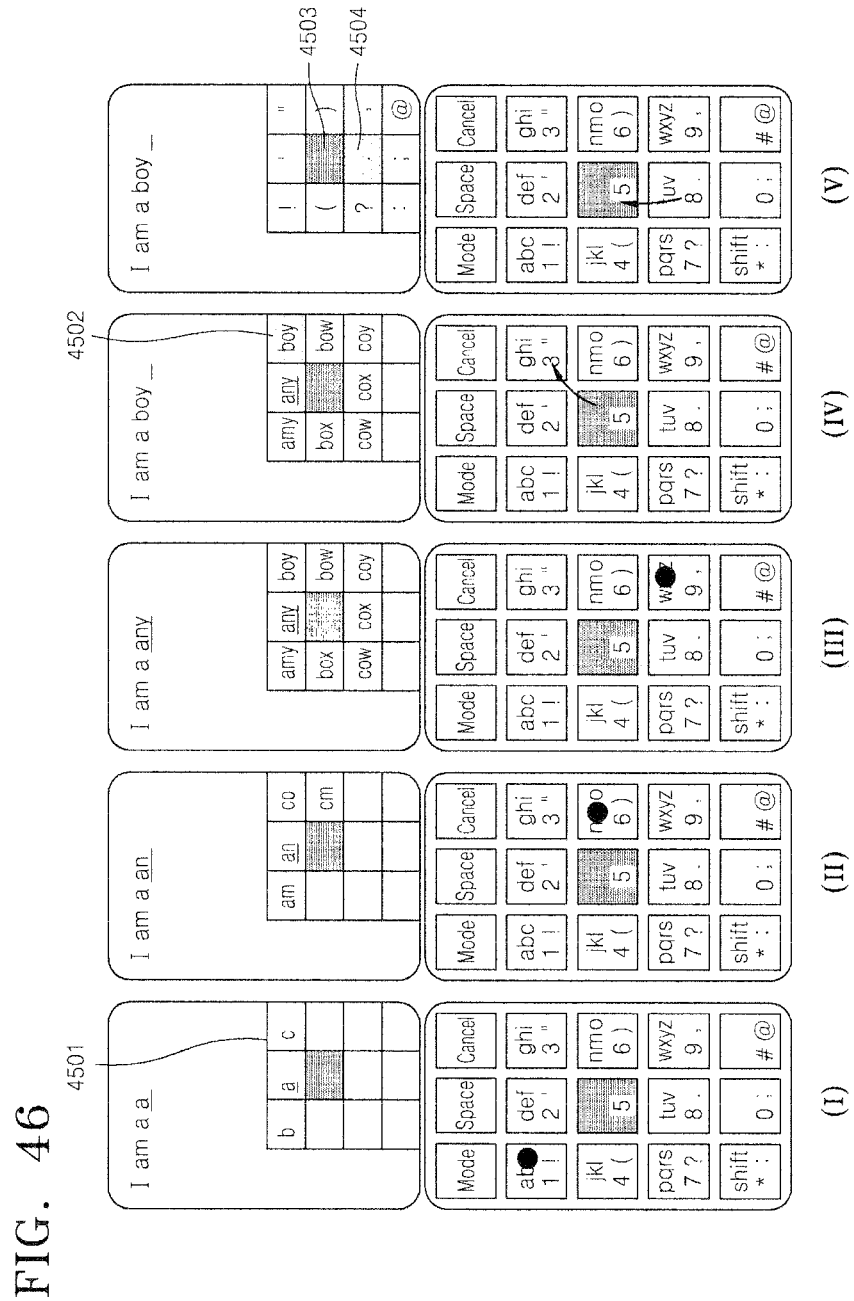

An example of further developing this advantage is shown in FIG. 46. FIG. 46 shows an example in which predicted words are arranged around the extension key to increase intuition of a predicted word list window 4501. As such, when the predicted words are arranged around the extension key, a finger drag direction for a selection can be easily perceived by viewing predicted word arrangement directions without checking a word list number (underlined number) of the predicted word list window, unlike FIG. 45(□).

Furthermore, a method of checking whether a selection was done right by changing a background color 4502 of a selected predicted word is also provided (FIG. 46(□)). Even in a case of a symbol input, a method of checking whether a selected key is a key corresponding to a symbol to be input by displaying a symbol arrangement display window 4503 in the input window and changing a background color 4504 of a first finger touch key in comparison with surrounding keys when a finger moves to the extension key is provided.

Figure 47:
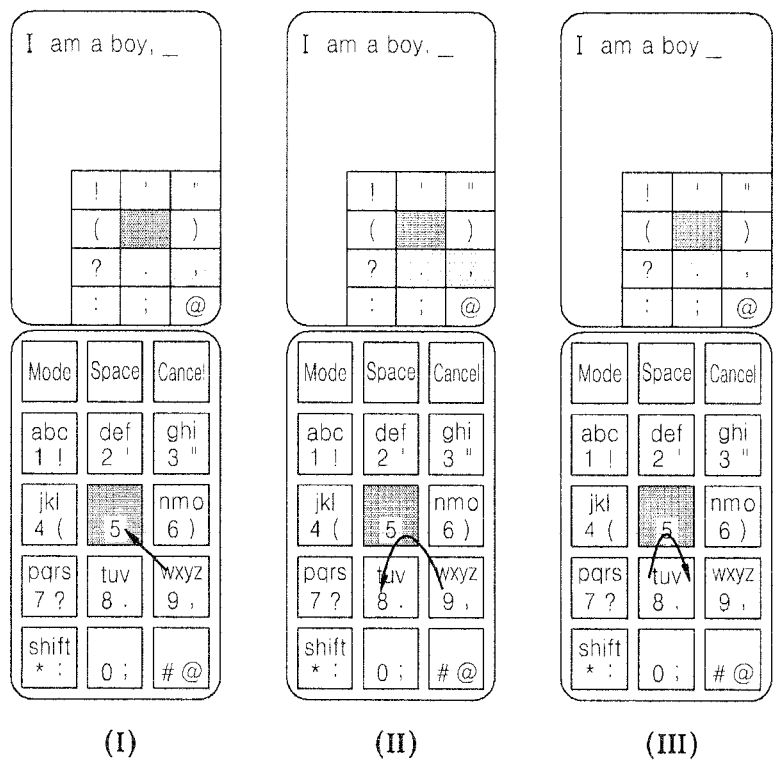

If a wrong selection has been performed, it can be easily corrected by a method as shown in FIG. 47(□) before an input is completed. That is, as shown in FIG. 47(□), when the extension key is touched by a drag action, a symbol arrangement display window is displayed in the input window, and a background color of a first finger touch key is simultaneously displayed differently from the other keys to check whether a selection of a desired symbol was done right, and if a wrong key other than the key to be input has been selected, a finger moves to the desired key and is released from it. Then, a last selected key (period. '.') is input instead of the first touch key (comma, ',') (refer to FIG. 47(□)). Thus, correction may be easily performed even without performing an input cancelling process, and if an input of a symbol is not desired, the finger returns to the first touch key and is released (refer to FIG. 47(□)). Then, no input is performed.

While FIG. 46 requires a drag action to input not only a predicted word but also a symbol, FIG. 47 shows a method of inputting a desired symbol by a touch-release of a key to which the desired symbol is designated. The latter is done in a state where a symbol keyboard layout is displayed on the screen.

FIG. 47(□) shows a case where a predicted word list is displayed on the screen in a state where a touch-release has already been performed for the '1', '6', and '9' keys, which is the same state shown in FIG. 46(□). However, differences from FIG. 46(□) are that an input of 'boy'+'space' is performed (refer to FIG. 48(□)) by touching the extension key in this state of FIG. 47(□), dragging the finger to the '3' key, and releasing the finger from the '3' key (4602), and an input of 'boy' is performed (refer to FIG. 48(□-1)) by touching the extension key in this state of FIG. 47(□), dragging the finger to the '3' key, returning to the extension key, and releasing the finger from the extension key (4603), to which the concept of FIG. 42(□) is applied.

Figure 48:
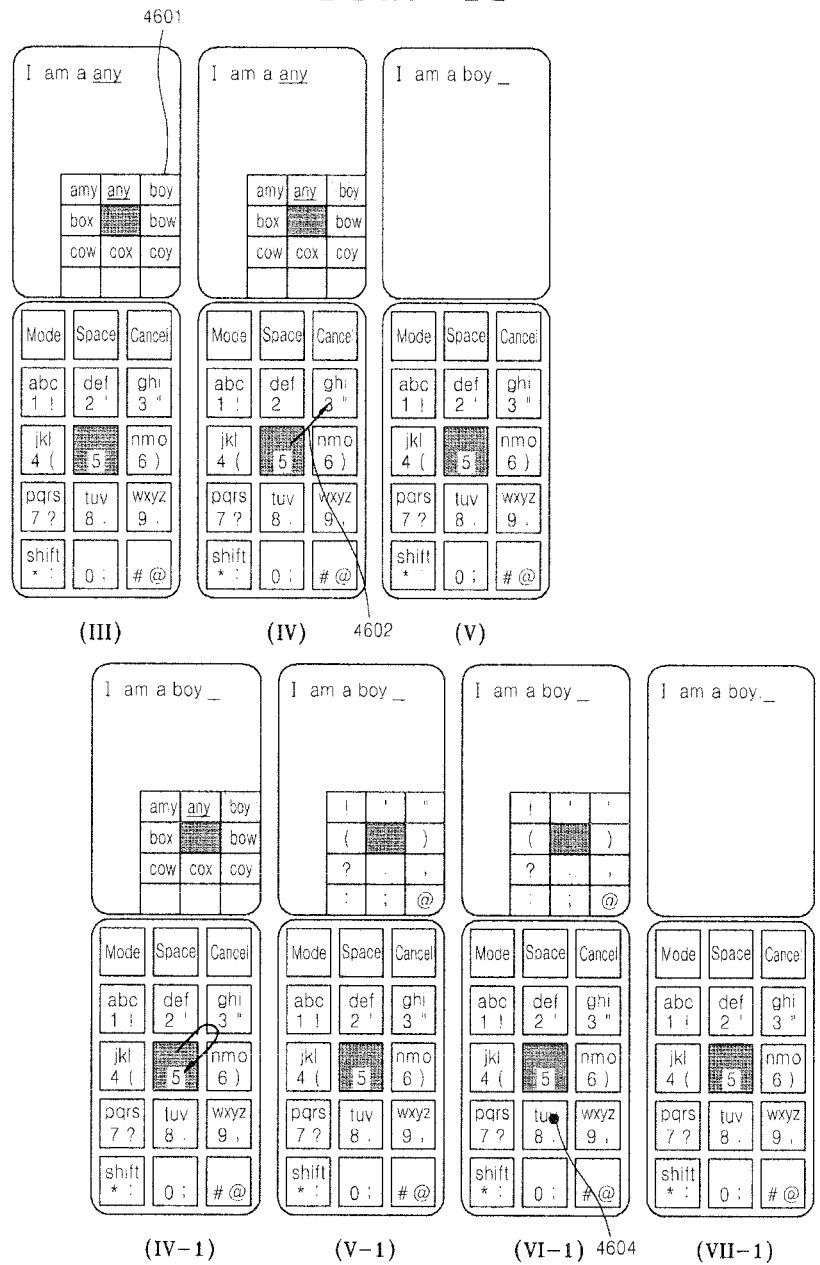

This drag action 4603 returning to the extension key causes that a symbol keyboard layout appears on the screen as soon as 'boy' is input (refer to FIG. 48(□-1)), and when a touch-release on each key area of a virtual keypad is performed (4604), a symbol designated to each key area is input instead of inputting a corresponding character.

Figure 39:
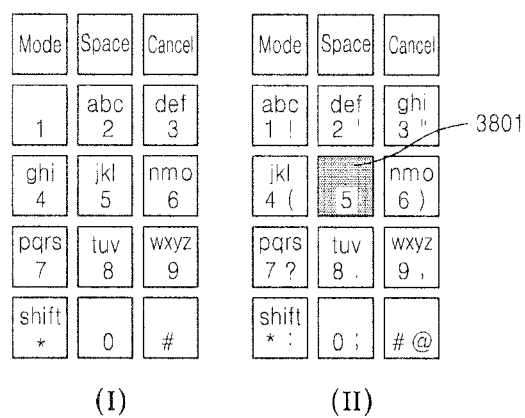
FIGS. 39 to 61 are diagrams for describing a case where the present invention is applied to input English.

A configuration of a word prediction input method in which the extension key is applied to a touch type virtual keyboard input method has been described. As shown in FIG. 39, it is preferable that the '5' key is used as the extension key in a keypad system based on 12 keys. However, if the number of keys increases or the arrangement is changed, more than one extension key can be designated, and in this case, it is preferable that positions of the extension keys are positions for easily displaying a predicted word list and minimizing finger movement.

As shown in FIG. 59, for a 3*4 (3 rows*4 columns) key arrangement (refer to FIG. 59(□)) other than a 4*3 (4 rows*3 columns) key arrangement, two keys 5501 at the center can be set as extension keys, and for a 3*5 (3 rows*5 columns) key arrangement (refer to FIG. 59(□)), two extension keys 5502 may be arranged on the left and right of the center considering convenience in use of both hands. The principle of the extension key may be applied to a keypad type word prediction method, as is described below with reference to FIGS. 49 to 51, and a keypad 4703 of FIGS. 49 to 51 indicates a physical keypad other than a virtual keyboard.

Figure 49:
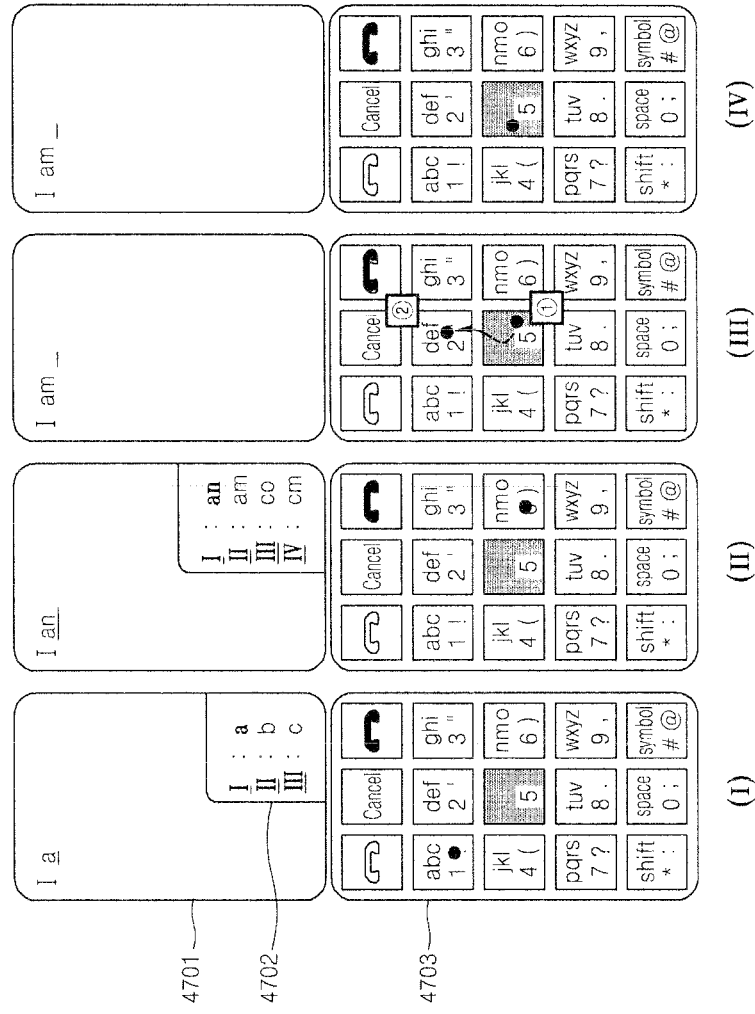

As shown in FIG. 49, a word 'am' is input by pressing the '1' and '6' keys to which 'a' and 'm' are respectively designated and sequentially pressing the '5' key that is the extension key and pressing the '2' key to select a predicted word '□: am' from a predicted word list window 4702. In FIG. 49(□), a dashed arrow denotes a drag action in the touch method shown in FIG. 45. Finally, the '5' key is pressed to input 'space'.

However, unlike the touch method, in the keypad method, it cannot be determined whether an action of pressing the '5' key corresponding to the extension key is an action for inputting the numeral '5' or a pre-action for inputting a predicted word list number. Thus, if only characters other than a numeral are designated to the '5' key, the action of pressing the '5' key may perform a function for inputting a predicted word list number when the word prediction state is active and perform the 'space' input function when the word prediction state is not active.

However, if a general method of allowing a long key press to be recognized as a press action for inputting a numeral instead of a character is selected, the '5' key may perform a function of inputting the numeral '5' in addition to a function of selecting a predicted word and a function of inputting 'space as the extension key.

If the drag action for inputting a symbol shown in FIG. 42(□) is applied to the keypad, the extension key must be pressed after a key to which a character is designated is first pressed. In this case, since the word prediction state is active due to the press of the key to which the character is designated, it cannot be determined whether the action of pressing the extension key is a press action for inputting a symbol or a press action for selecting a predicted word. Thus, in the keypad type input method, a function corresponding to the drag action of FIG. 42(□) applied to the touch type input method cannot be performed.

Figure 50:
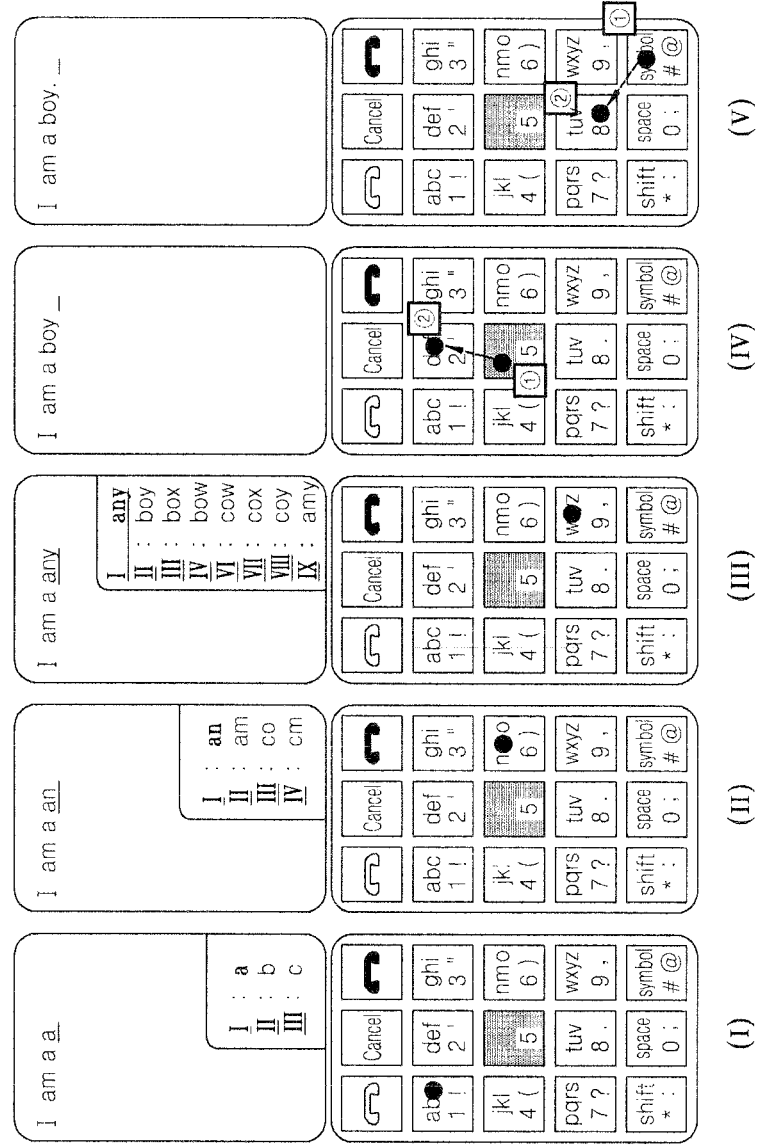
Figure 51:
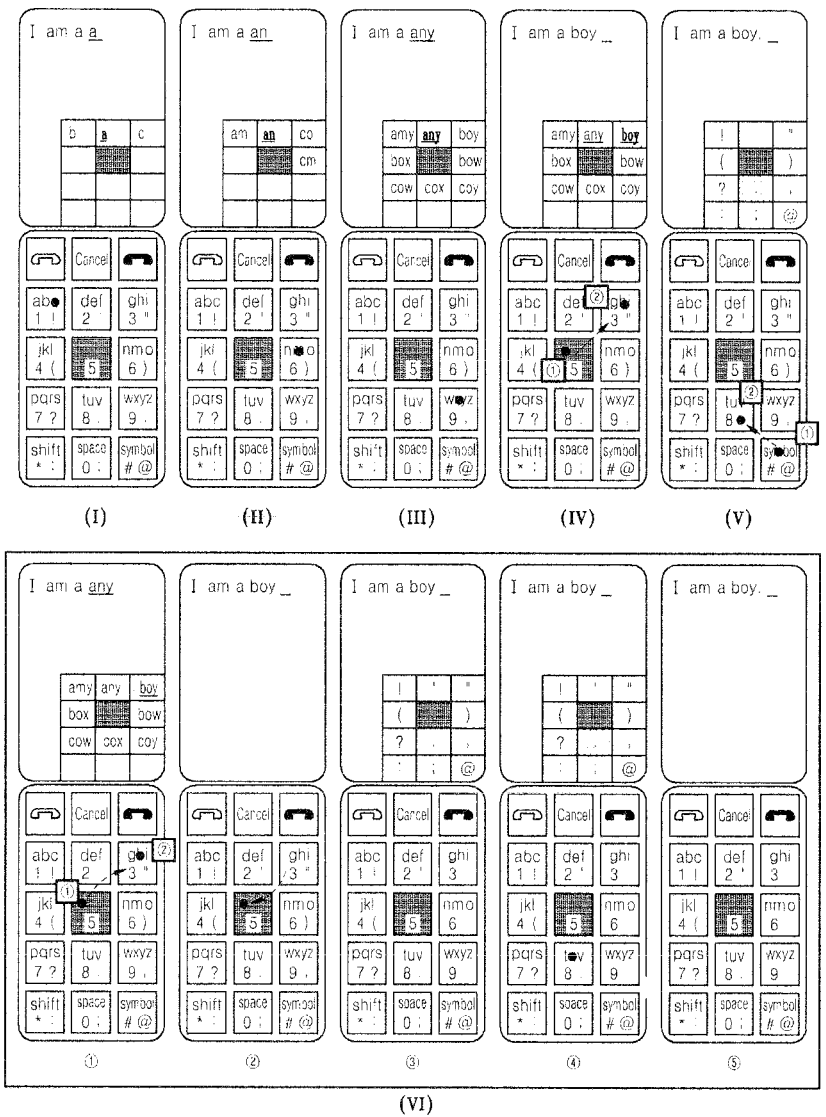

Therefore, as shown in FIGS. 49 to 51, a separate symbol selection function key for inputting a symbol is set (the '#' key is designated as the symbol selection function key in FIGS. 49 to 51) so that an action of pressing the extension key after pressing a key to which a character is designated performs only the predicted word selection function. Accordingly, an input of a symbol is achieved by pressing a key to which each symbol is designated after pressing the symbol selection function key.

Since this symbol input method does not make any problems even though the extension key is used to input 'space' when the word prediction state is active, an action of pressing the extension key to input 'space' in FIG. 49(□) reflects this.

A 'space' input function designated to the '0' key in FIG. 49 (when the keypad is operated by both hands, the 'space' input function may be designated to the '*' or '#' key. Instead, a function designated to the replaced key is designated to the '0' key) simultaneously performs a confirmation of a temporarily input word and an input of 'space' when the word prediction state is active, which can reduce the number of presses than the use of the extension key for inputting the temporarily input word and result in efficiency.

FIG. 50 shows a process of inputting the last word 'boy' of 'I am a boy.' and '.' with this setting. The word 'boy' is input by sequentially pressing the '1', '6', and '9' keys to display a predicted word list corresponding to 'boy' (refer to FIG. 50(□) and sequentially pressing the '5' key corresponding to the extension key and the '2' key corresponding to a predicted word list number '□' to select 'boy'.

Thereafter, an input of 'boy.' is completed by sequentially pressing the symbol selection function key and the '8' key to input '.'. Like FIG. 49(☐), a dashed arrow in FIG. 50(☐) is a reference mark to show that it corresponds to a drag action in the touch method.

FIG. 51 is the same as FIG. 50 except for a keypad arrangement showing that a predicted word list is arranged around the extension key instead of a vertically arranged format. Since a size of a screen of keypad mobile phones is not large, it is more difficult than other mobile phones to select a word to be input from a predicted word list window, and an intuitive arrangement format of FIG. 51 allows users to more easily select a desired word than the number order arrangement of FIG. 50.

The current configuration provides a method of increasing efficiency of a word prediction method by disposing the extension key (predicted word selection function key) at a position capable of minimizing a finger's movement and arranging predicted words around the extension key. Thus, the current configuration may be applied to languages other than English, which use the predicted word input method, in terms of the principle of arranging a list of predicted words in a word database around the extension key and inputting a predicted word intuitively selected from the predicted word list.

FIG. 51(☐) shows an example in which a configuration of selecting a predicted word and automatically enabling a symbol keyboard layout at the same time in the touch screen method shown in FIG. 42(☐).

The 'space' input function of the extension key in the process shown in FIG. 42(☐) is different from the 'space' input function through the extension key that is shown in FIGS. 42(☐) to 42(☐), and this difference also exists between FIG. 51(☐) and FIGS. 51(☐) to 51(☐). That is, as described with reference to FIG. 42(☐), the drag action 4102 in which the finger is released from a key area to which a predicted word is designated also performs the 'space' input function, and the drag action 4103 in which the finger returns to and is released from the extension key allows only the predicted word to be input.

That is, in FIGS. 51(☐) to 51(☐) in which the configurations of FIGS. 42(☐) to 42(☐) are respectively applied to the keypad method, a predicted word 'boy' is input by pressing the extension key (the '5' key) and pressing the '3' key corresponding to a predicted word number to select the predicted word.

However, in FIG. 51(☐) in which the configuration of FIG. 42(☐) is applied to the keypad method, a predicted word and 'space' are simultaneously input by pressing the extension key (the '5' key) and pressing the '3' key corresponding to a predicted word number (refer to FIG. 51(☐)-☐), and if the extension key is pressed again in this state (refer to FIG. 51(☐)-☐), the input 'space' is cancelled, substantially resulting in only an input of the predicted word.

By doing as so, the same process and result as those in the configuration applied to the touch screen method of FIG. 42(☐) occur. Thus, in a state where the word prediction state is active, when the '3' key corresponding to a predicted word number is pressed after the extension key (the '5' key) is pressed, the predicted word 'boy' and 'space' are simultaneously input, and in this state, when the extension key that is the symbol selection function key is pressed, a function of a 'backspace' key and a function of enabling the symbol keyboard layout on the screen (refer to FIG. 51(☐)-☐) are simultaneously performed. As a result, 'space' that has been input by the press action of FIG. 51(☐)-☐ (corresponding to the drag action of FIG. 42(☐) and marked as a dashed line) is cancelled, and an input cursor is placed immediately after the predicted word 'boy', resulting in becoming the symbol input state (although the drag process in the touch screen method shown in FIG. 42(☐) is not shown on the screen for the processes of FIG. 51(☐)-☐ and FIG. 51(VI)-②, the same process is substantially internally performed). In this state, when the '8' key to which the symbol '.' (period) to be input is pressed (refer to FIG. 51(VI)-④), the symbol input is completed (refer to FIG. 51(VI)-⑤).

If a selection of a predicted word and an input of 'space' are simultaneously achieved, in general, 'space' does not have to be input by pressing the extension key, so there is no big problem in the configuration applied to FIG. 51(VI). Thus, when an input of 'space' occurs frequently, the configuration of FIG. 42(VI) in which a drag action starting from the extension key and ending at a key area to which a predicted word list number is designated allows a predicted word and 'space' to be simultaneously input is more useful than the configurations of FIGS. 42(I) to 42(V), so the configuration of FIG. 51(VI) in which the configuration of FIG. 42(VI) is applied to the keypad method is more useful than the configurations of FIGS. 42(I) to 42(V).

Furthermore, when the word prediction state is active, if an input of a temporarily input word and an input of 'space' are simultaneously achieved by consecutively pressing the extension key twice, the separate 'space' key (the '0' key) does not have to be used, so a method of moving a finger within the '1' to '9' keys may be provided.

Sixteenth Embodiment

The sixteenth embodiment applies the concept of the vowel input enabling key to a word prediction input system and provides a method of allowing a predicted word list to be more easily recognized by displaying the predicted word list on a virtual keyboard which a user directly touches, as described with reference to the touch screen in the fifteenth embodiment.

Figure 52:
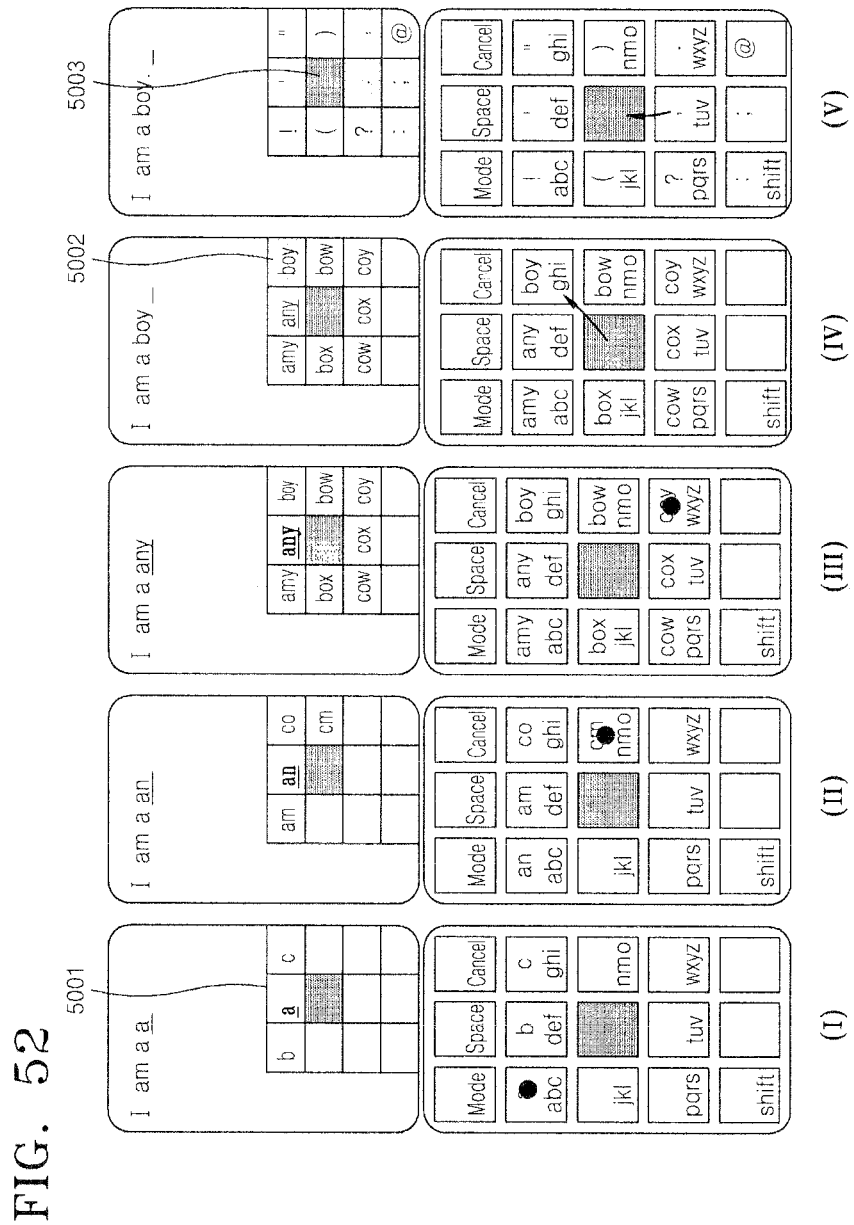
Figure 53:
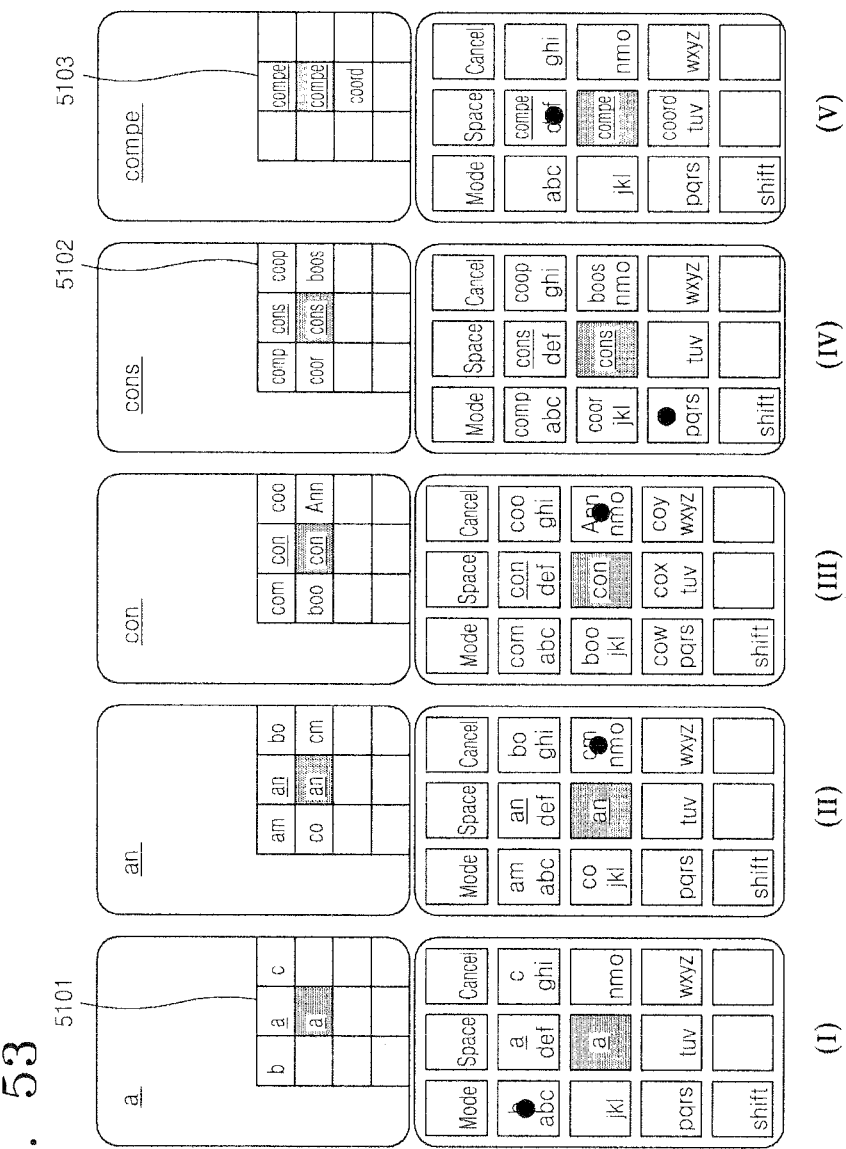

In general, inconvenience in the use of the word prediction input method is the annoyance that a predicted word and a key input must be checked while alternately viewing a keyboard (keypad) and an input window. However, as shown in FIG. 53, if a predicted word list is displayed on keys of a virtual keyboard which a finger directly touches (as in the touch screen method), the input window and the virtual keyboard on which an input of words is achieved does not have to be alternately viewed to check the predicted word list. FIG. 52 shows the same process in which this configuration is applied to FIG. 51.

Figure 54:
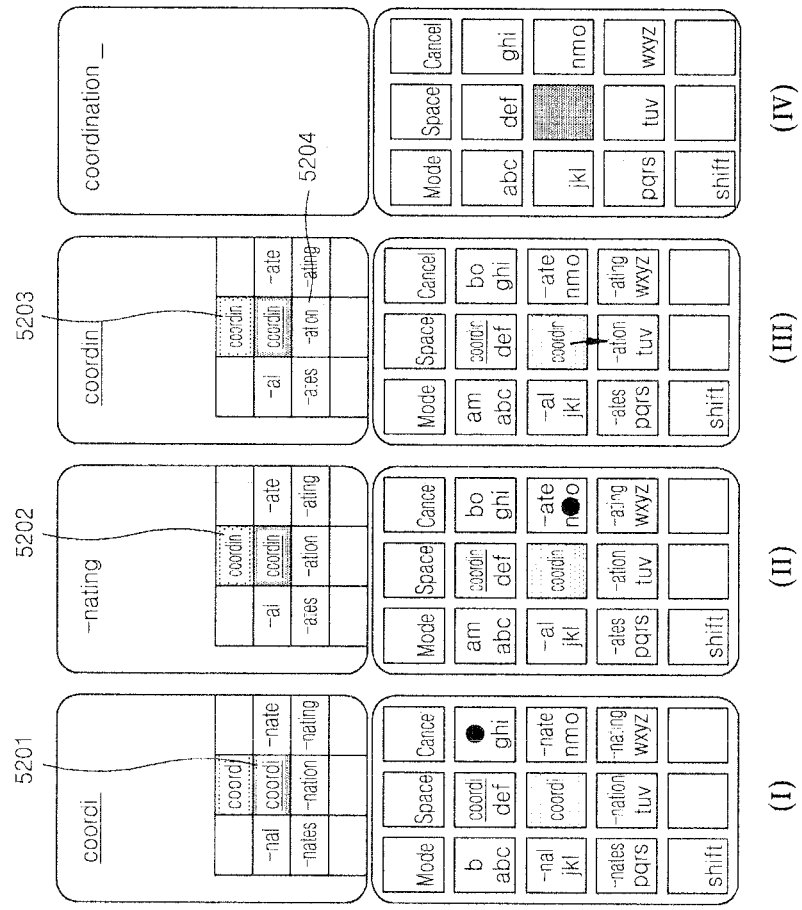

FIGS. 53 and 54 show an input example in the predictive input method according to the current configuration. That is, FIGS. 53 and 54 show a process of inputting an English word 'coordination'. FIG. 53 (☐) shows a case where a touch-release of the '1' key is performed to input a first character 'c' of 'coordination'. The contents of a predicted word list window 5101 are displayed in the input window and on the virtual keyboard. Key areas marked red in the predicted word list window and the virtual keyboard have a one-to-one corresponding relationship with the extension key. A predicted word displayed on the virtual keyboard is marked red to discriminate it from blue characters designated to corresponding keys. This is to allow a user to associate that the extension key must be touched or a drag action passing through the extension key must be performed to input any of the predicted words, and this may be represented in a different way.

In a predicted word list, words may be listed alphabetically or in a use frequency order. However, if possible, it is preferable that a temporarily input word is placed at a position at which a finger can easily access from among positions in the predicted word list window. For example, rather than a position in a diagonal direction of the extension key, such as the '1', '3', '7', or '9' key, a position in an upper, lower, left, or right direction of the extension key, such as the '2', '4', '6', or '8' key, is easier for a finger to move from the extension key, so it is preferable that the temporarily input word is placed at one of the latter positions. In FIG. 53, the temporarily input word is placed at a position of the '2' key.

Although numerals designated to the keys are not displayed on the virtual keyboard in FIG. 53, they are omitted under an assumption that users know well positions at which the numerals are arranged. If necessary, the numerals may be displayed on the virtual keyboard as shown in FIG. 51.

The omission of the numeral from each key of the virtual keyboard is because displaying on a key of the virtual keyboard all of a predicted word, numeral and characters designated to each key results in making recognition of a predicted word difficult. Therefore, the numerals are not displayed for convenience.

The virtual keyboard of FIG. 53 is set such that the extension key also performs a function of inputting 'space'. In this case, a temporarily input word in the input window is also displayed on the extension key of the virtual keyboard, and when a touch-release of the extension key is performed to input 'space' and temporarily input word (the word underlined in the input window of FIG. 51), the input word may be rechecked, thereby preventing an input error. Since a temporarily input word is displayed as an underlined word in the predicted word list window, there is no problem even though the temporarily input word is not displayed on the extension key.

FIG. 53(□) shows a case where two predicted words (here, the predicted word is the head portion taken from the full predicted words in such a way that the number of characters for the head portion of predicted words equal to the number of key pressing so far for the predicted words) are arranged above and below the extension key to prevent an overlapping problem of the two predicted words when the two predicted words are displayed on adjacent keys even though the two predicted words are long, as shown in FIGS. 51(□) to 51(□).

Finally, when the first 7 characters of the word 'coordination' to be input are input (refer to FIG. 54(□), the predicted words have the same head portion and only one head portion remains. So the predicted words differ only in the suffix portion following 'coordin' and, therefore, predicted words are displayed with these suffix variations over the corresponding key areas. Thus, displaying suffix variations is helpful predicted words not to overlap with other words allocated to adjacent keys. Also searching predicted word list when displayed with suffix portion only is more convenient than searching the list when whole words are displayed.

For example, as shown in FIG. 54(□), a list of the suffix variations, such as -al, -ate, -ates, -ation, and -ating, may be displayed, and when one of the suffix variations is selected (refer to FIG. 54(□)), a word which is the combination of 'coordin' displayed as the predicted word and the selected suffix variation is input.

In FIG. 54, a key 5201 to which a predicted word is allocated has a blue color background. This indicates that the predicted words shares a common head portion and predicted words can be displayed with suffix variations which follow the common head portion.

Accordingly, when a background color of a key to which a predicted word is allocated is changed to blue, this guides a user to search for only suffix parts from a predicted word list window to select a suffix variation to be added to the predicted word instead of progressing a key input.

For example, as shown in FIG. 54, if a predicted word has a blue background, this means that predicted words are listed with only the suffix variation accompanying the head portion displayed on the extension key. Thus, an input of 'coordination' is completed by touching the extension key with a finger, moving the finger to a key to which a suffix portion '-ation' 5202 is designated by a drag action, and releasing the finger.

That is, five touches required to input the remaining suffix portion 'ation' one by one in the condition where 'coordin' is temporarily input as a predicted word can be reduced.

However, the input of 'coordination' may be completed by inputting every letter of 'coordination' and performing a touch-release of the extension key instead of searching for the suffix variations in the state shown in FIG. 54(□). As such, when suffix variations are displayed as predicted words, there is an advantage in preventing a situation in which predicted words designated to adjacent keys overlap with each when whole words are displayed on corresponding keys.

FIG. 54 shows a method of displaying predicted words in corresponding key areas on the virtual keypad (keyboard) by displaying suffix variations when a predicted word is long. If it is desired to display the full predicted words in corresponding key areas, predicted words are allocated to keys of the columns which are at the left and right side of the extension key leaving any key on the column which the extension key belongs to empty. This prevents predicted words overlaps with others allocated to an adjacent key.

Seventeenth Embodiment

The seventh embodiment provides a method of designating characters even to the extension key, in addition to the fifteenth and sixteenth embodiments. In this case, a predicted word can be easily selected by applying the extension key to the word prediction input method.

Figure 55:
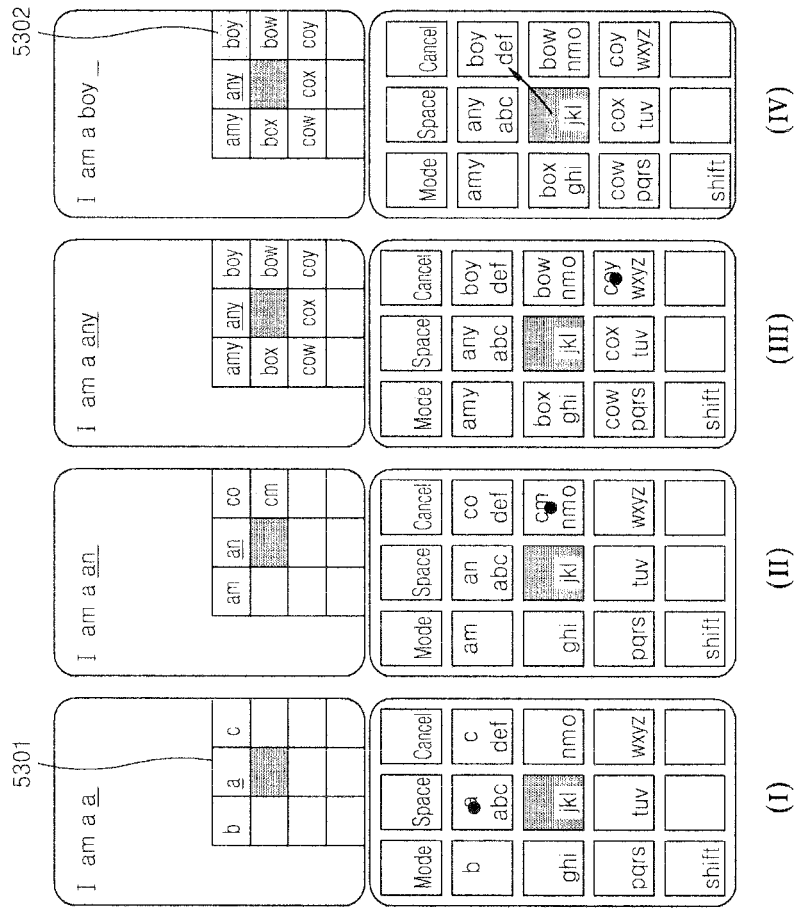

A virtual keyboard of FIG. 55 shows a case where characters 'jkl' are designated even to the extension key. As such, when characters are designated even to the extension key, the extension key cannot perform the 'space' input function by the touch-release action (refer to FIG. 42(□)) among the extension key utilization operations shown in FIG. 42 but performs only the functions according to the drag actions shown in FIGS. 42(□) to 42(□).

For example, the symbol input shown in FIG. 42(□) is performed without difficulty even though the characters 'jkl' are designated to the extension key. That is, in a touch type input device capable of detecting a drag action, there is no difficulty in a word prediction input even though the existing keypad (or keyboard) shown in FIG. 39(□) is used as it is.

Thus, an advantage of the current configuration is that a predicted word can be easily selected in a state where the existing keyboard layout is used in a touch type input device. That is, although a predicted word selection method is a new one, users can easily adapt to the input method according to the current configuration of the present invention by using a familiar keyboard layout since the existing keyboard layout is used as it is.

Since the '5' key having the extension key function, however, cannot perform the 'space' input function, even an input of a predicted word in a temporarily input state must be performed by a drag action. Thus, if a separate 'space' key 5303 performs the function of confirming a predicted word in a temporarily input state and inputting 'space', a predicted word in temporarily input state does not have to be confirmed and input by a drag action and can be completed by a simple touch-release action.

Eighteenth Embodiment

The eighteenth embodiment provides a method to solve a case where a space for a predicted word list is too limited to list all predicted words in a predicted word list window and provides a configuration in which another predicted word list is displayed by setting a 'move' key to one of the key areas in a predicted word list window and selecting the 'move' key.

Figure 56:
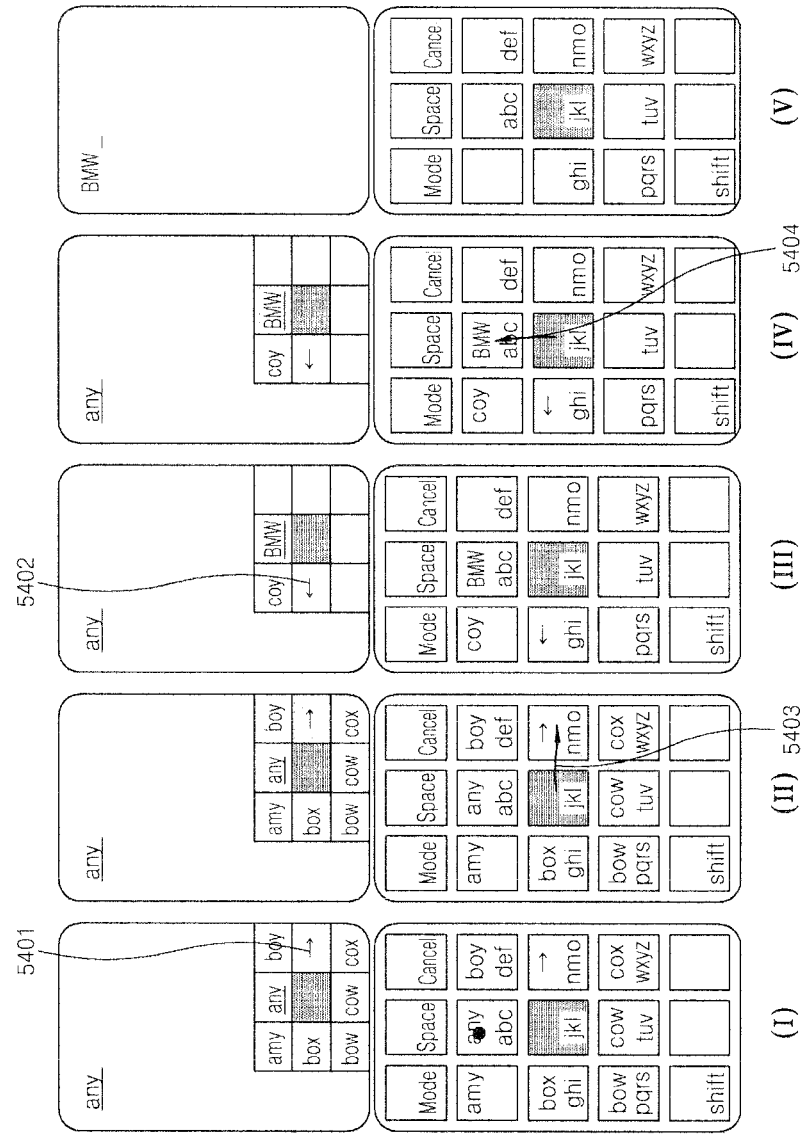
Figure 57:
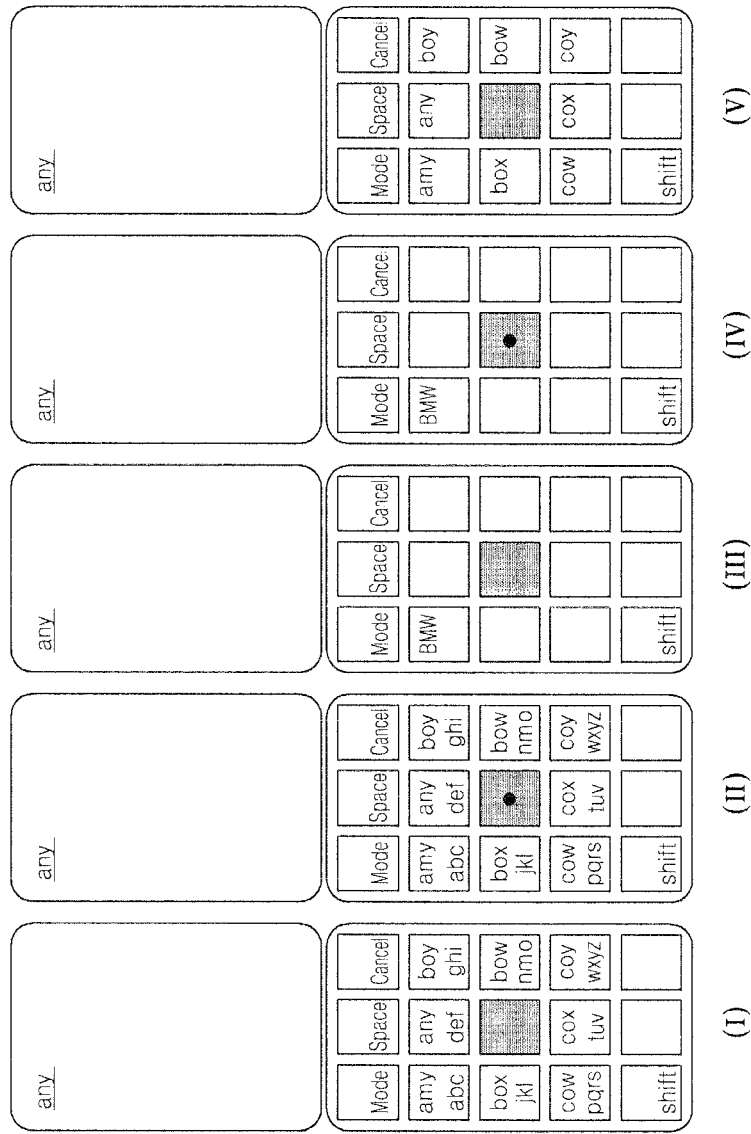
Figure 58:
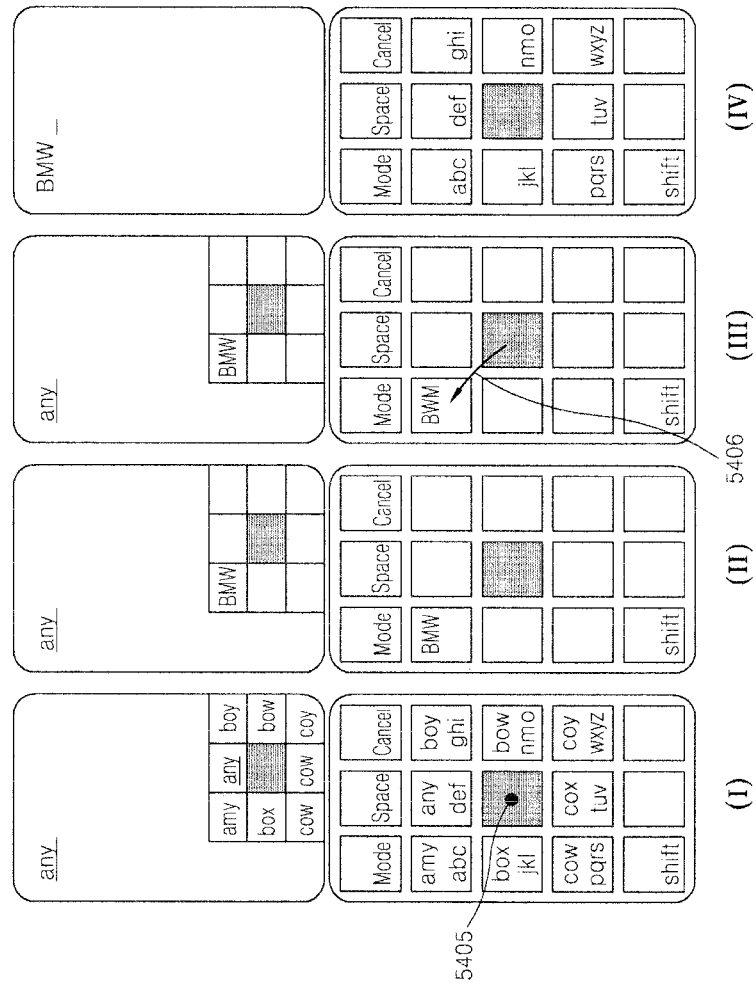

FIGS. 56 to 58 show this configuration. In a typical English keyboard layout shown in FIG. 40(□), to input 'boy', the 'abc' key, the 'mno' key, and the 'wxyz' key must be sequentially pressed. In this case, assuming that there are 9 predicted words, such as Amy, any, boy, box, bow, cow, cox, coy, and BMW, if a space for predicted words in the predicted word list window shown in FIG. 56(□) is limited to only 8 words except for the extension key among the '1' to '9' keys, all of these predicted words cannot be displayed.

To complement this, a 'next page' key 5401 is designated to one of the key areas in a predicted word list window to display the 'move' key 5401 together with 7 predicted words, and when the 'move' key 5401 is selected (5403), another predicted word list is displayed to selectively input a word to be input ('BMW' in the case of FIG. 56). A 'move' key 5402 shown in FIG. 56(□) is a reverse directional 'move' key for moving to the previous predicted word list again. If the number of predicted words in the predicted word list window shown in FIG. 56(□) is greater than 7, the predicted word list window shown in FIG. 56(□) may also include the forward directional 'move' key 5401.

The virtual keyboard shown in FIG. 56 illustrates the case where character group 'jkl' kl virtual keyboard shown in FIG. 5 An operation method corresponding to FIG. 56 follows the method of the seventeenth embodiment FIGS. 57 and 58 show a case where the extension key performs the same function as the 'move' key instead of using the 'move' key 5401 and 'move' key 5402 shown in FIG. 56.

If the 'move' key function of the extension key does not collide with the other functions of the extension key, when the word prediction state is enabled, a touch-release action of the extension key performs the 'move' key function.

FIG. 57(I) shows a state where 'any' is displayed as a predicted word in a temporarily input state in an input window by consecutively performing a touch-release of the 'abc', 'mno', and 'wxyz' keys as shown in FIG. 56(I), that is, a state where a predicted word list window is displayed on a screen. In this state, when a touch-release of the extension key is performed (refer to FIG. 57(II)), a second predicted word list is displayed on the screen (only one word 'BMW' is displayed), and when a touch-release of the extension key is performed again (refer to FIG. 57(IV)), there is no further predicted words, so the second predicted word list is changed to a first predicted word list.

If it is desired to input 'BMW', a finger moves to an area to which 'BMW' is designated and is released from this area by a drag action 5406, as shown in FIG. 58(III). More simply, as shown in FIG. 57(III) or 57(V), if a word prediction active state (a case where only predicted words are displayed in corresponding key areas instead of characters) is obvious, 'BMW' may be input by only an action of performing a touch-release on the area to which 'BMW' is designated.

For example, while a finger must move to an area to which a predicted word is designated and be released by a drag action to select and input the predicted word in FIG. 58(□), a predicted word may be input by performing a touch-release on a corresponding area when each key area is in a state for only selecting a predicted word by displaying only predicted words on a virtual keyboard, as shown in FIG. 58(□).

As shown in FIG. 57, a predicted word list window is not displayed in an input window. A case where it is set that the predicted word list window can be displayed in the input window according to a preference of a user can complement a case where a finger may sometimes hide a predicted word when predicted words are displayed on only the virtual keyboard. However, this has a disadvantage that an area of the input window is reduced when a predicted word list is displayed in the input window. Thus, the presence/absence of the predicted word list window may be set according to a preference of a user.

An advantage of the current configuration is that an input speed can increase by allowing a predicted word to be easily selected and input for languages, such as Chinese and Hindi, in which a case where the number of predicted words according to the same key sequence as English in the predictive text input method is more than 10 or 20 is frequent. In particular, the current configuration has an advantage that a finger may select a predicted word without moving beyond the key area of a virtual keyboard (virtual keypad) or a physical keypad.

In addition, since the current configuration can also be applied to a keypad input device as shown in FIGS. 49 to 51, general inconvenience that a desired word must be difficultly selected from among predicted words by using a 'move' key can be solved. For example, in the case of English, as shown in FIGS. 56 to 58, inconvenience that the 'move' key must be pressed seven times to find 'BMW' after starting from a temporarily input word 'any' to input 'BMW' is solved. Furthermore, the current configuration has an advantage that a user may always check whether a key input was done right by displaying a predicted word list in an input window as shown in FIG. 58(□).

Nineteenth Embodiment

The nineteenth embodiment may apply the extension key to even a glide type predictive text input method (a method of inputting a word by touching a key area to which a first character forming the word is designated, sequentially moving a finger to key areas to which the other characters forming the word are designated, and releasing the finger from a key area to which the last character forming the word is designated) in which a word is input by one touch-drag action.

Figure 60:
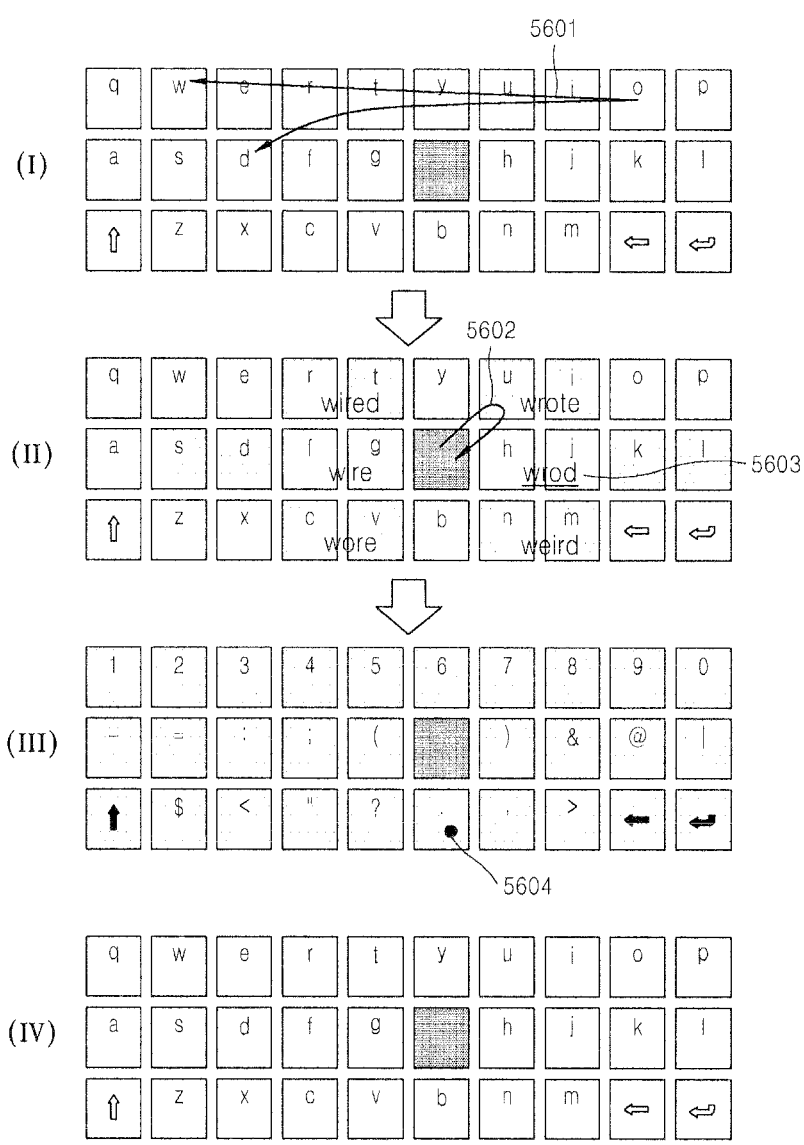

FIG. 60 shows an example in which a predicted word is easily selected and input by applying the functions set to the drag actions using the extension key, which are shown in FIGS. 42 and 43, to a glide type character input method, that is, a process of inputting 'wrote' and a period '.'.

A particular fact is that the extension key can be easily used by designating the extension key as a separate key and arranging the extension key at a space between 'g' and 'h', i.e., at the center of the keyboard. A drag action 5601 of passing through each of the characters forming 'wrote' to input the last word 'wrote' of a sentence with a virtual QWERTY keyboard is shown in FIG. 60(□), and words predicted by this trajectory are 'wrote, word, weird, wire, wore, and wired', and each of these predicted words is arranged on two key areas around the extension key (refer to FIG. 60(□)).

This is because it is difficult to arrange a predicted word on a single key in the complete QWERTY keyboard shown in FIG. 60 since the complete QWERTY keyboard shown in FIG. 60 generally has smaller keys than a keyboard using 12 keys. If a complete QWERTY keyboard has big sized keys enough to arrange a predicted word on each key, each predicted word does not have to be arranged on the area combining two keys, unlike FIG. 60(□).

Since the finger trajectory shown in FIG. 60(□) corresponds to a trajectory for inputting 'word' instead of 'wrote', 'word' is selected as a temporarily input word 5603. In this state, when a touch-release 5604 is performed on a key area to which '.' is designated, an input of 'wrote.' is easily achieved. This is an example in which the settings of FIG. 42(□), i.e., settings for easily inputting a predicted word and a symbol by using the extension key, are applied and show that the use of the extension key allows a character input to be easily achieved even in the glide type input method.

However, a symbol keyboard layout shown in FIG. 60(□H) is used for a one time input (meaning that after a symbol is input the symbol keyboard layout is automatically changed to a QWERTY keyboard layout for a character input as shown in FIG. 60(□)). If symbols or numerals must be continuously input, a method of setting a separate key for keyboard layout change to fix a symbol keyboard layout for repeated input of symbols may be applied. However, a drag action 5602 shown in FIG. 60(□) is only an example of a function for naturally enabling the symbol keyboard layout without touching a separate key when the extension key is used, and the drag action 5602 does not intend to show that only a temporal keyboard layout function can be carried out.

In addition, like the drag action of inputting a vowel by using the vowel input activation key of Hangul, the drag action 5602 for a predicted word selection may be an action of moving or passing a finger to or through an area to which a predicted word is designated (an area identified by combining two keys having different background colors in FIG. 56(□), and furthermore, by setting a direction oriented to this area, when a direction of a drag action is the same as the direction oriented to this area and the drag action moves by more than a predetermined distance, this function may be performed. This fact may be applied to the drag actions shown in FIGS. 42 and 43.

Twentieth Embodiment

The twentieth embodiment provides a method of simultaneously inputting two keys in the word prediction character input method.

The twentieth embodiment is described with reference to FIG. 55. The twentieth embodiment provides a method of simultaneously inputting characters designated to a touch start point and a finger release point when a finger moves to the '6' key area by a drag action in a state where the finger touches the '1' key area instead of performing two separate touch-release of '1' key to which 'b' is designated and '6' key to which 'o' is designated to input a word 'boy'.

As described above, when characters designated to a key in which touch start and designated to a key which a finger releases from are simultaneously input, the input of 'boy' that is shown in FIG. 53 can be completed by two touch actions, and the two touch actions for inputting 'am' that are shown in FIG. 40 (two touch-release actions on the '1' key and the '6' key) can be replaced by one touch-drag action.

If a function is properly set for the drag action of FIG. 42 or 43 so that a function of this drag action does not collide with the functions of the drag actions using the extension key that are shown in FIGS. 42 and 43, the number of key touches can be reduced by a half. Furthermore, when the glide type word prediction input method shown in FIG. 60 is applied to a numeric key oriented keyboard layout having the 4*3 (4 rows*3 columns) key arrangement shown in FIG. 39(□), a predicted word can also be easily selected by designating the extension key as shown in FIG. 39(□), and in this case, a finger moving range is reduced in comparison with the complete QWERTY keyboard shown in FIG. 60, thereby causing an advantage that the glide type word prediction input method can be used by only a joint motion of one finger (mainly a thumb) in a state of gripping a mobile device by one hand.

Twenty First Embodiment

In the twenty first embodiment, when the word prediction state is inactive, a drag action using the extension key performs a function of moving a cursor (pointer) on a screen.

Figure 61:
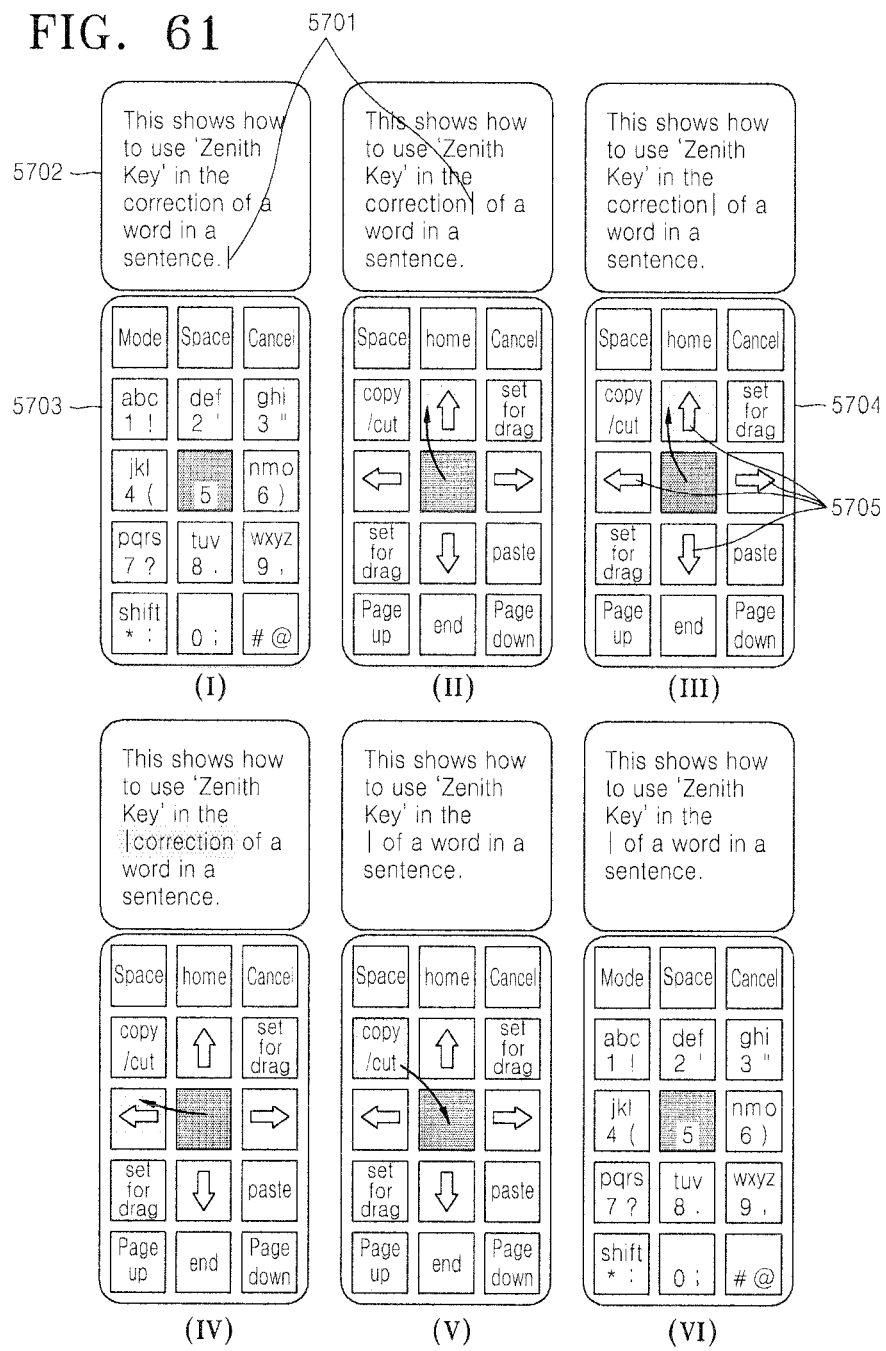

Only if the function of moving a cursor does not collide with the function assigned to the drag action using the extension key that is shown in FIG. 42 or 43, when a cursor movement control function is assigned to drag actions shown in FIGS. 61(□) and 61(□), cursor movement to a desired position on the screen can be conveniently performed with a finger fixed on a virtual keyboard. This brings convenience as a pointing stick which is located in a keyboard to remove general inconvenience that a hand leaves from a keyboard and moves to a mouse to manipulate the mouse for moving a cursor during the use of the keyboard.

In more detail, FIG. 61 shows a process of using the extension key to delete the word 'correction' displayed in a fourth row of an input window 5701 in a touch screen type input method. Since the word prediction state is inactive in a virtual keyboard 5702, the predicted word selection function by touching the extension key is not performed, and instead, when the extension key is touched, a cursor control keyboard layout 5703 is displayed on the screen.

If a simple touch-release of the extension key is performed, 'space' may be input, or a function defined by the touch-release action may be performed. However, in the current embodiment, as a finger touches the extension key and moves in the upper, lower, left, or right direction, movement of a cursor (pointer) is performed, and if the finger is released from a key named as 'set for drag' as shown in FIG. 61(⊔), the cursor control keyboard layout is still active on the screen, thereby capable of performing a drag action for selecting a desired word, as shown in FIG. 61(□).

Since a main purpose of a 'selection' key is to select a desired character, word, or sentence, if a finger is released from the 'selection' key, the movement of a cursor is necessarily performed to select a desired character, word, or sentence, so it is preferable that the cursor control keyboard layout is continuously active. After a desired word is selected, if the selected word is desired to be simply copied, a touch-release of a 'copy' key is performed, and if the selected word is desired to be deleted, a user moves a finger to the extension key by a drag action in a 'copy/cut' key touch state and releases the finger from the extension key to delete the word 'correction', thereby forcing the cursor control keyboard layout to disappear and a character input keyboard layout to appear. Because a purpose of deleting the word 'correction' may be to insert the word 'correction' into another position or to insert another word into a position at which the word 'correction' has been placed, the cursor control keyboard layout disappears and the character input keyboard layout appears on the screen. If it is desired to insert the word 'correction' into another position, the user touches the extension key by a finger and drags the finger to an 'up/down/left/right move' keys 5704 as shown in FIG. 61(⊔) or 61(⊔).

A method of operating 'up/down/left/right move' keys may be changed in various forms, one of which is a method of allowing the movement of a cursor to be maintained in a direction directed by one of the 'up/down/left/right move' keys while a finger is being put on the selected 'move' key and to stop when the finger returns to the extension key. However, FIG. 61 shows that a method of controlling the movement of a cursor by using the extension key may also be performed. Thus, various functions required for a selection of a predicted word and an input of a character may be set by using the extension key, and in a multi-touch type input method, since there is no problem even though two fingers simultaneously touch two extension keys by arranging a separate extension key 5504 outside a character input keyboard layout, as shown in FIG. 59(□), a character input may be more conveniently performed by allocating an additional function other than the functions described above to an extension key outside a character input keyboard layout or allowing the extension key outside a character input keyboard layout to share the same functions with an extension key 5503 inside the character input keyboard layout.

Twenty Second Embodiment

The English input through word prediction described above may be applied to Hangul. In the current embodiment, the word prediction method is applied to the Hangul input method that uses a vowel input enabling key 2501 shown in FIG. 27.

The word prediction method is already well known as the character input method named T9, and correctly, indicates a disambiguating method. When several characters are designated to a single key, these characters can be input by one press action without requiring several press actions.

For example, to input a word 'mom' in a typical multi-tap method, the 'mno' key must be continuously pressed as shown below. In this case, a 'move (→)' key must be pressed in the middle to identify 'm' and 'o', and likewise, the 'move (→)' key must be pressed in the middle to identify 'o' and 'm', so a total of seven press actions are required. Compared with this, a total of three press actions are required in the word prediction method, thereby substantially causing an increase in an input speed by more than double.

Multi-tap method: 'mno', '→', 'mno', 'mno', 'mno', '→', 'mno'

Word prediction method: 'mno', 'mno', 'mno'

Even the word prediction method that increases a character input speed cannot be easily applied to a Hangul character input method because a probability of words predicted by combinations of characters designated to each key is lowered or there is no increase in an input speed as in the case of English.

Table 1 shows that cases where the number of words having the same key sequence is 1 to 10 are arranged in an ascending sequence when key sequences that Korean words can have with respect to the existing Samsung Cheonjiin, LG Naratgul, and Pantech SKY-□, and the keyboard layout of the present invention shown in FIG. 85(□).

As a reference, since there is no predictable method for vowels in the case of Cheonjiin, a distribution shown in Table 1 is deducted by actually inputting every vowel with 'Cheon (•), Ji (一), and In (ǀ)' and applying the word prediction method to every consonant. Nonetheless, a probability of correctly predicting only one word is not above 90%.

As a result, prediction accuracy is in an order of the present invention>SKY-II>Naratgul>Cheonjiin. An increase in an input speed when the word prediction method is actually applied is 12% in the case of Cheonjiin, 15% in the case of Naratgul, and 29% in the case of the present invention. This result describes why it is difficult for the word prediction method to be applied to the existing input methods for Hangul according to a result that the word prediction method is used only if an input speed increases by at least about 30%. Thus, Hanalgul shows a keyboard layout to which the word prediction method can be applied.

Figure 72:
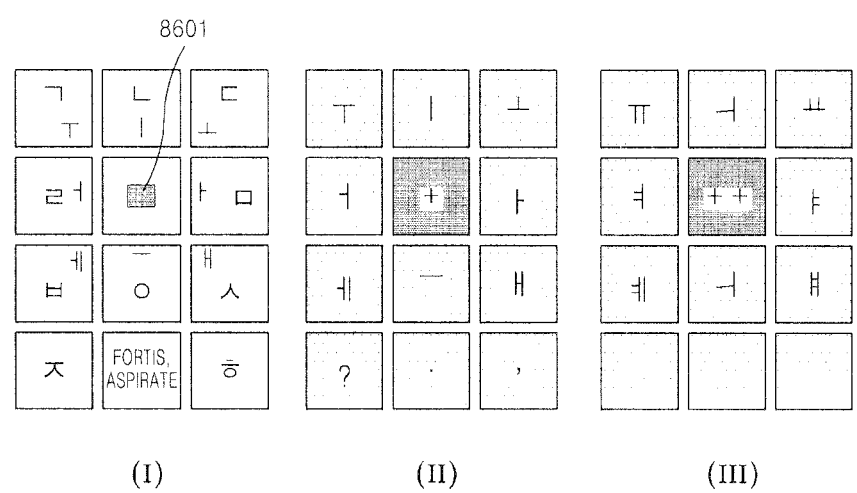
Figure 72:
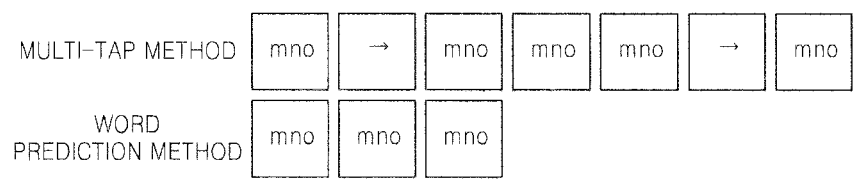

Accordingly, the current configuration provides a method of improving user convenience when the word prediction method is applied to the present invention. FIG. 72 shows a change of the keyboard layout shown in FIG. 27 for the current configuration.

One of the features of the keyboard layout shown in FIG. 72 is that no vowel is designated to the 'fortis, aspirate' key. Even though the word prediction method is enabled, the typical input method can be selected at anytime.

For example, when the word prediction method is enabled in the keyboard layout shown in FIG. 72, 'ㅋ' is input by pressing the 'ㄱ' key. However, when the 'fortis, aspirate' key is pressed after the 'ㄱ' key is pressed, the word prediction method confirms 'ㅋ' as an input consonant. Accordingly, disambiguity in a consonant does not exist anymore, and the same input mechanism as in the typical input method is applied to the word prediction method even though the word prediction method is enabled.

Thus, if an input method configured with the keyboard layout of FIG. 72 is used according to the current configuration, an input method in which the typical input method and the word prediction method are combined can be used. This is the point of the current configuration.

TABLE 1

The number of words predicted in the same key sequence according to Hangul keyboard layouts and a probability distribution corresponding to the same

| Number of elements in word set | Hanalgul | | SKY II | | Naratgul | | Cheonjiin | |
|---|---|---|---|---|---|---|---|---|
| | Number of items | Percentage | Number of items | Percentage | Number of items | Percentage | Number of items | Percentage |
| 10 or above | 0 | 0 | 0 | 0 | 204 | 0.75285 | 0 | 0 |
| 9 | 0 | 0 | 3 | 0.00887 | 75 | 0.27678 | 0 | 0 |
| 8 | 0 | 0 | 7 | 0.02070 | 51 | 0.18821 | 0 | 0 |
| 7 | 0 | 0 | 10 | 0.02957 | 115 | 0.42440 | 0 | 0 |
| 6 | 0 | 0 | 48 | 0.14195 | 215 | 0.79344 | 10 | 0.02728 |
| 5 | 3 | 0.00780 | 144 | 0.42587 | 302 | 1.11451 | 26 | 0.07093 |
| 4 | 30 | 0.07805 | 352 | 1.04102 | 552 | 2.03713 | 136 | 0.37104 |
| 3 | 237 | 0.61662 | 930 | 2.75042 | 1098 | 4.05211 | 538 | 1.46782 |
| 2 | 1970 | 5.12554 | 3303 | 9.76843 | 3142 | 11.5954 | 2720 | 7.42095 |
| 1 | 36195 | 94.172 | 29019 | 85.822 | 21303 | 78.6176 | 33233 | 90.6692 |
| Total | 38435 | 100 | 33813 | 100 | 27097 | 100 | 36653 | 100 |

TABLE 2

Comparison in the number of key presses required when the first measure of the Korean national anthem "동해물과 백두산이 마르고 닳도록" is input

| Input method | | Cheonjiin | Naratgul | Hanalgul |
|---|---|---|---|---|
| Word prediction method | Before apply | 59 | 47 | 51 |
| | After apply | 52 | 40 | 36 |

The input system according to the present invention can be applied to a Hindi input method. Like Hangul, since a word is formed by combining a consonant and a vowel in the case of Hindi, the concept of a vowel input enabling key applied to Hangul in the embodiments described above can be introduced to Hindi.

More details are described through exemplary embodiments.

Twenty Third Embodiment

Figure 62:
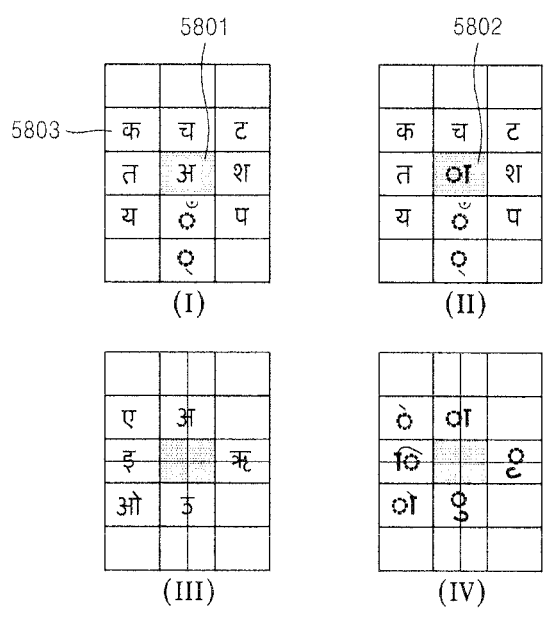

The twenty third embodiment provides a method of applying a vowel input enabling key to a Hindi input method that uses a touch screen, i.e., a method of inputting a consonant or vowel by one touch by arranging consonants and vowels to 8 of 15 keys as shown in FIG. 62.

Figure 64:
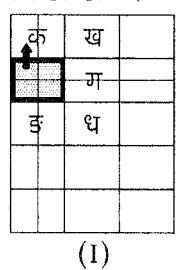
Figure 64:
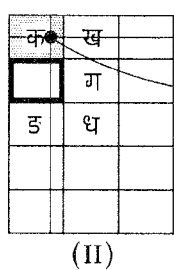
Figure 64:
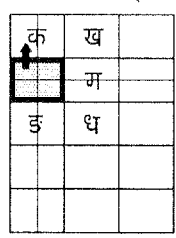
Figure 64:
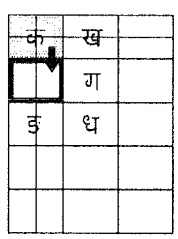
Figure 64:
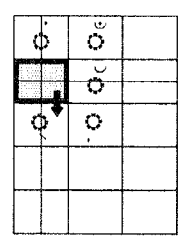
Figure 64:
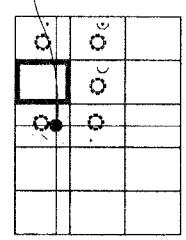
Figure 65:
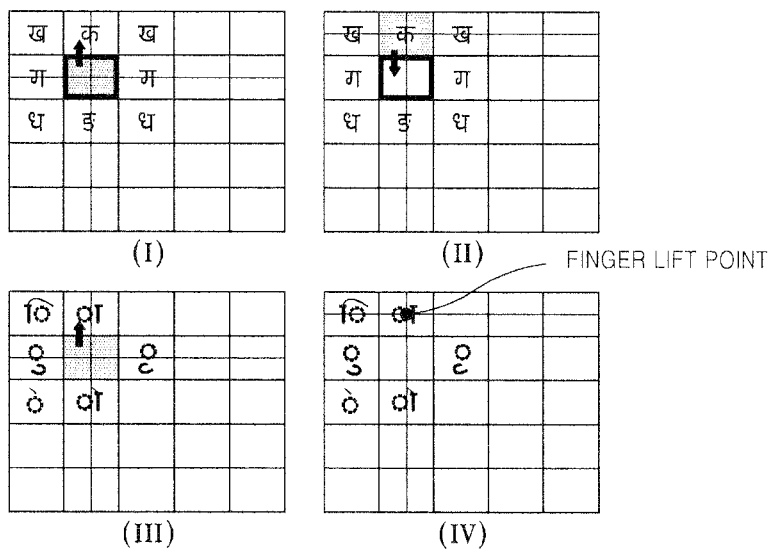

Character symbols including 'candrabindu' can be designated to keys to which any of these consonants and vowels is not designated, wherein the character symbols may be designated to a single key so that the character symbols are input by an extension function as in the case of the consonants and vowels (refer to FIG. 63(VIII)) or may be designated to corresponding keys as shown in FIG. 62. Furthermore, the character symbols may be input when a consonant is input as shown in FIG. 64. If the character symbols are designated to a separate key and are input by the extension function as shown in FIG. 63(VIII), a dependent vowel can be input next to a consonant in a finger touch state for a consonant input as shown in FIG. 65. This is described with reference to FIG. 65. When it is desired to input 'का', 'का' is input by selecting a desired consonant (refer to FIG. 65(I)) and returning to an original key position (refer to FIG. 65(II)) to extend and arrange dependent vowels around the original key, moving a finger to a position at which a vowel 'ा' is designated by a drag action in this state, and releasing the finger from the vowel 'ा'. However, this case is possible when the number of rows in a keyboard layout is 5 to be able to extend and arrange the dependent vowels. FIG. 65(I) shows a Hindi virtual keyboard main screen, wherein a vowel input enabling key 5801 as a key to which all vowels are designated has 'अ' as a representative character that corresponds to a Korean vowel 'ㅇㅏ', and in the case of consonants, 5 characters including a representative character marked by a blue color are designated to every corresponding keys except for 'श' for which 4 characters are designated, and the characters designated to every corresponding keys are as below.

क - क ख ग घ ङ
च - च छ ज झ ञ
ट - ट ठ ड ढ ण
त - त थ द ध न
प - प फ ब भ म
य - य र ल व ळ
श - श ष स ह

An actual consonant input method that uses a virtual keyboard is as follows. When a key on which its representative character is displayed is touched on a virtual keyboard main screen, characters designated to a corresponding group are displayed around the key on which its representative character is displayed, as shown in FIG. 63, wherein consonants belonging to a group of a representative character key placed at the left column of the virtual keyboard main screen are arranged in a clockwise order, consonants belonging to a group of a representative character key placed at the center column are arranged from top to the bottom in both left and right side in a symmetrical form, and consonants belonging to a group of a representative character key placed at a right column are arranged in a counterclockwise order from top to the bottom.

If the screen is large enough for a configuration of a virtual keyboard to be able to be 5 columns instead of 3 columns, even for the representative characters arranged in the left and right columns of the virtual keyboard shown in FIG. 62, characters designated to each of the representative characters can be arranged in both left and right sides in a symmetrical form as the center column. One particular fact shown in FIG. 63 is that each key showing representative character is touched to arrange characters belonging to a corresponding group around the key with no character is arranged at the original position of the representative character. Thus, to input a representative character representing each key, a user must touch a key displaying representative character on the virtual keyboard main screen, move a finger upwards by one row to select the representative character, and then release the finger since each representative character moves upwards by one row from an original position in finger touch and is arranged as shown in FIG. 63 when characters belonging to each group are extended and arranged due to the touch of each representative character. For example, one of the representative characters 'क' is input by touching a key 5803 represented as 'क' on the virtual keyboard main screen, moving a finger to a position of 'क' in a state where 5 characters including 'क' belonging to a corresponding group are extended and arranged (refer to FIG. 64(I)), and releasing the finger from the position of 'क' (refer to FIG. 64(II)). The reason why no character is designated to a position of each representative character key is to provide a method of easily inputting a symbol to be added to a consonant in the case of Hindi, and furthermore, to allow an independent vowel to be easily input after an input of a consonant. This will be described after a vowel input method is described. In the case of Hindi, unlike consonants, each of the vowels is input by one key, and the same pronunciation for each Hindi vowel is spelled in two ways, in which vowels spelled by being combined with a consonant are called dependent vowels, and vowels independently spelled without being combined with a consonant are called independent vowels. Thus, the number of independent vowels generally used is 11 (अ, आ, इ, ई, उ, ऊ, ए, ऐ, ओ, औ, and ऋ), and the number of dependent vowels is 10 (ा, ि, ी, ु, ू, े, ै, ो, ौ, ृ). The current configuration provides a method of inputting these vowels by arranging the vowels around the vowel input enabling key when the vowel input enabling key is touched. As configuring the simple vowels and compound vowels of Hangul, when the vowel input enabling key is touched once, the independent vowels are arranged around the vowel input enabling key, as shown in FIG. 62(□), so that the independent vowels can be input, and when the vowel input enabling key is touched twice, the dependent vowels are arranged around the vowel input enabling key, as shown in FIG. 62(□) so that the dependent vowels can be input. That is, the concept of the current configuration is that 21 vowels are arranged around one key.

However, by allowing an independent vowel inputtable state to be automatically changed to a dependent vowel inputtable state when a consonant is input besides the method of displaying a dependent vowel keyboard layout by touching the vowel input enabling key twice, it is configured so that the vowel input enabling key does not have to be touched twice to input a dependent vowel. That is, when a consonant is input, a vowel keyboard layout is always changed to the dependent vowel keyboard layout so that the virtual keyboard is changed as shown in FIG. 62(□), and when the vowel input enabling key is touched in this state, the dependent vowel keyboard layout is displayed on the screen as shown in FIG. 62(□). Since a dependent vowel is always input after a consonant is input, inconvenience that a user must select an independent vowel keyboard layout or the dependent vowel keyboard layout to input a vowel can be removed by changing the keyboard layout to the dependent vowel keyboard layout when a sentence begins, when a new word in a sentence begins, or when a vowel is input during a word input. This automatic switch between the independent vowel keyboard layout and the dependent vowel keyboard layout according to a sentence or word input state is also a fact of the current configuration. That is, in the current configuration, after an input of 'space' for starting a sentence or for spacing words, the independent vowel input state is always maintained as shown in FIG. 62(□). In addition, when the vowel input enabling key of the virtual keyboard shown in each of FIGS. 62(□) and 62(□) is touched, this causes a vowel input enabling state as shown in the independent vowel keyboard layout (refer to FIG. 68(□)) or the dependent vowel keyboard layout (refer to FIG. 68(□)) shown in FIG. 68, respectively. This enabled vowel keyboard layout shows only a half of vowels to be input.

Figure 69:
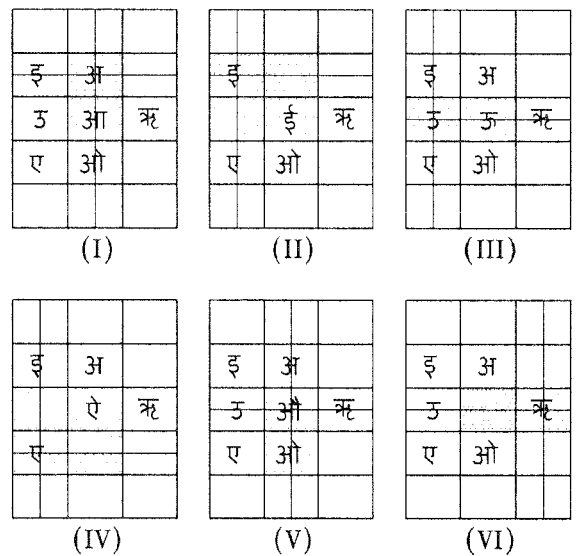
Figure 70:
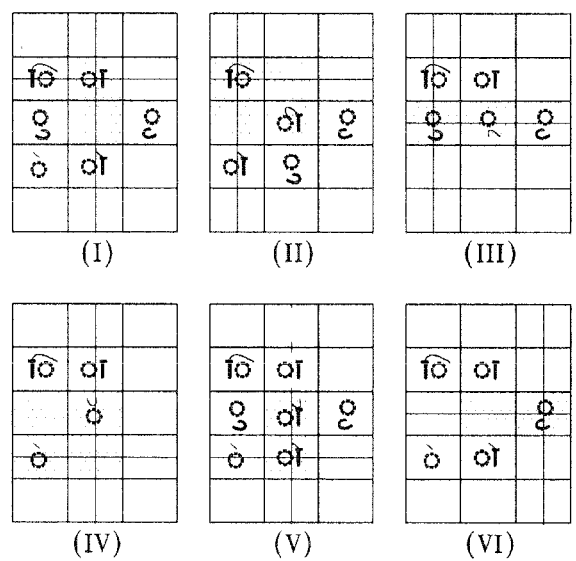

Thus, a substantial vowel input method is shown in FIGS. 69 and 70. An independent vowel 'अ' corresponding to the phonetic symbol [a] is input by moving a finger upwards in an independent vowel keyboard layout enabling state, selecting 'अ', and releasing the finger as shown in FIG. 69(□).

Figure 68:
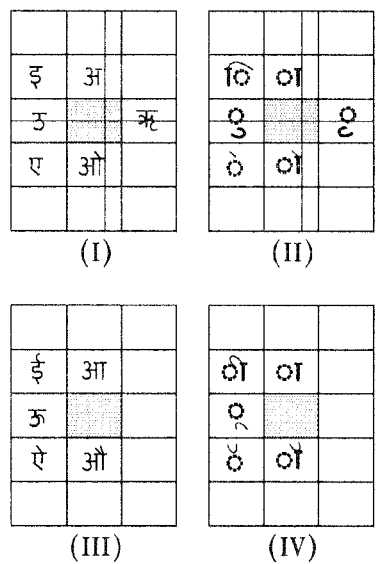

In addition, 'आ' corresponding to a phonetic symbol [a:] is input by returning the finger to the original position of the vowel input enabling key in a state of selecting 'अ' and releasing the finger. Likewise, each of अ इ उ ए ओ ऋ corresponding to short sounds among long and short sounds in the Hindi vowels is input by moving a finger to a position at which a corresponding vowel is displayed in the independent vowel keyboard layout enabling state and releasing the finger, and each of आ ई ऊ ऐ औ corresponding to long vowels among these independent vowels is displayed at the position of the vowel input enabling key when a corresponding short vowel is selected and is input by returning the finger from a position of the corresponding short vowel to the position of the vowel input enabling key and releasing the finger. The dependent vowels are also input in the same method as the independent vowels. However, since there is no short vowel corresponding to the phonetic symbol [a] in the dependent vowels, 'ा' corresponding to the long vowel [a:] is displayed together with the other short vowels when the dependent vowel keyboard layout is enabled, as shown in FIG. 68(□).

As shown in FIGS. 69(□) and 69(□), when 'इ' or 'ए' is selected, a corresponding key area is extended to 4 adjacent key areas (yellow marked area) to prevent any adjacent short vowel from being enabled by touching the adjacent short vowel in a process of moving a finger to the original position of the vowel input enabling key to which 'ई' or 'ऐ' corresponding to a long vowel of 'इ' or 'ए' is designated.

For example, if only key areas corresponding to 'इ' and 'ई' are enabled (marked yellow) without enabling the 4 adjacent key areas as shown in FIG. 69(□) when 'ई' is selected, a 'अ' or 'उ' key area may be touched in a process of moving a finger from a 'इ' key area to 'ई' key area to select 'ई', thereby causing the short vowel 'अ' or 'उ' to be enabled so that 'ई' cannot be selected.

Sometimes, there is a case where an independent vowel must be input next to a consonant as in a case of 'बंबई' (Bombay). In this case, the current configuration in which the dependent vowel keyboard layout is automatically displayed after a consonant is input causes inconvenience that the dependent vowel keyboard layout must be changed to the independent vowel keyboard layout by touching the vowel input enabling key to input an independent vowel.

However, as described above for the consonant keyboard layout, when a representative character key is touched, no character is designated to a position of the representative character key. This is used for another usage, i.e., a function of changing the dependent vowel keyboard layout to the independent vowel keyboard layout. That is, in the case of 'बबई' (Bombay), according to the current configuration, since the vowel input keyboard layout is changed to the dependent vowel input keyboard layout after a consonant input of 'बब' is performed, the independent vowel 'ई' must be input by changing the dependent vowel input keyboard layout to the independent vowel input keyboard layout through the vowel input enabling key. However, as shown in FIG. 67, in the consonant input process, the dependent vowel input keyboard layout can be changed to the independent vowel input keyboard layout.

Figure 66:
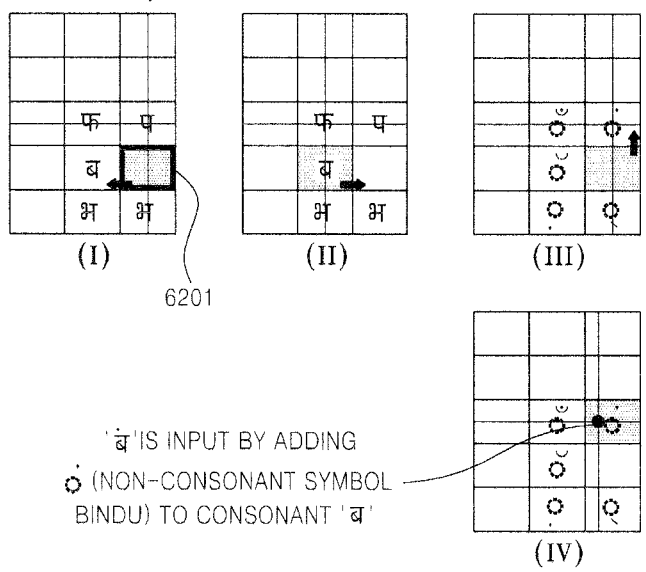
Figure 67:
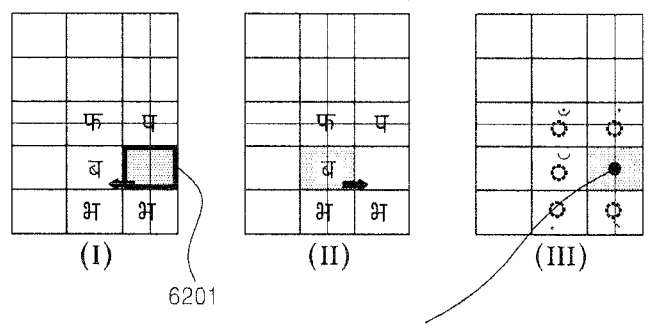

For example, the vowel keyboard layout is changed to the independent vowel input keyboard layout after 'ब' is input by touching a key of a representative character 'प' representing a group to which 'ब' belongs (refer to FIG. 67(□)), moving a finger to a position of 'ब' in a finger touch state (refer to FIG. 67(□)), returning the finger to a position 6201 at which 'प' has been arranged on the virtual keyboard main screen (refer to FIG. 62(□) and FIG. 67(□)), and releasing the finger from the position 6201. If the finger is released from the position of 'ब' in the state of FIG. 67(□), the vowel keyboard layout is changed to the dependent vowel input keyboard layout as soon as 'ब' is input as described above. Thus, in this case, an input of 'ई' causes the inconvenience that the vowel input enabling key must be touched twice to change the vowel keyboard layout that has been changed to the dependent vowel input keyboard layout (refer to FIG. 62(□)) to the independent vowel input keyboard layout (refer to FIG. 62(□)). Furthermore, when a representative character key is touched, no character is designated to a position of the representative character key, and the position of the representative character key is used further for another usage. In this case, the Hindi consonants are changed with any of additional symbols (◌ं ◌ँ ◌ं ◌़ ◌्—bindu, candrabindu, candra, nukta, and halant), and a function of enabling any of the additional symbols required for the consonant change corresponds to this usage. For example, a first character 'बं' of 'बंबई' is input by touching the key of the representative character 'प' representing the group to which 'ब' belongs on the virtual keyboard shown in FIG. 66 to input 'ब', as shown in FIG. 66 (refer to FIG. 66(□)), moving a finger to the position of 'ब' in a finger touch state (refer to FIG. 66(□)), returning the finger to the position 6201 at which 'प' has been arranged on the virtual keyboard main screen (refer to FIG. 62(□) and FIG. 66(□)) to display the five consonant supplementary symbols (◌ं ◌ँ ◌ं ◌़ ◌्—bindu, candrabindu, candra, nukta, and halant), moving the finger to a position of '◌ं' (bindu), and releasing the finger from the position of '◌ं' (bindu).

Figure 71:
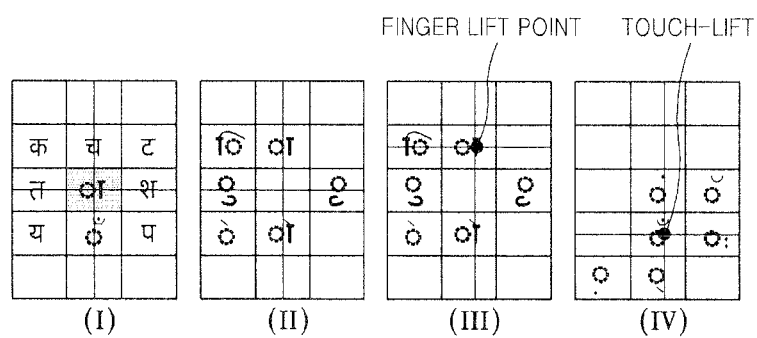

A method of inputting a character symbol for the vowels is the same as in the case of the consonants. For example, when 'ह' meaning Korean 'ㅔ' (English 'yes') is input, 'ह' is first input, and then the vowel keyboard layout is automatically changed to the dependent vowel input keyboard layout, and as shown in FIG. 71, the vowel input enabling key is touched (refer to FIG. 71(I)) to arrange the dependent vowels around the vowel input enabling key (refer to FIG. 71(II)), and in this state, a user moves a finger upwards to select 'ा', releases the finger, and performs a touch-release action on a key to which 'candrabindu' is designated (refer to FIG. 71(IV)), resulting in an input of 'ाँ'.

A consonant complementary symbol may be input by using a key extension function when a consonant is input as shown in FIGS. 64(V) and 64(VI) or may be input by separately designating such a consonant complementary symbol on a corresponding key on the keyboard layout. For example, any of the consonant complementary symbols may be designated to a key below a key to which 'candrabindu' is designated as in a case of the symbol '◌्' (halant)' used to form a semiconsonant that is shown in FIG. 62(□) or may be simultaneously input when a consonant is input by allocating an extension function to a consonant key as shown in FIGS. 64(□) and 64(□), or all consonant symbols may be designated to an extension area of 'candrabindu' as shown in FIG. 63(□). This is to utilize an advantage of the drag method in the touch type input method.

As described above, a position and key designation of any of the symbols combined with consonants and vowels can be changed for user convenience, and a detailed usage is as described below. Allowing all Hindi characters to be able to be input with a limited number of keys by inputting characters such as 'एरऋ' which are input as independent characters on a typical computer keyboard, by a combination of a Hindi character and a character symbol is also a fact of the current configuration. That is, 'ऍ' and 'ऋ' are input by inputting symbols '◌ँ (candra)' and '◌् (halant)' after inputting 'ए' and 'र', respectively, and since an input of 'ऋ' is achieved by combining 'त्' and 'र', 'ऋ' is input by inputting 'त', inputting '◌् (halant)', and inputting 'र'. Thus, although a method of inputting a character input as an independent character on a computer keyboard by one key instead of a combined form is also possible, the present invention reduces a time taken to perceive positions of keys by making perception of character position easy and a minimizing finger moving distance by using 9 keys, thereby increasing convenience in inputting.

The method of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

INDUSTRIAL APPLICABILITY

The present invention can be used as an input device of minimized digital devices.

The invention claimed is:
1. A system used in a hand-held device for inputting information, comprising:
an input unit comprising a keypad or at least one touch sensor having multiple key areas for inputting characters, the input unit being configured to detect a key area selected from among the multiple key areas assigned with characters; and
an input analysis unit configured to allocate corresponding information to the multiple key areas and analyze information allocated to the selected key area when the input unit detects a press or a touch of any of the multiple key areas, wherein multiple characters are invariably allocated to each of the multiple key areas, wherein the input analysis unit is configured to:

when one key area of the keypad or the at least one touch sensor is pressed or touched allocate the characters of the one key area to each of the key areas and display the characters on the key areas of a screen along with the invariably allocated multiple characters or on a separate area of the screen corresponding to each key area, when two or more key areas of the keypad or the at least one touch sensor are sequentially pressed or touched generate predicted words by combining one of characters allocated to firstly selected key area and one of characters allocated to secondly selected key area with continuation of the combining for the subsequently selected key areas and allocate the predicted words to each of the key areas and display the predicted words on the key areas of a screen along with the invariably allocated multiple characters or on a separate area of the screen corresponding to each key area, when the key area to which one of the predicted words is allocated is pressed or touched by the user in a predetermined manner without an additional conversion step or procedure of an additional touch or press, select the one of the predicted words allocated to the key area, and determine that the one of the predicted words is input, wherein an extension key is allocated to one of the multiple key areas for selection of the predicted words in a character input mode, and wherein the input analysis unit is further configured to:

determine that a first one-point touch is performed when the extension key is pressed or touched;

upon determining that the first one-point touch is performed, extract and allocate the predicted words to an extension area including the key areas adjacent to the key area to which the extension key is allocated;

determine that a second one-point touch is performed when a key area of the extension area is selected by a pressing or touching operation after the first one-point touch is completed; and upon determining that the second one-point touch is performed, determine that the predicted word allocated to the selected key area is input.

2. The system of claim 1, wherein the input unit comprises the at least one touch sensor, the at least one touch sensor is configured to detect a touch operation, and the input analysis unit is configured to determine that the predicted word allocated to a touched key area is input when the key area to which the predicted word is allocated is touched, and a dragging operation of at least a predetermined distance is performed.

3. The system of claim 1, wherein the input analysis unit is configured to:

if two or more of the key areas are selected, then the extension key is selected, which allocates predicted words to the key areas, and one of the key areas is selected, determine that the predicted word allocated to the selected key area is input along with a space input after the predicted word.

4. The system of claim 1 or claim 3, wherein the input unit comprises the at least one touch sensor, and the at least one touch sensor is configured to detect a touch operation and a dragging operation, and selection of the extension key and selection of the key area performed after selecting two or more of the key areas from among the multiple key areas in order to extract the predicted words are performed as one dragging operation.

5. The system of claim 1, wherein if after two or more of the key areas are selected, the extension key, a key area included in the extension area and the extension key are selected sequentially, the predicted word allocated to the selected key area is input with a space input after the predicted word.

6. The system of claim 5, wherein the input unit comprises the at least one touch sensor, the at least one touch sensor is configured to detect a touch operation and a dragging operation, and after two or more of the key areas are selected and the predicted words are allocated to the extension area, a series of selection processes including the selection of the extension key, the selection of the key area, and the selection of the extension key is to be performed by one dragging operation.

7. The system of claim 1, wherein after one or more of the key areas are selected, the predicted words are allocated to the extension area, and a series of selection processes including selection of the extension key, selection of a key area included in the extension area, and selection of the extension key is performed, the predicted word allocated to the selected key area is input and then symbols are newly allocated to the extension area to be selected.

8. The system of claim 7, wherein the input unit comprises the at least one touch sensor, the at least one touch sensor is configured to detect a touch operation and a dragging operation, and a series of selecting processes including the selection of the extension key, the selection of a key area, and the selection of the extension key is performed by one dragging operation.

9. The system of claim 1, wherein a method of selecting the characters allocated to the key area and a method of selecting the predicted word allocated to the key area are different from each other, and when the characters allocated to the key area are selected, characters are allocated to the extension key.

10. A system used in a hand-held device for inputting information, comprising:

an input unit comprising a keypad or a touch sensor having multiple key areas for inputting characters, the input unit being configured to detect a key area selected by a user from among the multiple key areas assigned with characters; and an input analysis unit configured to allocate corresponding information to the multiple key areas and analyze information allocated to the selected key area when the input unit detects a press or a touch of any of the multiple key areas, wherein multiple characters are invariably allocated to each of the multiple key areas, when one key area of the keypad or the touch sensor is pressed or touched by the user, the input analysis unit allocates the characters of the one key area to each of the key areas and display the characters on the key areas of a screen along with the invariably allocated multiple characters or on a separate area of the screen which corresponds to each key area, when two or more key areas of the keypad or the touch sensor are sequentially pressed or touched by the user, the input analysis unit generates predicted words by combining one of characters allocated to firstly selected key area and one of characters allocated to secondly selected key area with continuation of the combining for the subsequently selected key areas and allocates the predicted words to each of the key areas and display the predicted words on the key areas of a screen along with the invariably allocated multiple characters or on a separate area of the screen which corresponds to each key area, when the key area to which one of the predicted words is allocated is pressed or touched by the user in a predetermined method without an additional conversion step or procedure of an additional touch or press, the input analysis unit selects the one of the predicted words allocated to the key area, rather than the multiple characters invariably allocated to the key area, and the one of the predicted words is to be input, wherein an extension key is allocated to at least one of the multiple key areas, and if two or more of the key areas are selected, then the extension key is selected, which allocates predicted words to the key areas, and one of the key areas is selected, the input analysis unit analyzes that the predicted word allocated to the selected key area is input along with a space input after the predicted word, wherein the input unit comprises the touch sensor, the touch sensor being configured to determine the user's touch, and selection of the extension key and selection of the key area which are performed after selecting two or more of the key areas from among the multiple key areas in order to extract the predicted words are made as one dragging operation, wherein in a state where no key area is selected from among the key areas and none of the predicted words has been allocated to the key areas, a dragging operation which corresponds to the selection of the extension key and the selection of the key area acts as if a shift key is pressed so that the character set corresponding to the selected key area may be input in capital form instead of inputting any of the predicted words.

11. A system used in a hand-held device for inputting information, comprising:

an input unit comprising a keypad or a touch sensor having multiple key areas for inputting characters, the input unit being configured to detect a key area selected by a user from among the multiple key areas assigned with characters; and an input analysis unit configured to allocate corresponding information to the multiple key areas and analyze information allocated to the selected key area when the input unit detects a press or a touch of any of the multiple key areas, wherein multiple characters are invariably allocated to each of the multiple key areas, when one key area of the keypad or the touch sensor is pressed or touched by the user, the input analysis unit allocates the characters of the one key area to each of the key areas and display the characters on the key areas of a screen along with the invariably allocated multiple characters or on a separate area of the screen which corresponds to each key area, when two or more key areas of the keypad or the touch sensor are sequentially pressed or touched by the user, the input analysis unit generates predicted words by combining one of characters allocated to firstly selected key area and one of characters allocated to secondly selected key area with continuation of the combining for the subsequently selected key areas and allocates the predicted words to each of the key areas and display the predicted words on the key areas of a screen along with the invariably allocated multiple characters or on a separate area of the screen which corresponds to each key area, when the key area to which one of the predicted words is allocated is pressed or touched by the user in a predetermined method without an additional conversion step or procedure of an additional touch or press, the input analysis unit selects the one of the predicted words allocated to the key area, rather than the multiple characters invariably allocated to the key area, and the one of the predicted words is to be input, wherein the input unit comprises the touch sensor so as to determine the user's touch, and the input analysis unit allocates an extension key to at least one key area from among the multiple key areas so that the following cases perform different functions (1) a dragging operation of selecting the key area and selecting the extension key;

(2) a dragging operation of selecting the key area, selecting the extension key, and selecting the key area included in the extension area;

(3) a dragging operation of selecting the extension key and selecting the key area; and (4) a dragging operation of selecting the extension key, selecting the key area, and selecting the extension key.

* * * * *